United States Patent
Endo et al.

(10) Patent No.: US 11,797,909 B2
(45) Date of Patent: Oct. 24, 2023

(54) INFORMATION PROCESSING DEVICE, INFORMATION PROCESSING METHOD, IMAGE ACQUISITION METHOD, AND NON-TRANSITORY COMPUTER-READABLE STORAGE MEDIUM

(71) Applicant: TOYOTA JIDOSHA KABUSHIKI KAISHA, Toyota (JP)

(72) Inventors: Masato Endo, Nagakute (JP); Yuichiro Haruna, Oyama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1154 days.

(21) Appl. No.: 16/219,491

(22) Filed: Dec. 13, 2018

(65) Prior Publication Data

US 2019/0188637 A1 Jun. 20, 2019

(30) Foreign Application Priority Data

Dec. 15, 2017 (JP) ................... 2017-241020

(51) Int. Cl.
*G06Q 10/0833* (2023.01)
*G06Q 10/0832* (2023.01)
(Continued)

(52) U.S. Cl.
CPC ..... *G06Q 10/0833* (2013.01); *G06Q 10/0832* (2013.01); *G06T 1/0007* (2013.01); *G06V 20/10* (2022.01); *G06V 20/59* (2022.01)

(58) Field of Classification Search
CPC .......... G06Q 10/0833; G06Q 10/0832; G06V 20/59; G06V 20/10; G06T 1/0007
See application file for complete search history.

(56) References Cited

U.S. PATENT DOCUMENTS 10,627,244 B1 * 4/2020 Lauka ............. G06Q 10/08355
2003/0126123 A1 * 7/2003 Kodama ................. G06F 16/40
(Continued)

FOREIGN PATENT DOCUMENTS

CN 105308637 A 2/2016
CN 205961456 U 2/2017
(Continued)

OTHER PUBLICATIONS

Paul A. Zandbergen, A comparison of address point, parcel and street geocoding techniques, 2007, p. 214-216 (Year: 2007).*
(Continued)

*Primary Examiner* — Ibrahim N El-Bathy
(74) *Attorney, Agent, or Firm* — Hunton Andrews Kurth LLP

(57) ABSTRACT

An information processing device is configured to perform an operation of a delivery service in which an inside of a vehicle, a building, or a facility used by a user is designated as a delivery destination of a package, or perform a support of the operation. The information processing device includes an information acquisition unit configured to acquire information on an accommodation situation of an object accommodated inside the vehicle, the building, or the facility, and an accommodation situation notification unit configured to notify the user of the accommodation situation based on the information acquired by the information acquisition unit.

12 Claims, 11 Drawing Sheets

(51) Int. Cl.
*G06T 1/00* (2006.01)
*G06V 20/10* (2022.01)
*G06V 20/59* (2022.01)

(56) References Cited

U.S. PATENT DOCUMENTS

| | | | |
|---|---|---|---|
| 2006/0020366 A1* | 1/2006 | Bloom | G07C 9/23 |
| | | | 700/226 |
| 2008/0004995 A1* | 1/2008 | Klingenberg | G06Q 10/083 |
| | | | 705/28 |
| 2013/0261792 A1* | 10/2013 | Gupta | G06Q 10/08 |
| | | | 700/232 |
| 2014/0278099 A1* | 9/2014 | Schenken | G06Q 10/02 |
| | | | 701/533 |
| 2015/0242811 A1 | 8/2015 | Gillen et al. | |
| 2015/0349917 A1* | 12/2015 | Skaaksrud | H04L 1/0006 |
| | | | 370/328 |
| 2017/0199522 A1 | 7/2017 | Li | |
| 2017/0262800 A1* | 9/2017 | Dorpfeld | G06Q 10/08 |
| 2018/0148016 A1 | 5/2018 | Rous et al. | |
| 2018/0315013 A1* | 11/2018 | Wilkinson | G05D 23/1917 |
| 2020/0074396 A1* | 3/2020 | Boccuccia | G06Q 10/083 |

FOREIGN PATENT DOCUMENTS

| | | |
|---|---|---|
| CN | 206162618 U | 5/2017 |
| CN | 107077654 A | 8/2017 |
| DE | 102015209482 A1 | 11/2016 |
| JP | 2002056064 A | 2/2002 |
| JP | 2002085247 A | 3/2002 |
| JP | 2006-206225 A | 8/2006 |
| JP | 2011134003 A | 7/2011 |
| JP | 2014118288 A | 6/2014 |
| JP | 2015-045141 A | 3/2015 |
| JP | 2015121978 A | 7/2015 |
| JP | 2016103056 A | 6/2016 |
| JP | 2017086540 A | 5/2017 |
| JP | 2017517462 A | 6/2017 |
| WO | 2014/164829 A2 | 10/2014 |
| WO | 2016/054248 A1 | 4/2016 |

OTHER PUBLICATIONS

Paul A. Zandbergen, A comparison of address point, parcel and street geocoding techniques, 2007, p. 215-218 (Year: 2007).*

* cited by examiner

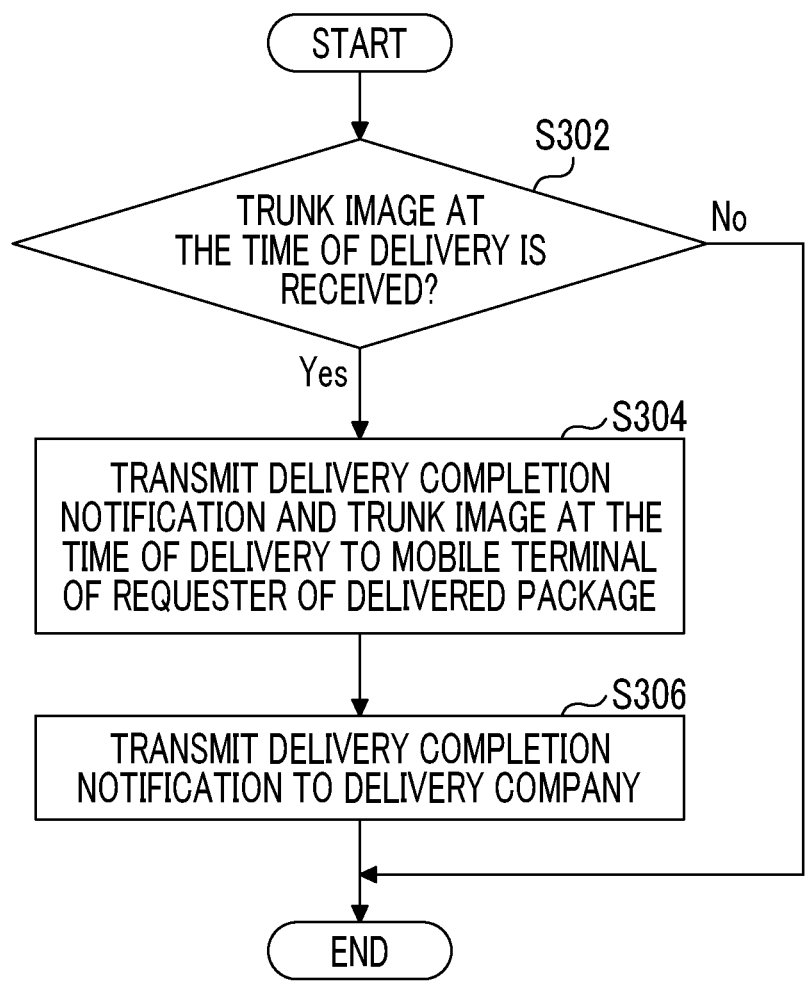

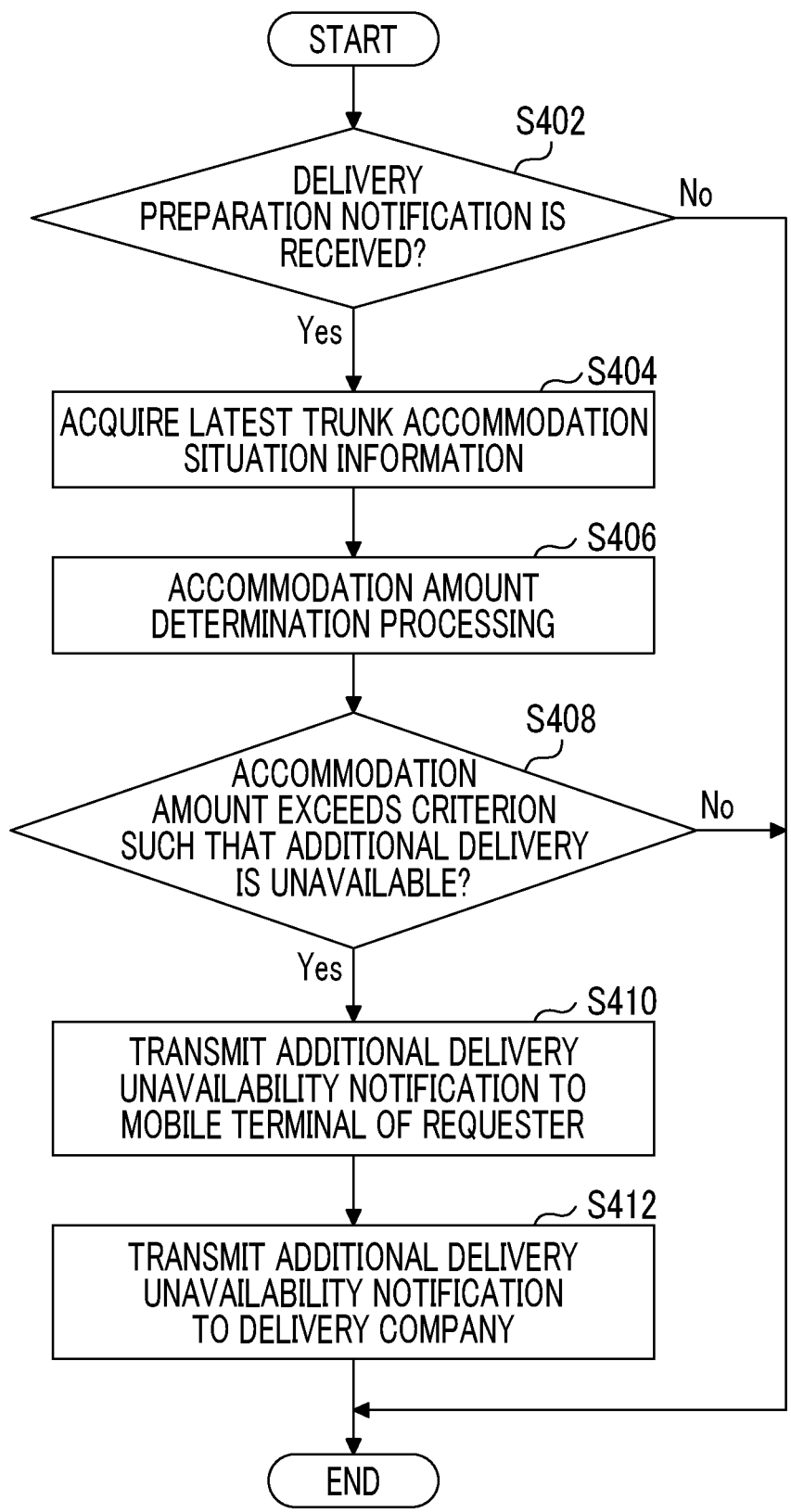

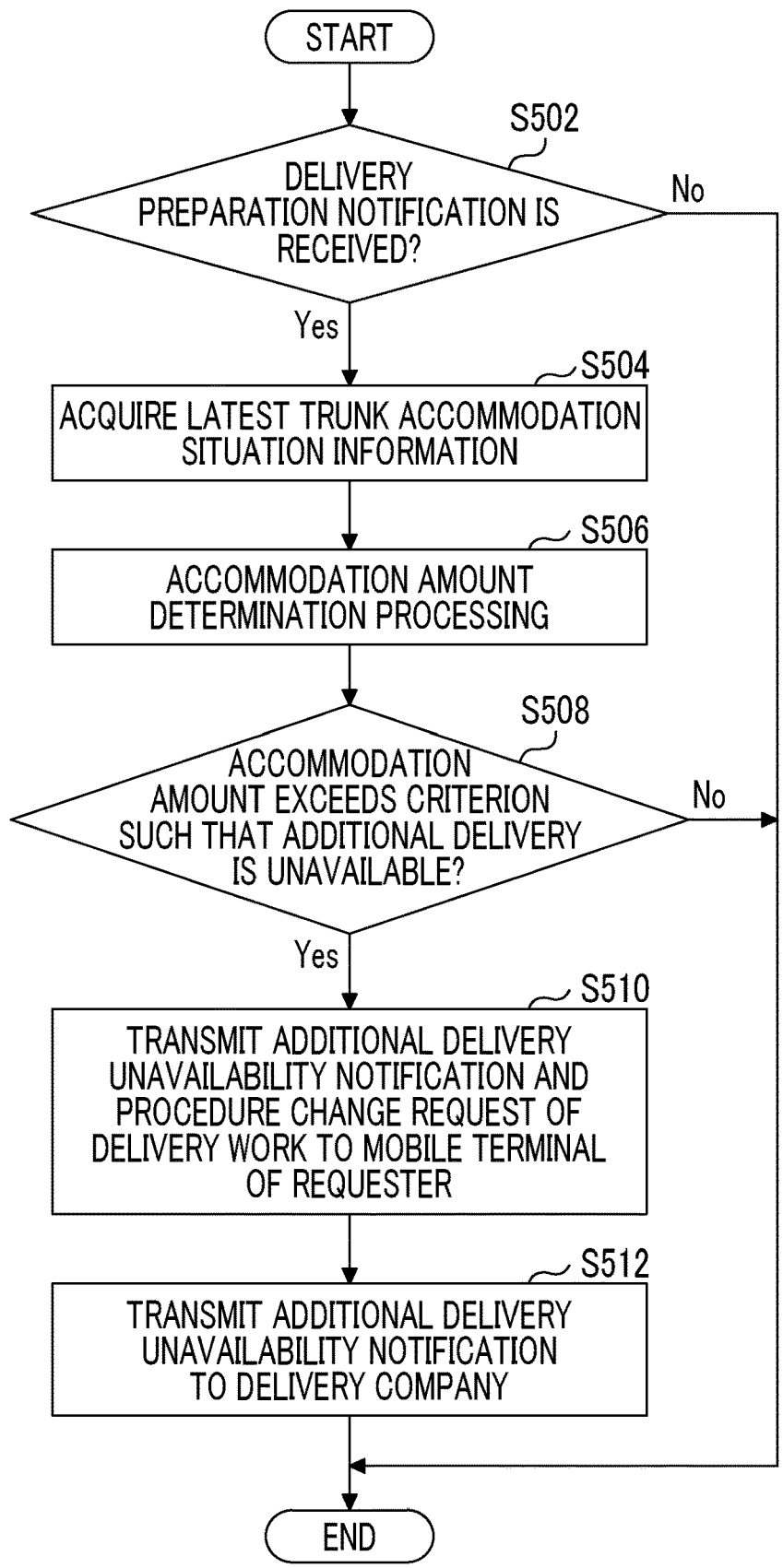

INFORMATION PROCESSING DEVICE, INFORMATION PROCESSING METHOD, IMAGE ACQUISITION METHOD, AND NON-TRANSITORY COMPUTER-READABLE STORAGE MEDIUM

INCORPORATION BY REFERENCE

The disclosure of Japanese Patent Application No. 2017-241020 filed on Dec. 15, 2017 including the specification, drawings and abstract is incorporated herein by reference in its entirety.

BACKGROUND

1. Technical Field

The disclosure relates to an information processing device, an information processing method, an image acquisition method, and a non-transitory computer-readable storage medium storing a program.

2. Description of Related Art

For example, a mechanism that uses a vehicle cabin of a vehicle, for example a trunk, as a delivery destination of a package is disclosed (see Japanese Unexamined Patent Application Publication No. 2006-206225 (JP 2006-206225 A) or the like).

Specifically, authentication information (key information) for unlocking a vehicle is distributed to a delivery company (for example, a mobile terminal carried by a deliverer). When a predetermined transmission signal including the key information is transmitted from the mobile terminal carried by the deliverer to the vehicle, and then authentication is successful on a vehicle side based on the key information included in the transmission signal, a door that allows access to a trunk of the vehicle (for example, a trunk lid or a backdoor) is unlocked. Accordingly, the deliverer can accommodate the package in the trunk. Accordingly, the delivery company can provide a customer with a delivery service in which a vehicle cabin such as the trunk of the vehicle can be designated as the delivery destination (hereinafter referred to as a "vehicle cabin delivery service"). Similarly, it is also possible to provide a delivery service that can designate an inside of a building or a facility such as a home or a second home (the second home privately owned or rental), which is used by a user and can be locked and unlocked, as the delivery destination.

SUMMARY

However, without a visual check, it is usually not possible for the user to check an accommodation situation of an object accommodated on the inside of the vehicle, the building, or the facility (hereinafter, referred to as a "vehicle or the like" for the convenience) designated as the delivery destination of the package. For this reason, without being noticed, an accommodation capacity limit may be reached by a plurality of delivered package, user's objects usually remaining on the inside of the vehicle, or the like, such that delivery of an additional package is not possible, for example. Further, for example, when a door of the vehicle or the like is unlocked using a mobile terminal carried by the deliverer and the package is delivered to the inside of the vehicle or the like, it may not be possible for the user to grasp whether or not the package has been actually delivered since the user does not actually receive the package. Therefore, it is desirable for the user to grasp the accommodation situation of the object accommodated on the inside of the vehicle or the like designated as the delivery destination of the package.

The disclosure provides an information processing device, information processing method, an image acquisition method, and a non-transitory computer-readable storage medium storing a program that make it possible for a user to grasp an accommodation situation of an object accommodated on an inside of a vehicle or the like which is a delivery destination of a package, in a delivery service in which the inside of the vehicle or the like used by the user is designated as the delivery destination of the package.

A first aspect of the disclosure relates to the information processing device configured to perform an operation of a delivery service in which an inside of a vehicle, a building, or a facility used by a user is designated as a delivery destination of a package, or perform a support of the operation. The information processing device includes an information acquisition unit configured to acquire information on an accommodation situation of an object accommodated inside the vehicle, the building, or the facility, and an accommodation situation notification unit configured to notify the user of the accommodation situation based on the information acquired by the information acquisition unit.

According to the first aspect of the disclosure, the information processing device can notify the user of the accommodation situation of the object accommodated inside the vehicle or the like, based on the information on the accommodation situation of the object accommodated on the inside of the vehicle or the like which is the delivery destination of acquired package. Therefore, the information processing device can make the user grasp the accommodation situation of the object accommodated on the inside of the vehicle or the like which is the delivery destination of the package.

In the information processing device according to the first aspect of the disclosure, the information acquisition unit may be configured to acquire a capture image of the inside captured at a time of delivery of the package from a mobile terminal that is carried by a deliverer of the package and is equipped with an imaging function, and the accommodation situation notification unit may be configured to provide a notification of the capture image to a user's predetermined terminal, a user's email address, or a user's predetermined social networking service account.

According to the first aspect of the disclosure, the information processing device provides the notification (transmission) of the acquired capture image inside the vehicle or the like captured by the mobile terminal of the deliverer at the time of the delivery of the package to the user's terminal or the like, and thus it is possible to make the user specifically grasp the accommodation situation of the object accommodated inside the vehicle or the like. Therefore, the information processing device can make the user grasp whether the package scheduled to be delivered is in a deliverable situation, or the package is actually delivered or the like, by the capture image at the time of the delivery, for example.

The information processing device according to the first aspect of the disclosure may further include a delivery completion notification unit configured to provide a notification of a delivery completion of the package to the predetermined terminal, the email address, or the account, when the capture image is acquired.

According to the first aspect of the disclosure, the information processing device can recognize the delivery completion of the package by acquiring the capture image inside the vehicle or the like captured by the mobile terminal of the deliverer at the time of the delivery. Therefore, for example, the deliverer does not need to perform additional work of providing the notification of merely the delivery completion from the mobile terminal to the information processing device or the like, on top of the work of capturing the image inside the vehicle or the like at the time of the delivery completion. Therefore, the information processing device can notify the user of the delivery completion while reducing work burden on the deliverer at the time of the delivery.

The information processing device according to the first aspect of the disclosure may further include an accommodation amount determination unit configured to determine whether or not an accommodation amount of the object accommodated inside exceeds a predetermined criterion based on the information acquired by the information acquisition unit. The accommodation situation notification unit may be configured to provide a notification of a determination result to a user's predetermined terminal, a user's email address, or a user's predetermined social networking service account, when the accommodation amount determination unit determines that the accommodation amount exceeds the predetermined criterion.

According to the first aspect of the disclosure, when the accommodation amount of the object accommodated on the inside of the vehicle or the like as the delivery destination of the package exceeds the predetermined criterion such that the accommodation of an additional package is difficult, for example, the information processing device can notify the user of the determination result. Therefore, the information processing device can make the user grasp whether the package scheduled to be delivered is in the deliverable situation or the like, depending on a presence or absence of the notification, for example.

The information processing device according to the first aspect of the disclosure may further include a delivery work procedure change unit configured to provide a notification, when the accommodation amount determination unit determines that the accommodation amount exceeds a predetermined criterion, to a user's predetermined terminal, a user's email address, or a user's predetermined social networking service account such that at least a procedure change regarding a delivery work of the package is requested to a delivery service company, the change including a temporary suspension of the delivery work of the package yet to be delivered, a redelivery of the package yet to be delivered at a date and time different from a date and time currently set, and a change of the delivery destination of the package yet to be delivered.

According to the first aspect of the disclosure, when the accommodation amount of the object accommodated on the inside of the vehicle or the like as the delivery destination of the package exceeds the predetermined criterion such that the accommodation of the additional package is difficult, for example, the information processing device can make the user request the procedure change regarding the delivery work of the package such as the temporary suspension of the delivery work of the package or the like to the delivery company. Therefore, the information processing device makes it less likely for the deliverer to head for the vehicle or the like, in a situation where the package cannot be accommodated inside the vehicle or the like. Therefore, even in the situation where the additional package cannot be delivered to the inside of the vehicle or the like designated as the delivery destination of the package, the information processing device can improve an efficiency of the delivery work.

In the information processing device according to the first aspect of the disclosure, the delivery work procedure change unit may be configured to cause a display device of the predetermined terminal to display a website for the procedure change or a window of an application program which links to the website and is installed in the predetermined terminal, by the notification to the predetermined terminal.

According to the first aspect of the disclosure, the information processing device can cause the user's terminal (for example, a smartphone or the like) to display the web site for the procedure change regarding the delivery work of the package such as the temporary suspension of the delivery work of the package on a predetermined browser. Further, the information processing device can activate the application capable of a manipulation of changing the procedure and cause the user's terminal to display the window for a specific change manipulation (including a screen exclusively displayed on the display of the smartphone). Therefore, the information processing device can make the user specifically request the procedure change regarding the delivery work of the package to the delivery company.

In the information processing device according to the first aspect of the disclosure, the delivery work procedure change unit may be configured to provide, to the email address or the account, a notification including link information for causing a display device of a terminal in use which is used by the user to display a website for the procedure change or a window of an application program which links to the website and is installed in the terminal in use.

According to the first aspect of the disclosure, the information processing device can cause the web site for the procedure change regarding the delivery work of the package such as the temporary suspension of the delivery work of the package to be displayed on the predetermined browser, on the user's terminal in use (a computer terminal such as a tablet terminal type or a laptop type). Further, the information processing device can activate the application capable of changing the procedure and cause the user's terminal in use to display the window for the specific change manipulation. Therefore, the information processing device can make the user specifically request the procedure change regarding the delivery work of the package to the delivery company.

In the information processing device according to the first aspect of the disclosure, the delivery work procedure change unit may be configured to provide, to the predetermined terminal, the email address, or the account, a notification including information specifying all packages yet to be delivered, for which the inside of the vehicle, the building, or the facility is designated as the delivery destination.

According to the first aspect of the disclosure, the information processing device can make the user request the procedure change regarding the delivery work of the package to the delivery company with respect to all the packages scheduled to be delivered, for which the inside of the vehicle or the like is designated as the delivery destination, without being limited to a specified package.

In the information processing device according to the first aspect of the disclosure, the information acquisition unit may be configured to acquire, from a mobile terminal that is carried by a deliverer of the package and is equipped with an imaging function, a capture image of the inside of the vehicle, the building, or the facility captured at the time of delivery of the package, or detection information on the accommodation amount output from a sensor provided inside the vehicle, the building, or the facility.

According to the first aspect of the disclosure, the information processing device can specifically grasp the accommodation amount of the object accommodated inside the vehicle or the like from the capture image of the inside of the vehicle or the like captured by the mobile terminal of the deliverer at the time of the delivery of the package, or the detection information output from the sensor provided inside the vehicle or the like (for example, a camera).

In the information processing device according to the first aspect of the disclosure, the information acquisition unit may be configured to acquire information on a request history of the package requested with the inside of the vehicle, the building, or the facility as the delivery destination.

According to the first aspect of the disclosure, the information processing device can estimate the accommodation amount of the object currently accommodated inside the vehicle or the like, from a request frequency in a latest predetermined period, for example. Therefore, the information processing device can specifically grasp the accommodation amount of the object accommodated inside the vehicle or the like, based on the request history of the package requested with the inside of the vehicle or the like as the delivery destination.

In the information processing device according to the first aspect of the disclosure, the information acquisition unit may be configured to acquire information on a user's opening history of a door that allows access to the inside of the vehicle, the building, or the facility.

According to the first aspect of the disclosure, the information processing device can estimate the accommodation amount of the object currently accommodated inside the vehicle or the like, by grasping of the number of the delivered package or the like after a user's final opening of the door that allows the access to the inside of the vehicle or the like based on the request history of the package in the latest predetermined period, and the user's opening history of the door that allows the access to the inside of the vehicle or the like, for example. Further, the information processing device can take account of a package which is assumed to have been taken out from the inside of the vehicle or the like by the user. Therefore, the information processing device can grasp the accommodation amount of the object accommodated inside the vehicle or the like in a specific and more precise manner, based on a user's unlocking history of the door that allows the access to the inside of the vehicle or the like in addition to the request history of the package requested with the inside of the vehicle or the like as the delivery destination.

A second aspect of the disclosure relates to the information processing method executed by an information processing device configured to perform an operation of a delivery service in which an inside of a vehicle, a building, or a facility used by a user is designated as a delivery destination of a package, or perform a support of the operation. The information processing method includes acquiring information on an accommodation situation of an object accommodated inside the vehicle, the building, or the facility, and notifying the user of the accommodation situation based on the information acquired by the information acquisition.

A third aspect of the disclosure relates to the non-transitory computer-readable storage medium storing an information processing program causing an information processing device to execute a process, the information processing device being configured to perform an operation of a delivery service in which an inside of a vehicle, a building, or a facility used by a user is designated as a delivery destination of a package, or perform a support of the operation. The process includes acquiring information on an accommodation situation of an object accommodated inside the vehicle, the building, or the facility, and notifying the user of the accommodation situation based on the information acquired by the acquiring information.

A fourth aspect of the disclosure relates to the image acquisition method executed by a mobile terminal that is equipped with an imaging function and is carried by a deliverer of a company that operates a delivery service in which an inside of a vehicle, a building, or a facility used by a user is designated as a delivery destination of a package. The image acquisition method includes imaging the inside of the vehicle, the building, or the facility by the deliverer using the imaging function at a time of delivery of the package, and transmitting, to a predetermined external device, a capture image inside the vehicle, the building, or the facility captured by the imaging.

According to the fourth aspect of the disclosure, the image acquisition method can cause the mobile terminal to capture the image of the inside of the vehicle or the like and, for example, to transmit the image to the server of the delivery company or a server of a support company that supports the operation of the delivery service such as distributing the key information for unlocking the vehicle or the like. Therefore, the delivery company, the support company, or the like can provide the user with the image inside the vehicle or the like at the time of the delivery. Therefore, the image acquisition method can make the user grasp the accommodation situation of the object accommodated on the inside of the vehicle or the like which is the delivery destination of the package, via the server or the like of the delivery company or the support company.

In the image acquisition method according to the fourth aspect of the disclosure, the capture image may be transmitted to the external device that manages information on the vehicle, the building, or the facility by the transmitting.

According to the fourth aspect of the disclosure, the image acquisition method can cause the mobile terminal, for example, to transmit the capture image inside the vehicle or the like to the external device that manages the information on the vehicle or the like such as the key information for the delivery company to unlock the vehicle or the like at the time of the delivery, that is, the external device operated by the support company. Therefore, the image acquisition method can avoid a situation where the image of the inside of the vehicle or the like which is a user's private space is provided to the delivery company. Therefore, the image acquisition method can make the user grasp the accommodation situation of the object accommodated on the inside of the vehicle or the like which is the delivery destination of the package while paying attention to the user's privacy.

The image acquisition method according to the fourth aspect of the disclosure may further include deleting the capture image in the mobile terminal, when the capture image has been transmitted to the external device by the transmitting.

According to the fourth aspect of the disclosure, the image acquisition method can cause the mobile terminal to delete the image inside the vehicle or the like transmitted to the external device. Therefore, the image acquisition method can avoid a situation where the image of the inside the vehicle or the like which is the user's private space remains in the mobile terminal of the deliverer. Therefore, the image acquisition method can make the user grasp the accommodation situation of the object accommodated on the inside of the vehicle or the like which is the delivery destination of the package while paying attention to the user's privacy.

A fifth aspect of the disclosure relates to a non-transitory computer-readable storage medium storing an image acquisition program causing a mobile terminal to execute a process, the mobile terminal being equipped with an imaging function and being carried by a deliverer of a company that operates a delivery service in which an inside of a vehicle, a building, or a facility used by a user is designated as a delivery destination of a package. The process includes imaging the inside of the vehicle, the building, or the facility by the deliverer using the imaging function at a time of delivery of the package, and transmitting, to a predetermined external device, a capture image inside the vehicle, the building, or the facility captured by the imaging.

According to the aspects of the disclosure, it is possible to provide an information processing device, an information processing method, an image acquisition method, and a non-transitory computer-readable storage medium storing a program that can make the user grasp the accommodation situation of the object accommodated inside the vehicle or the like which is the delivery destination of the package, in the delivery service in which the inside of a vehicle or the like used by the user is designated as the delivery destination of the package.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 9 is a flowchart schematically illustrating a first example of a trunk accommodation situation notification processing by a center server;

FIG. 10 is a flowchart schematically illustrating a second example of the trunk accommodation situation notification processing by the center server; and FIG. 11 is a flowchart schematically illustrating a third example of the trunk accommodation situation notification processing by the center server.

DETAILED DESCRIPTION OF EMBODIMENTS

Hereinafter, modes for carrying out the disclosure will be described with reference to the drawings.

Overall Configuration of Authentication Key Management System

Figure 1:
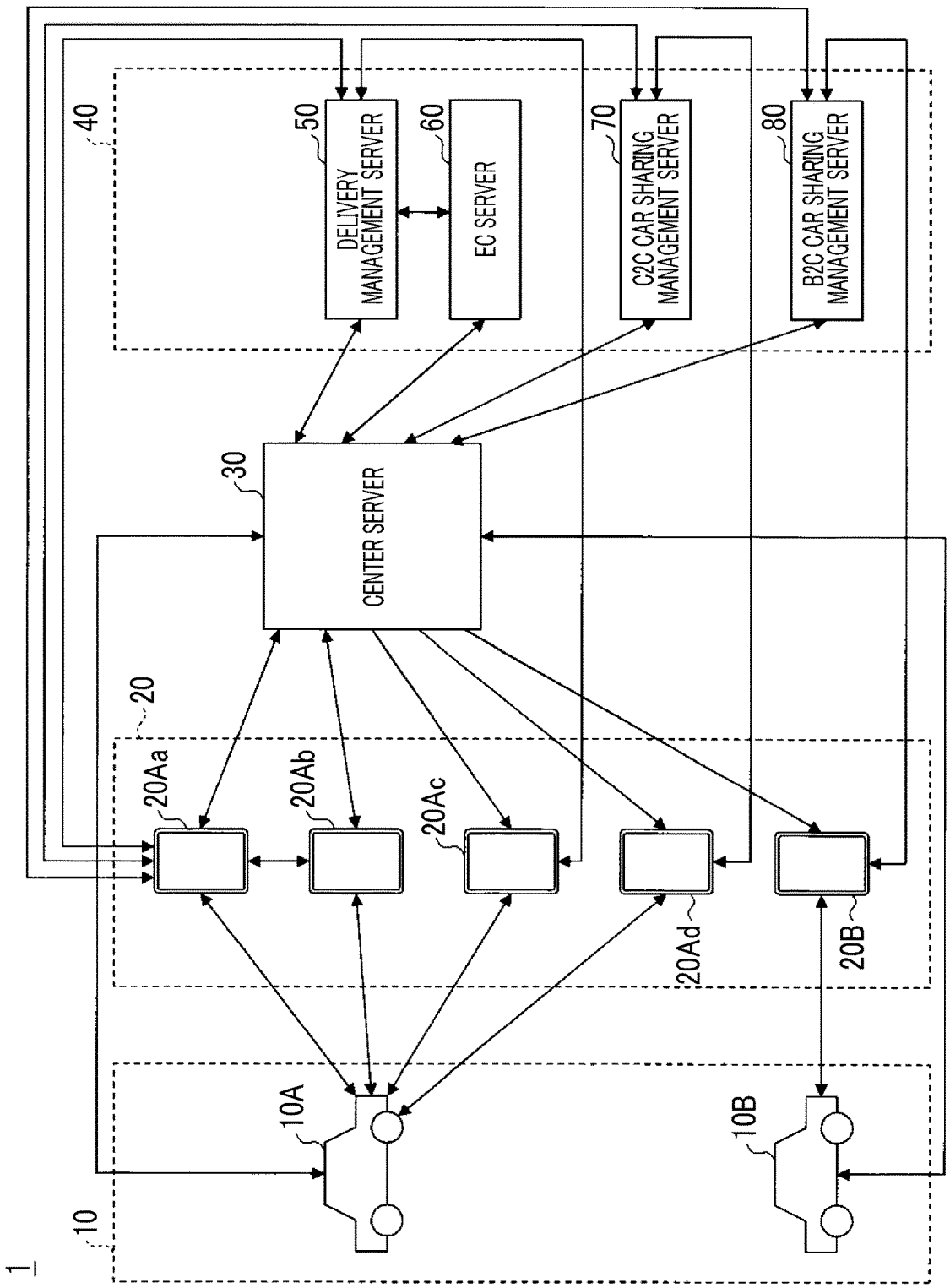
FIG. 1 is a diagram illustrating an example of an overall configuration of an authentication key management system.

FIG. 1 is a block diagram illustrating an example of an overall configuration of an authentication key management system 1 according to an embodiment.

The authentication key management system 1 includes a vehicle 10, a mobile terminal 20, a center server 30, and a service management server 40.

The vehicle 10 can perform wireless communication (hereinafter referred to as "near field communication") with the mobile terminal 20 at a relatively short distance (a distance that allows communication between the inside of a vehicle cabin and the outside of the vehicle cabin) according to a predetermined communication standard. The vehicle 10 is a target on which locking and unlocking of doors and activation (ignition on) of the vehicle 10 are performed based on transmission signals (an authentication request, a locking request, and an unlocking request to be described below) from the mobile terminal 20. The door of the vehicle 10 may include not only a door for getting on and off, but also a door for a package (for example, a trunk lid or a backdoor) that allows access to a trunk (a package room). The ignition on (IG-ON) of the vehicle 10 may include ON of a power supply to an electric motor in the vehicle 10 using the electric motor as a main power source, in addition to startup of an engine in the vehicle 10 using the engine as a main power source. Hereinafter, in the embodiment, description will be given on the premise that the vehicle 10 includes an engine 117 to be described below as a main power source, the activation (IG-ON) of the vehicle 10 corresponds to startup of the engine 117, and stopping (IG-OFF) of the vehicle 10 corresponds to stopping of the engine 117.

The vehicle 10 is communicably connected to the center server 30 over a predetermined communication network (for example, a mobile phone network or an Internet network in which a plurality of base stations is terminations). The vehicle 10 transmits vehicle information such as position information to the center server 30, as described below.

The vehicle 10 includes a vehicle 10A owned by an individual and a vehicle 10B owned by a company providing a business to consumer (hereinafter referred to as "B2C") car sharing service.

The mobile terminal 20 is communicably connected to the center server 30 over a predetermined communication network (for example, a mobile phone network or an Internet network in which a plurality of base stations is terminations). The mobile terminal 20 can unlock or lock the vehicle 10 by acquiring authentication key information (an example of key information. The authentication key information is hereinafter referred to as an "authentication key") distributed from the center server 30 and transmitting the acquired authentication key to the vehicle 10 through relatively short distance wireless communication according to a user's predetermined manipulation. The mobile terminal 20 may be, for example, a general-purpose mobile phone, a smartphone, or a tablet terminal. As will be described below, a predetermined application program (hereinafter referred to as a "key application") installed in a built-in processing device 23 is activated, and thereby, the above described function may be realized. The mobile terminal 20 may be a dedicated mobile terminal specialized for unlocking of the doors of the vehicle 10 and activation of the vehicle 10 by acquiring the authentication key from the center server 30 and using the acquired authentication key. The mobile terminal 20 includes mobile terminals 20Aa to 20Ad corresponding to the vehicle 10A and a mobile terminal 20B corresponding to the vehicle 10B.

The mobile terminal 20Aa is a mobile terminal carried by an owner (hereinafter referred to as an "owner user") among regular users of the vehicle 10A (hereinafter referred to as "regular users"). The mobile terminal 20Aa may bidirectionally communicate with the mobile terminal 20Ab through wireless communication at a relatively short distance.

The mobile terminal 20Ab is a mobile terminal carried by a regular user other than the owner user of the vehicle 10A (for example, including a family member of the owner user and a close friend of the owner user. The regular user is hereinafter referred to as a "sub-user").

The sub-user may include a user who does not drive the vehicle 10A or a user who cannot drive (for example, an owner user's child under 18 years of age). This is because, for example, when solely a vehicle cabin delivery service to be described below is used, the regular user does not need to drive the vehicle 10A.

The mobile terminal 20Ac is carried by a deliverer of a company that provides a vehicle cabin delivery service to be described below (hereinafter simply referred to as a "delivery company"). The mobile terminal 20Ac is communicably connected to the center server 30 and a delivery management server 50 to be described below over a predetermined communication network (for example, a mobile phone network or an Internet network in which a plurality of base stations is terminations).

The mobile terminal 20Ad is a mobile terminal carried by a borrower of the vehicle 10A in a consumer to consumer (hereinafter referred to as "C2C") car sharing service to be described below. The mobile terminal 20Ad is communicably connected to the center server 30 and a C2C car sharing management server 70 to be described below over the predetermined communication network (for example, a mobile phone network or an Internet network in which a plurality of base stations is terminations).

The mobile terminal 20B is a mobile terminal carried by the borrower of the vehicle 10B in a B2C car sharing service to be described below. The mobile terminal 20B is communicably connected to the center server 30 and a B2C car sharing management server 80 to be described below over the predetermined communication network (for example, a mobile phone network or an Internet network in which a plurality of base stations is terminations).

The center server 30 is communicably connected to the vehicle 10, the mobile terminal 20, and the service management server 40.

The center server 30 manages issuance of an authentication key of the vehicle 10. For example, the center server 30 issues the authentication key according to a predetermined condition and distributes the authentication key to the mobile terminal 20.

The center server 30 acquires position information of the vehicle 10 from the vehicle 10. Accordingly, the center server 30 can grasp the position of the vehicle 10.

The center server 30 operates the car sharing service for sharing the vehicle 10A among a plurality of regular users including the owner user of the vehicle 10A. Specifically, the center server 30 operates a service for sharing the authentication key of the vehicle 10A that each of a plurality of pre-registered regular users including the owner user can acquire in the mobile terminal 20 of the regular user (the mobile terminals 20Aa, 20Ab) (a key sharing service).

The center server 30 performs a registration processing (a use registration processing) of allowing the regular user of the vehicle 10A to use a service for using the vehicle 10A (a key sharing service, a vehicle cabin delivery service, a C2C car sharing service, or the like). Specifically, the center server 30 registers an authority to distribute the authentication key to the predetermined mobile terminal 20 (hereinafter referred to as an "authentication key arrangement authority") by a key sharing management unit 3207 or the service management server 40 to be described below transmitting an authentication key arrangement request to be described below in order for the regular user of the vehicle 10A to use the service for using the vehicle 10A.

The center server 30 manages a use situation of the vehicle 10A through a plurality of services (that is, a plurality of companies) through a vehicle cabin delivery service, a C2C car sharing service, and the like to be described below.

The service management server 40 operates and manages various services that are provided using the vehicle 10. The service management server 40 includes the delivery management server 50 and an electronic commerce (EC) server 60 corresponding to the vehicle cabin delivery service, a C2C car sharing management server 70 corresponding to the C2C car sharing service, a B2C car sharing management server 80 corresponding to the B2C car sharing service.

The vehicle cabin delivery service may include a delivery service in which a product ordered at an EC site to be described below is a delivery target, and a delivery service in which a product other than the product ordered at the EC site is a delivery target. For example, the vehicle cabin delivery service in which the product other than the product ordered at the EC site is the delivery target is a service in which the regular user of the vehicle 10A can change a delivery destination to the trunk of the vehicle 10A when there is a notification indicating that the package destined for a home is scheduled to be delivered, from the delivery management server 50 to the regular user of the vehicle 10A through an email, an account of social networking service (SNS), or a specific application program activated at mobile terminals 20Aa, 20Ab. Hereinafter, in the embodiment, description will be given while focusing on the vehicle cabin delivery service in which the product ordered at the EC site is the delivery target. An operation of each configuration related to the vehicle cabin delivery service to be described below can be appropriately applied to an operation of each configuration in the vehicle cabin delivery service in which the product other than the product ordered at the EC site is the delivery target.

The delivery management server 50 is communicably connected to the mobile terminal 20Ac and the center server 30 over a predetermined communication network, and performs an operation and management of a distribution system related to the vehicle cabin delivery service from reception of the package to the delivery of the package to the trunk of the vehicle 10A.

A delivery company operating the delivery management server 50 may provide the regular user of the vehicle 10A with a delivery service in which a vehicle cabin other than the trunk of the vehicle 10A can be designated as a delivery destination in place of the trunk of the vehicle 10A or in addition to the trunk of the vehicle 10A. Hereinafter A delivery service in which the vehicle cabin (that is, the inside of the vehicle 10A) including the trunk of the vehicle 10A can be designated as the delivery destination is referred to as a "vehicle cabin delivery service". The delivery company operating the delivery management server 50 may provide the regular user of the vehicle 10A with a pick-up service in which the vehicle cabin including the trunk can be designated as a package pick-up point (hereinafter referred to as a "vehicle cabin pick-up service"), as well as the vehicle cabin delivery service. That is, the delivery management server 50 may perform an operation and management of the vehicle cabin pick-up service in place of the vehicle cabin delivery service or in addition to the vehicle cabin delivery service. In this case, the package that is a pick-up target may be a product (that is, a product purchased at the EC site) returning to an operating company of the EC site corresponding to the EC server 60 (or a store opened at the EC site) or may be the package for delivery not related to the EC site. The vehicle cabin pick-up service may be realized as a pick-up service when a company (for example, a company for clothes cleaning) that provides a service in a form of temporarily keeping products from a customer keeps the package from the regular user of the vehicle 10A. In this case, a cleaning company or the like may provide a pick-up management server that operates and manages the vehicle cabin pick-up service, which can be included in the service management server 40, as in the delivery management server 50. That is, the pick-up management server may be provided, in place of the delivery management server 50 or in addition to the delivery management server 50. A recovery service in which the vehicle cabin of the vehicle 10A can be designated as a recovery point of articles that are recovery targets (hereinafter referred to as a "vehicle cabin recovery service") may be provided to the regular user of the vehicle 10A by a company that provides a service in a form of recovering predetermined articles (articles such as waste or a second-hand book desired to be purchased) from customers (for example, a waste recovery company or an antique purchase company). In this case, a recovery management server that operates and manages the trunk recovery service, which may be included in the service management server 40, may be provided by a waste recovery company or the like, similar to the delivery management server 50. That is, the recovery management server may be provided, in place of the delivery management server 50 or in addition to the delivery management server 50.

The EC server 60 is communicably connected to the center server 30 and the delivery management server 50 over a predetermined communication network, and operates a predetermined website (an EC site) for selling products or services. More specifically, the EC server 60 displays the trunk of the vehicle 10A as an option of the delivery destination on an order screen of the EC site, for regular users of the vehicle 10A and a delivery company (a delivery company corresponding to the delivery management server 50) that have been registered in advance. Accordingly, the regular user of the vehicle 10A can have the purchased product delivered to the trunk of the vehicle 10A even when the regular user is absent at the home.

The C2C car sharing management server 70 is communicably connected to the mobile terminal 20Ad and the center server 30, and performs an operation and management of the C2C car sharing service that support of lending and borrowing of the vehicle 10A between individuals. For example, the C2C car sharing management server 70 performs an operation and management of the C2C car sharing service such as reception of registration of a date and time when the vehicle 10A can be lent by the owner user, reception of reservation of use from a person who wants to borrow the vehicle 10A, and arrangement of the authentication key of the vehicle 10A. The C2C car sharing management server 70 may operate and manage the C2C trunk sharing service in an aspect in which the inside of the vehicle cabin of the vehicle 10A of an individual or the trunk thereof is lent as a temporary package storage place, a package delivery destination, or the like.

The B2C car sharing management server 80 is communicably connected to the mobile terminal 20B and the center server 30, and performs an operation and management of the B2C car sharing service in which the vehicle 10B owned by a predetermined company (for example, a company that provides the B2C car sharing service) is lent in an aspect in which the vehicle 10B can be shared among a plurality of general consumers. For example, the B2C car sharing management server 80 performs an operation and management of the B2C car sharing service such as reception of reservation of use of the vehicle 10B, and arrangement of a parking position of the vehicle 10B and the authentication key of the vehicle 10B. The B2C car sharing management server 80 may operate and manage the B2C trunk sharing service in an aspect in which the inside of the vehicle cabin of the vehicle 10B or the trunk is lent as a temporary package storage space or a package delivery destination.

A company car use management server that operates a car sharing service (a company car use management service) in which an employee of a company is a borrower, with the vehicle 10 as a company car of the company being a reservation of use target, may be included in the service management server 40, instead of the B2C car sharing management server 80 or in addition to the B2C car sharing management server 80. In this case, when there is an idle time period of the vehicle 10, which is the company car, the C2C car sharing management server 70 may operate the C2C car sharing service, with the vehicle 10 as a company car being a borrowing target. The delivery management server 50 and the EC server 60 may operate the vehicle cabin delivery service in which a delivery destination of the package to be delivered to a company can be designated as a trunk of the vehicle 10 that is a company car of the company.

Details of Configuration Regarding Locking, Unlocking, and Activation of Vehicle A configuration regarding locking, unlocking, and activation of vehicle 10 in the authentication key management system 1 will be described with reference to FIG. 2.

Figure 2:
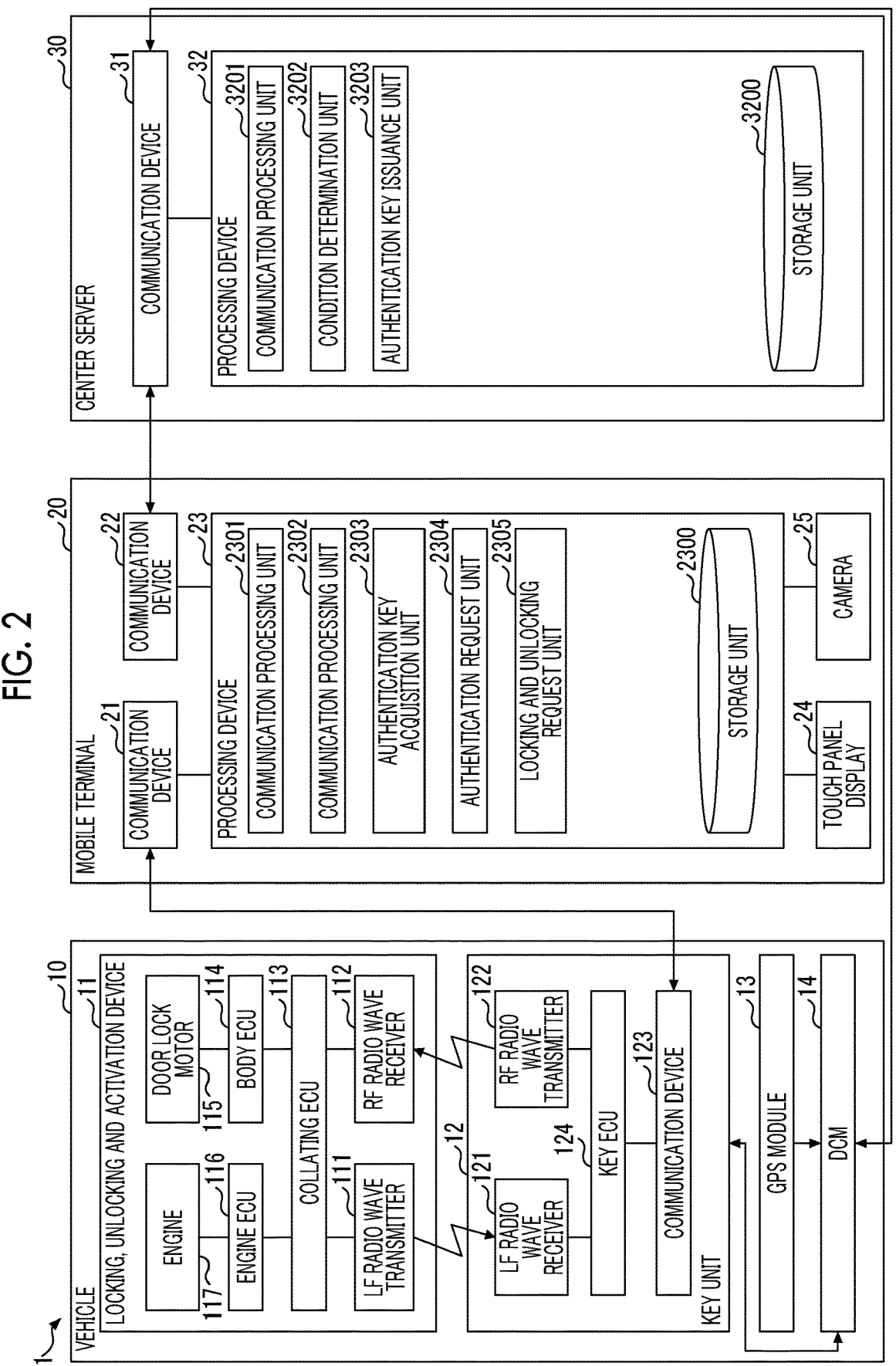
FIG. 2 is a diagram mainly illustrating an example of a configuration regarding locking and unlocking of a vehicle in the authentication key management system.

FIG. 2 is a diagram mainly illustrating an example of the configuration regarding locking, unlocking, and activation of the vehicle 10 in the authentication key management system 1. The vehicle 10 includes a locking, unlocking and activation device 11, a key unit 12, a global positioning system (GPS) module 13, and a data communication module (DCM) 14.

The locking, unlocking and activation device 11 is attached to the vehicle 10 and performs unlocking and locking of the doors of the vehicle 10 according to a locking signal and an unlocking signal to be transmitted as radio waves in a radio frequency (RF) band (for example, 300 MHz to 3 GHz) (hereinafter referred to as "RF radio waves") from the key unit 12. The locking, unlocking and activation device 11 activates the vehicle 10 according to exchange using radio waves in a low frequency (LF) band (for example, 30 Hz to 300 kHz) (hereinafter referred to as "LF radio waves") and RF radio waves with the key unit using a pressing manipulation of an activation switch (not illustrated) provided in the vehicle cabin of the vehicle 10 as a trigger. The locking, unlocking and activation device 11 includes an LF radio wave transmitter 111, an RF radio wave receiver 112, a collating electronic control unit (ECU) 113, a body ECU 114, a door lock motor 115, an engine ECU 116, and the engine 117 as a driving power source of the vehicle 10.

The locking, unlocking and activation device 11 operates with power supplied from an auxiliary battery (not illustrated) mounted on the vehicle 10.

The LF radio wave transmitter 111 is embedded into, for example, a center console or a door handle in the vehicle cabin, and transmits LF radio waves under the control of the collating ECU 113.

The RF radio wave receiver 112 is provided, for example, in a trim of a package room of the vehicle 10 and receives RF radio waves under the control of the collating ECU 113.

The collating ECU 113 is an electronic control unit that controls locking and unlocking of the doors of the vehicle 10 and activation of the vehicle 10 based on exchange of signals with the key unit 12. The collating ECU 113 is realized by any hardware, any software, or a combination of any hardware and any software. For example, the collating ECU 113 is configured mainly of a microcomputer includes a central processing unit (CPU), a random access memory (RAM), a read only memory (ROM), an auxiliary storage device, a real time clock (RTC), and a communication interface. The collating ECU 113 realizes various control processing by executing various programs stored in the ROM or the auxiliary storage device on the CPU. Hereinafter, the same applies to the key ECU 124 to be described below.

The collating ECU 113 receives an unlocking signal and a locking signal transmitted as RF radio waves from the key unit 12 using the RF radio wave receiver 112.

When the collating ECU 113 receives the unlocking signal or the locking signal, the collating ECU 113 performs authentication of a transmission source (the key unit 12) of the unlocking signal or the locking signal based on key information included in the unlocking signal or the locking signal (hereinafter referred to as "internal key information"). For example, when the internal key information registered in an internal memory such as an auxiliary storage device in advance matches the internal key information included in the unlocking signal or the locking signal, the collating ECU 113 determines that the authentication is successful, and when the internal key information registered in the internal memory such as the auxiliary storage device in advance does not match the internal key information included in the unlocking signal or the locking signal, the collating ECU 113 determines that the authentication fails.

For example, the collating ECU 113 may transmit LF radio waves including a "challenge" created in a predetermined method using the internal key information of the internal memory from the LF radio wave transmitter 111 to the key unit 12 and perform challenge response authentication based on a "response" replied from the key unit 12, which is received from the RF radio wave receiver 112.

When the authentication is successful, the collating ECU 113 transmits an unlocking command (upon reception of the unlocking signal) or a locking command (upon reception of the locking signal) to the body ECU 114 via an in-vehicle network such as a controller area network (CAN).

After the transmission of the unlocking command or the locking command to the body ECU 114, when a reply that the door is normally unlocked or locked (an unlock reply or a lock reply) is received from the body ECU 114 via the in-vehicle network such as the CAN, the collating ECU 113 transmits the notification (an unlock notification or a lock notification) to the key unit 12 indicating that the door is unlocked or locked via the LF radio wave transmitter 111.

As will be described below, in the unlocking signal, solely some of the doors of the vehicle 10 may be designated as unlocked targets. In this case, the collating ECU 113 designates the door as an unlocked target in the unlocking command.

Accordingly, the body ECU 114 can operate solely the door lock motor 115 corresponding to some designated doors and unlock solely some doors.

When the above described activation switch is manipulated to be pressed, the collating ECU 113 performs authentication of the key unit 12 by exchanging signals with the key unit 12 using the LF radio wave transmitter 111 and the RF radio wave receiver 112.

For example, the collating ECU 113 transmits a request signal in an LF band from the LF radio wave transmitter 111 to the key unit 12 to request reply of the internal key information. When a response signal including the internal key information is received from the key unit 12 by the RF radio wave receiver 112, the collating ECU 113 determines authentication success or authentication failure based on matching between the internal key information registered in the internal memory in advance and the internal key information included in the response signal, as in the case of locking and unlocking the doors.

For example, the collating ECU 113 may perform challenge response authentication, as in the case of locking and unlocking of doors.

When the authentication has succeeded, the collating ECU 113 transmits a startup command of the engine 117 to the engine ECU 116 through the in-vehicle network such as the CAN.

The body ECU 114 is an electronic control unit that performs operation control of the door lock motor 115 that is communicably connected via a one-to-one communication line or the like. The body ECU 114 outputs a control command to cause the door lock motor 115 to perform an unlocking operation according to the unlocking command from the collating ECU 113. The body ECU 114 outputs a control command to cause the door lock motor 115 to perform a locking operation according to the locking command from the collating ECU 113. In addition, when the door is normally unlocked or locked by the output of the control command to the door lock motor 115, the body ECU 114 transmits the unlock reply or the lock reply to the collating ECU 113 via the in-vehicle network such as the CAN.

The door lock motor 115 is a known electric actuator that unlocks and locks the doors of the vehicle 10 according to the control command from the body ECU 114.

The engine ECU 116 is an electronic control unit that drives and controls the engine 117. Specifically, the engine ECU 116 drives and controls various actuators such as a starter or an injector, which are mounted on the engine 117. When the startup command is input from the collating ECU 113, the engine ECU 116 outputs a control command to various actuators such as a starter or an injector of the engine 117 to start up the engine 117.

The key unit 12 is disposed in the vehicle cabin of the vehicle 10 and transmits the unlocking signal and the locking signal as RF radio waves to the locking, unlocking and activation device 11 according to of the unlocking request and the locking request transmitted from the mobile terminal 20. The key unit 12 performs exchange of signals with the locking, unlocking and activation device 11 according to the signal in the LF band transmitted from the locking, unlocking and activation device 11 when the activation switch provided in the vehicle cabin of the vehicle 10 is manipulated to be pressed. The key unit 12 includes an LF radio wave receiver 121, an RF radio wave transmitter 122, a communication device 123, and a key ECU 124.

The key unit 12 may be disposed at a position (for example, a glove box, or the inside of a center console box) at which it is difficult for users seated on respective seats of the vehicle 10 to visually recognize the key unit 12. The key unit 12 may be fixed or may not be fixed to the vehicle 10. The key unit 12 may be operated by a built-in button battery or the like or may be operated by power supplied from an auxiliary battery mounted on the vehicle 10.

The LF radio wave receiver 121 receives the LF radio waves under the control of the key ECU 124.

The RF radio wave transmitter 122 transmits RF radio waves under the control of the key ECU 124.

The communication device 123 is any device that performs near field communication with the mobile terminal 20 under the control of the key ECU 124. The communication device 123 may be, for example, a BLE communication module that performs communication with the mobile terminal 20 in compliance with a Bluetooth (registered trademark) low energy (BLE) communication standard. Hereinafter, description will be given on the premise that a communication standard adopted in the communication device 123 conforms to BLE communication.

The communication device 123 may be a communication device conforming to a short-range communication standard having a very short communicable distance, such as a near field communication (NFC) standard. In this case, the communication device 123 may be built-in one, for example, at a position (for example, the inside of the door handle) close to a body surface of the vehicle 10 outside the vehicle cabin. Accordingly, the key unit 12 (the key ECU 124) can communicate with the mobile terminal 20 outside the vehicle cabin even when the communicable distance of the communication device 123 is very short.

The key ECU 124 is an electronic control unit that performs a control processing of transmitting a locking signal and an unlocking signal to the locking, unlocking and activation device 11 according to the unlocking request and the locking request received from the mobile terminal 20.

The key ECU 124 controls the communication device 123 and establishes a state in which communication according to a predetermined communication standard with the mobile terminal 20, such as a BLE communication standard is possible.

Specifically, the key ECU 124 periodically (for example, every several seconds) transmits an advertising packet including advertisement information reachable in a predetermined communication range (for example, several meters to tens of meters) from the communication device 123. The advertisement information includes a universally unique identifier (UUID) corresponding to the key unit 12, a device identifier (ID), and the like. Accordingly, the mobile terminal 20 can identify the key unit 12 mounted on the vehicle 10 that is a target by receiving the advertising packet and confirming the advertisement information.

When a connection request for requesting connection based on the BLE communication is received from the mobile terminal 20 present in a communication range of the vehicle 10 (the key unit 12) that has received the advertising packet, the key ECU 124 establishes a state in which BLE communication between the mobile terminal 20 and the vehicle 10 (the key unit 12) is possible. In this case, the key ECU 124 transmits a connection response indicating that the state in which the BLE communication is possible has been established, to the mobile terminal 20 via the communication device 123.

The key ECU 124 receives an authentication request including an authentication key associated with the key unit 12 from the mobile terminal 20 via the communication device 123 in a state in which the above described BLE communication is established.

When the authentication request including the authentication key associated with the key unit 12 is received from the mobile terminal 20, the key ECU 124 performs authentication of the mobile terminal 20 based on the authentication key. When the authentication has been successful, the key ECU 124 restores the internal key information stored in an internal memory such as an auxiliary storage device to a usable state. The internal key information is stored in a state in which the internal key information cannot be used for authentication in the locking, unlocking and activation device 11, for example, due to a state in which the internal key information is not accessible or a state in which the internal key information has been encrypted. Therefore, when the authentication of the mobile terminal 20 has been successful, the key ECU 124, for example, performs changing of an authority to access the internal memory for changing the key information to an accessible state, or decodes encrypted internal key information based on the authentication key. Accordingly, the key ECU 124 can access the internal key information which is not normally accessible to transmit an unlocking signal or a locking signal including the internal key information to the locking, unlocking and activation device 11 or transmit an unlocking signal or a locking signal including decoded internal key information to the locking, unlocking and activation device 11. Therefore, the locking, unlocking and activation device 11 can perform appropriate authentication based on the internal key information included in the unlocking signal and the locking signal. Even when a situation in which a malicious third party illegally obtains the key unit 12 occurs, the internal key information in the key unit 12, for example, is not accessible or is encrypted, occurrence of theft of the vehicle 10 can be suppressed.

The key ECU 124 receives the unlocking request and the locking request from the mobile terminal 20 via the communication device 123 in a state in which the above described BLE communication is established. When the authentication of the mobile terminal 20 is successful (specifically, a state in which the BLE communication has been established is kept after the authentication of the mobile terminal 20 has been successful) and the key ECU 124 has received the unlocking request or the locking request from the mobile terminal 20, the key ECU 124 transmits the unlocking signal or the locking signal including locking and unlocking key information to the locking, unlocking and activation device 11 via the RF radio wave transmitter 122.

Accordingly, unlocking or locking of the doors of the vehicle 10 is realized after an authentication processing in the locking, unlocking and activation device 11.

Further, after the transmission of the unlocking signal to the locking, unlocking and activation device 11, when the unlock notification is received from the locking, unlocking and activation device 11 via the LF radio wave receiver 121, the key ECU 124 transmits an unlock completion notification to the mobile terminal 20 for which the BLE communication is established, that is, the mobile terminal 20 as the transmission source of the unlocking request, via the communication device 123. Similarly, after the transmission of the locking signal to the locking, unlocking and activation device 11, when the lock notification is received from the locking, unlocking and activation device 11 via the LF radio wave receiver 121, the key ECU 124 transmits a lock completion notification to the mobile terminal 20 for which the BLE communication is established, via the communication device 123. As a result, the mobile terminal 20 which is the transmission source of the locking request or the unlocking request based on the user's predetermined manipulation can grasp that the locking and unlocking of the vehicle 10A has been normally completed.

As described above, the key ECU 124 performs exchange of signals with the locking, unlocking and activation device 11 according to a signal in the LF band transmitted from the locking, unlocking and activation device 11 when the activation switch provided in the vehicle cabin of the vehicle 10 is manipulated to be pressed.

For example, when the request signal is received from the locking, unlocking and activation device 11 by the LF radio wave receiver 121, the key ECU 124 transmits a response signal including the internal key information stored in the internal memory or the like to the locking, unlocking and activation device 11 via the RF radio wave transmitter 122.

For example, when the LF radio waves including the "challenge" are received from the locking, unlocking and activation device 11 by the LF radio wave receiver 121, the key ECU 124 generates a "response" based on the internal key information and transmits the response to the locking, unlocking and activation device 11 via the RF radio wave transmitter 122.

Accordingly, after the authentication processing in the locking, unlocking and activation device 11, the startup of the engine 117 is realized.

An authority regarding a function of locking, unlocking, or activating the vehicle 10 imparted by the center server 30 may be defined in the authentication key.

For example, when the authentication key has solely the authority to unlock some of the doors of the vehicle 10, the key ECU 124 transmits an unlocking signal including information for designating the door to be unlocked to the key unit 12 via the RF radio wave transmitter 122. Accordingly, solely some of the doors of the vehicle 10 can be unlocked as described above.

For example, when the authentication key does not have the authority to activate the engine 117, the key ECU 124 may not perform exchange with the locking, unlocking and activation device 11 even when the signal in the LF band from the locking, unlocking and activation device 11 based on a pressing manipulation of the activation switch is received by the LF radio wave receiver 121. Accordingly, it is possible to prohibit the activation of the engine 117 according to the authority of the authentication key.

The GPS module 13 receives GPS signals transmitted from three or more satellites and, desirably, four or more satellites over the vehicle 10, and measures a position of the vehicle 10. The GPS module 13 is communicably connected to the DCM 14 or the like via a one-to-one communication line or an in-vehicle network such as a CAN, and the measured position information of the vehicle 10 is input to the DCM 14 or the like.

The DCM 14 is a communication device that bidirectionally communicates with the center server 30 over a predetermined communication network. The DCM 14 transmits current position information of the vehicle 10 input from the GPS module 13 to the center server 30 at a predefined timing or according to a request from the center server 30, or the like. The DCM 14 transmits, to the center server 30, various types of vehicle information (for example, information indicating that unlocking of the door of the vehicle 10 or activation of the vehicle 10 is performed based on the authentication key, which is acquired from the key unit 12) that can be acquired over an in-vehicle network such as a CAN at a predefined timing or according to a request from the center server 30 or the like.

The mobile terminal 20 includes a communication device 21, a communication device 22, a processing device 23, a touch panel display (hereinafter simply referred to as a "display") 24, and a camera 25.

The communication device 21 is any device that performs near field communication with the mobile terminal 20 according to the same communication standard as that of the communication device 123. As described above, in the case of the embodiment, the communication device 21 is, for example, a BLE communication module.

The communication device 22 is any device that communicates with the center server 30, the service management server 40, or the like over a predetermined communication network. The communication device 22 is a mobile communication module corresponding to a communication standard such as Long Term Evolution (LTE), 4th Generation (4G), or 5th Generation (5G).

The processing device 23 performs the various control processing in the mobile terminal 20. The functions of the processing device 23 may be realized by any hardware, any software, or a combination of any hardware and any software, and includes, for example, a CPU, a RAM, a ROM, an auxiliary storage device, an RTC, and various interfaces for communication. The processing device 23 includes, for example, a communication processing unit 2301, a communication processing unit 2302, an authentication key acquisition unit 2303, an authentication request unit 2304, and a locking and unlocking request unit 2305 as functional units that are realized by executing one or more programs stored in the ROM or the auxiliary storage device on the CPU. The processing device 23 includes, for example, a storage unit 2300 that is realized as a storage area in the auxiliary storage device, and processing of storing various pieces of data in the storage unit 2300 is realized by a predetermined program stored in the ROM or the auxiliary storage device.

The communication processing unit 2301 performs bidirectional near field communication with the key unit 12 using the communication device 21 and performs transmission and reception of various signals.

The communication processing unit 2302 connects to the predetermined communication network using the communication device 22 and transmits and receives various signals such as a data signal or a control signal to and from the center server 30, the service management server 40, and the like.

The authentication key acquisition unit 2303 acquires the authentication key from the center server 30, for example, according to the user's predetermined manipulation with respect to a predetermined graphical user interface (GUI) displayed on the display 24, and stores the acquired authentication key in the storage unit 2300. Hereinafter, the description will be given on the premise that various manipulations with respect to the mobile terminal 20 are performed by a manipulation with respect to the GUI displayed on the display 24 linking to the operation of the key application.

For example, the authentication key acquisition unit 2303 of the mobile terminal 20Aa transmits an authentication key acquisition request to the center server 30 via the communication processing unit 2302. Accordingly, the center server 30 receives the authentication key acquisition request, and issues the authentication key when the center server 30 determines that the authentication key acquisition request is a regular authentication key acquisition request. The authentication key acquisition unit 2303 acquires the authentication key distributed from the center server 30 via the communication processing unit 2302.

For example, the authentication key acquisition unit 2303 of the mobile terminal 20Ab acquires the authentication key distributed from the center server 30 to the mobile terminal 20Ab via the communication processing unit 2302 according to a key sharing request (to be described below) transmitted from the mobile terminal 20Aa to the center server 30.

The authentication key acquisition unit 2303 of the mobile terminal 20Ab may transmit the authentication key acquisition request by itself to the center server 30 via the communication processing unit 2302. In this case, when the center server 30 receives the authentication key acquisition request from the mobile terminal 20Ab, the center server 30 may perform an inquiry about whether or not to permit distribution of the authentication key to the mobile terminal 20Aa of the owner user.

For example, the authentication key acquisition unit 2303 of each of the mobile terminals 20Ac, 20Ad, 20B transmits an authentication key acquisition request to the delivery management server 50, the C2C car sharing management server 70, and the B2C car sharing management server 80 to request acquisition of the authentication key. Accordingly, the delivery management server 50, the C2C car sharing management server 70, and the B2C car sharing management server 80 transmit an authentication key arrangement request to the center server 30 according to reception of the authentication key acquisition request, and the center server 30 issues the authentication key according to reception of the authentication key arrangement request. The authentication key acquisition unit 2303 acquires an authentication key that is distributed from the center server 30 via the communication processing unit 2302.

The authentication key acquisition unit 2303 of the mobile terminals 20Ac, 20Ad, 20B may transmit the authentication key acquisition request to the center server 30 via the communication processing unit 2302. In this case, the center server 30 may perform an inquiry of the delivery management server 50, the C2C car sharing management server 70, and the B2C car sharing management server 80 to determine whether or not the authentication key acquisition request is a regular authentication key acquisition request.

The authentication request unit 2304 transmits an authentication request to the key unit 12 of the vehicle 10 via the communication processing unit 2301 to request authentication of the mobile terminal 20 serving as a remote manipulation unit for locking and unlocking the doors of the vehicle 10. For example, when the authentication request unit 2304 finds a key unit corresponding to the authentication key, and specifically, when an advertising packet corresponding to the key unit 12 is received by the communication processing unit 2301, the authentication request unit 2304 may transmit the authentication request to the key unit 12. For example, the authentication request unit 2304 may transmit the authentication request to the key unit 12 according to a predetermined manipulation by the user.

The locking and unlocking request unit 2305 transmits an unlocking request including an authentication key or a locking request including the authentication key to the key unit 12 via the communication processing unit 2301 according to the predetermined manipulation by the user. Accordingly, even when the unlocking request or the locking request has been transmitted to the key unit 12 before the authentication request is transmitted by the authentication request unit 2304, locking and unlocking of the door of the vehicle 10 based on the authentication processing in the key unit 12 can be realized. For example, an unlocking button for requesting unlocking of the vehicle 10 and a locking button for requesting locking of the vehicle 10 may be drawn in a GUI serving as a manipulation screen of the display 24, a locking request may be transmitted when the locking button is manipulated to be touched, and an unlocking request may be transmitted when the unlocking button is manipulated to be touched. The locking request and the unlocking request may be transmitted by a manipulation with respect to a predetermined manipulation unit by hardware provided in the mobile terminal 20.

For example, the functions of the authentication key acquisition unit 2303, the authentication request unit 2304, and the locking and unlocking request unit 2305 may be available to the user by a predetermined application program installed in the ROM of the processing device 23, the auxiliary storage device, or the like being activated. Hereinafter, the description will be given on the premise that the functions of the authentication key acquisition unit 2303, the authentication request unit 2304, and the locking and unlocking request unit 2305 of the processing device 23 are available to the user by the key application already installed in the processing device 23 (the auxiliary storage device or the ROM) being activated.

The display 24 is, for example, a liquid crystal display or an organic electroluminescence (EL) display, and is a display device which is provided on a front surface of the mobile terminal 20 and also serving as a known touch panel type manipulation unit.

In accordance with the user's predetermined manipulation, the camera 25 captures the image around the mobile terminal 20 at a predetermined angle of view as viewed from a lens provided on the front surface or a rear surface of the mobile terminal 20. The capture image captured by the camera 25 is input to the processing device 23.

The center server 30 includes a communication device 31 and a processing device 32.

The functions of the center server 30 may be shared and realized by a plurality of servers. Hereinafter, the same applies to the delivery management server 50, the EC server 60, the C2C car sharing management server 70, and the B2C car sharing management server 80.

The communication device 31 is any device that performs bidirectional communication with each of the vehicle 10, the mobile terminal 20, and the service management server 40 over a predetermined communication network.

The processing device 32 performs the various control processing in the center server 30. The functions of the processing device 32 may be realized by any hardware, any software, or a combination of any hardware and any software, and the processing device 32 is mainly configured of one or a plurality of server computers including, for example, a CPU, a RAM, a ROM, an auxiliary storage device, an RTC, and a predetermined communication interface. Hereinafter, the same applies to processing devices 52, 62, 72, 82 to be described below of the delivery management server 50, the EC server 60, the C2C car sharing management server 70, and the B2C car sharing management server 80. The processing device 32 includes, for example, a communication processing unit 3201, a condition determination unit 3202, and an authentication key issuance unit 3203 as functional units that are realized by executing one or more programs stored in the ROM or the auxiliary storage device on the CPU. The processing device 32 includes, for example, a storage unit 3200 that is realized as a storage area defined in an auxiliary storage device of a server computer or an external storage device connected to the server computer, and the processing in which various pieces of data are stored in the storage unit 3200 is realized by a program stored in the ROM or the auxiliary storage device. Hereinafter, the same applies to the storage units 520, 620, 720, 820 to be described below.

The communication processing unit 3201 controls the communication device 31 to perform exchange of various signals such as control signals and information signals with the vehicle 10, the mobile terminal 20, and the service management server 40.

The condition determination unit 3202 determines whether or not the authentication key acquisition request or the authentication key arrangement request is a regular authentication key acquisition request or a regular authentication key arrangement request according to reception of an authentication key acquisition request from the mobile terminal 20 or an authentication key arrangement request from the service management server 40 received by the communication processing unit 3201.

When the condition determination unit 3202 determines that the authentication key acquisition request or the authentication key arrangement request is the regular one, the authentication key issuance unit 3203 specifies a specification of the authentication key to be issued and issues an authentication key corresponding to the specified specification. For example, the authentication key issuance unit 3203 specifies the vehicle 10 that is a target of locking and unlocking using the authentication key or the key unit 12 corresponding to the vehicle 10. For example, the authentication key issuance unit 3203 specifies the authority of the authentication key regarding a period of time in which the authentication key is valid (available) and the number of times the authentication key is available. For example, the authentication key issuance unit 3203 specifies the authority of the authentication key regarding the unlocking or activation of the vehicle 10, such as lockable and unlockable doors and whether or not the vehicle 10 can be activated. For example, the authentication key issuance unit 3203 specifies the authority of the authentication key regarding the temporary key sharing, such as whether or not the authentication key can be shared with another mobile terminal 20 through a temporary key sharing to be described below, a period of time in which the authentication key can be shared with the other mobile terminal 20, and the number of times the authentication key can be shared with the other mobile terminal 20. Hereinafter, the authority of the authentication key regarding the period of time in which the authentication key is available, the number of times the authentication key is available, and the like, the authority of the authentication key regarding the unlocking or activation of the vehicle 10, and the authority of the authentication key regarding the temporary key sharing are collectively simply referred to as "various authorities of the authentication key". The authentication key issuance unit 3203 distributes the authentication key issued to the mobile terminal 20 that is a target via the communication processing unit 3201.

Details of Configuration Regarding Key Sharing Service

A configuration regarding the key sharing service in the authentication key management system 1 will be described with reference to FIG. 3.

Figure 3:
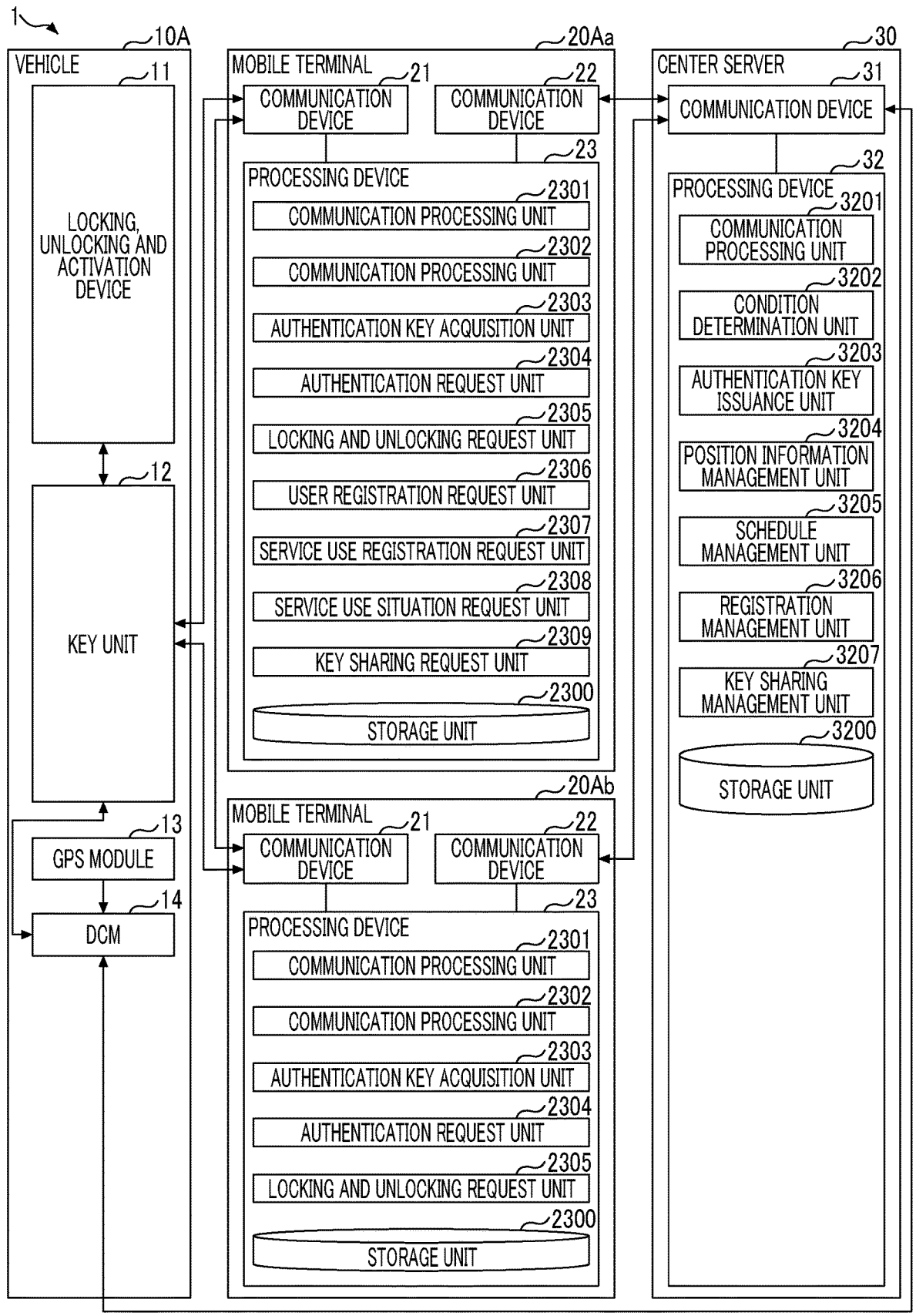
FIG. 3 is a diagram mainly illustrating an example of a configuration regarding a key sharing service in the authentication key management system.

FIG. 3 is a diagram mainly illustrating an example of a configuration regarding the key sharing service in the authentication key management system 1. Hereinafter, a configuration regarding the key sharing service in the authentication key management system 1 will be mainly described with reference to FIG. 3, and duplicate description on the configuration overlapping the configuration regarding locking, unlocking, and activation of the vehicle 10 described above will be omitted as much as possible. Hereinafter, the same applies to description of FIGS. 4 to 6.

The processing device 23 of the mobile terminal 20Aa carried by the owner user of the vehicle 10A includes the communication processing unit 2301, the communication processing unit 2302, the authentication key acquisition unit 2303, the authentication request unit 2304, and the locking and unlocking request unit 2305, as described above. The processing device 23 of the mobile terminal 20Aa further includes a user registration request unit 2306, a service use registration request unit 2307, a service use situation request unit 2308, and a key sharing request unit 2309 as functional units that are realized by executing one or more programs stored in the ROM or the auxiliary storage device on the CPU.

In the embodiment, the description will be given on the premise that the functions of the user registration request unit 2306, the service use registration request unit 2307, the service use situation request unit 2308, and the key sharing request unit 2309 of the mobile terminal 20Aa are available to the owner user by the key application being activated and the user authentication based on bidirectional communication with the center server 30 being successful. The description will be given on the premise that the user authentication is performed by the center server 30 based on an ID defined for the owner user (hereinafter referred to as an "owner user ID") in advance and a password corresponding to the owner user ID.

The user registration request unit 2306 requests the center server 30 to register the regular user of the vehicle 10A that uses various services (the key sharing service, the vehicle cabin delivery service, the C2C car sharing service, and the like) for using the vehicle 10A, according to a predetermined manipulation by the owner user. For example, the user registration request unit 2306 transmits a user registration request including an owner user ID and a password and attribute information (for example, a name, age, and relationship with the owner user) for specifying a sub-user who is a registration target to the center server 30 via the communication processing unit 2302.

When a notification indicating that registration of the sub-user has been completed (a user registration completion notification) is received from the center server 30 by the communication processing unit 2302, the user registration request unit 2306 stores an ID (hereinafter referred to as a "sub-user ID") and a password of the sub-user included in the user registration completion notification in the storage unit 2300. In this case, the user registration request unit 2306 may transmit the sub-user ID and the password to the mobile terminal 20Ab carried by the registered sub-user via the communication processing unit 2301 according to a predetermined manipulation by the owner user.

The service use registration request unit 2307 requests the center server 30 to perform registration of use of various services for using the vehicle 10A by the regular user of the vehicle 10A according to a predetermined manipulation by the owner user. That is, the service use registration request unit 2307 requests registration of the authentication key arrangement authority of the key sharing management unit 3207 or the service management server 40 corresponding to various services for allowing regular users of the vehicle 10A to use various services, as described above. For example, the service use registration request unit 2307 transmits a service use registration request including the owner user ID and the password, the information for specifying the vehicle 10A to be used for various services, the information for specifying the service that is a target, and the ID of the regular user who uses the target service (the owner user ID or the sub-user ID) to the center server 30 via the communication processing unit 2302. Hereinafter, the owner user ID and the sub-user ID may be collectively referred to as a "regular user ID". Accordingly, the service use registration request unit 2307 can register a sub-user who uses the key sharing service in the center server 30.

The service use registration request unit 2307 receives a notification that the use registration of the service based on the service use registration request has been completed from at least one of the center server 30 and the service management server 40 through the communication processing unit 2302. The service use registration request unit 2307 causes the display 24 to display an indication that the use registration of the specific service by the regular user of the vehicle 10A based on the predetermined manipulation by the owner user has been completed. Accordingly, the owner user can grasp that the use registration of the specific service by the regular user has been completed.

The service use situation request unit 2308 requests the center server 30 to provide information on the use situation of various services (service use situation information) including the key sharing service by the regular user of the vehicle 10A for which the use registration has been completed in a form corresponding to the owner user ID according to a predetermined manipulation by the owner user. For example, the service use situation request unit 2308 transmits a service use situation request including the owner user ID and the password to the center server 30 via the communication processing unit 2302. When the service use situation information received from the center server 30 by the communication processing unit 2302 is received, the service use situation request unit 2308 displays the service use situation information on the display 24. Accordingly, the owner user can centrally grasp the information on the use situation of each service by each of the regular users registered for use in the center server 30 in an aspect in which the information is linked to the owner user ID.

The key sharing request unit 2309 requests the center server 30 to distribute the authentication key for performing locking, unlocking or activating of the vehicle 10A to the sub-user registered for use in the key sharing service according to a predetermined manipulation by the owner user. For example, the key sharing request unit 2309 transmits a key sharing request including an owner user ID and a password, information for specifying the vehicle 10A that is a locking and unlocking target by the authentication key, and information (for example, a sub-user ID) for specifying the sub-user that is a distribution (share) target of the authentication key to the center server 30 via the communication processing unit 2302. When the key sharing request unit 2309 transmits the key sharing request, use period information (for example, a date and time of use start and a date and time of use end) regarding a period of time in which the authentication key set and distributed by a predetermined manipulation by the owner user is available may be included in the key sharing request. The key sharing request may include authority information on various authorities of the authentication key, such as an authority of the authentication key regarding a period of time in which the authentication key is available or the number of times the authentication key is available, an authority of the authentication key regarding the unlocking or activation of the vehicle, and an authority of the authentication key regarding temporary key sharing to be described below, which can be designated according to the predetermined manipulation by the owner user. Accordingly, as described below, when the authentication key available at the same time is shared among the mobile terminals 20, the owner user can appropriately set authority information such that use of the vehicle 10A by a user other than the owner user can be limited. Therefore, security of the vehicle 10A can be improved.

The key sharing request unit 2309 may set the mobile terminals 20 (that is, at least one of the mobile terminals 20Aa, 20Ab) of a plurality of regular users of the vehicle 10A as distribution targets and request the center server 30 to distribute the authentication key of which the periods of time in which the authentication key is available overlap according to the predetermined manipulation by the owner user. That is, in the key sharing request, the regular users that are authentication key distribution targets may be designated, or the owner users may be included among the regular users. In the key sharing request, the period of time in which the authentication key is available for each of the designated regular users may overlap. Accordingly, the authentication key of the vehicle 10A available at the same time can be shared by the regular users. Therefore, for example, when a plurality of persons gets on the vehicle 10A together and go out for travel, camp, or the like, each of passengers can lock and unlock the vehicle 10A without lending and borrowing the mobile terminal 20 in which the authentication key has been stored, and therefore, convenience for users can be improved.

Even when the key sharing request unit 2309 may share the distributed authentication key with another mobile terminal 20 (that is, the mobile terminal 20 in which the key application is installed) according to a predetermined manipulation by the owner user (hereinafter, a sharing aspect of the authentication key will be referred to as "temporary key sharing"). In the above described case, the other mobile terminal 20 may be the mobile terminal 20Ab of the sub-user or may be the user's mobile terminal 20 other than the sub-user, that is, a user temporarily using the vehicle 10A.

For example, the key sharing request unit 2309 transmits the authentication key (more specifically, a copy of the authentication key) to another mobile terminal 20 via the communication processing unit 2301. Accordingly, the owner user of the vehicle 10A can share the authentication key with the other user even when a plurality of persons suddenly gets on the vehicle 10A together and goes out for traveling or the like. It is possible to share the authentication key available at the same time with the other mobile terminal 20 directly from the mobile terminal 20Aa. Accordingly, for example, even when the mobile terminal 20Aa is at a place at which a communication situation in a wireless mobile communication network is poor or out of a communication range, the owner user of the vehicle 10A can share the authentication key with the other user.

In the above described case, the key sharing request unit 2309 may transmit the authentication key of which the authority regarding the period of time in which the authentication key is available or the number of times the authentication key is available or the authority regarding the unlocking or activation of the vehicle 10A, which is set based on the predetermined manipulation by the owner user or which is defined in advance, has been restricted, to the other mobile terminal 20 via the communication processing unit 2301. Specifically, for example, an authentication key with an authority to limit the period of time in which the authentication key is available or the number of times the authentication key is available to, for example, 30 minutes or once, or an authentication key with an authority, for example, solely to lock and unlock doors for getting on and off the vehicle 10A or prohibit activation of the vehicle 10A may be transmitted to another mobile terminal 20. Hereinafter, the same applies to the case of temporary key sharing that is performed via the center server 30. Accordingly, security of the vehicle 10A due to the temporary key sharing can be improved.

When the temporary key sharing is performed, the key sharing request unit 2309 may cause the authentication key to be distributed from the center server 30 to the other mobile terminal 20, as in the case of a normal key sharing. In the above described case, the key sharing request unit 2309 may transmit a temporary key sharing request including information (for example, an issued ID embedded in the authentication key) for specifying the distributed authentication key and information for designating the other mobile terminal 20 that is a distribution target to the center server 30 via the communication processing unit 2302, to cause the authentication key of the vehicle 10A to be distributed from the center server 30 to the other mobile terminal 20.

For example, when the other mobile terminal 20 is the mobile terminal 20Ab of the sub-user, the key sharing request unit 2309 may transmit a temporary key sharing request including the sub-user ID to the center server 30 via the communication processing unit 2302.

For example, the key sharing request unit 2309 acquires predetermined identification information (for example, a quick response (QR) code (registered trademark) corresponding to the user of another mobile terminal 20 registered as a user installing the key application in the center server 30) from the other mobile terminal 20 via the communication processing unit 2301. The key sharing request unit 2309 may transmit a temporary key sharing request for designating another mobile terminal 20 specified based on the identification information as a distribution target, to the center server 30.

The mobile terminal 20Aa may acquire the identification information using another method. For example, the mobile terminal 20Aa may acquire identification information corresponding to the user of the other mobile terminal 20 in an aspect in which the identification information displayed on the display 24 of the other mobile terminal 20 is recognized using a mounted camera function. For example, the mobile terminal 20Aa may acquire the identification information transmitted from the user of the other mobile terminal 20 to an email address or an account of an SNS of the owner user.

For example, according to a predetermined manipulation by the owner user, the key sharing request unit 2309 transmits a candidate terminal information request for requesting a candidate terminal information on a candidate terminal that is a candidate for the other mobile terminal 20 present around a current position of the mobile terminal 20Aa to the center server 30 via the communication processing unit 2302. When the candidate terminal information is received from the center server 30 by the communication processing unit 2302, the key sharing request unit 2309 causes the display 24 to display the candidate terminal information. When the candidate terminal information is displayed on the display 24, information for specifying a candidate terminal in which a specific manipulation or operation is performed among candidate terminals may be included in the candidate terminal information replied from the center server 30. Accordingly, the owner user of the vehicle 10A can specify another mobile terminal 20 from among the candidate terminals displayed on the display 24 of the mobile terminal 20Aa by the user of the other mobile terminal 20 as a key sharing target performing a specific manipulation or operation with respect to the mobile terminal 20. The key sharing request unit 2309 may transmit a temporary key sharing request for designating the other mobile terminal 20 specified from among the candidate terminals as a distribution target to the center server 30, according to a predetermined manipulation by the owner user.

The key sharing request unit 2309 may activate the key application according to a predetermined manipulation by the owner user to transmit link information according to a uniform resource locator (URL) scheme for allowing the other mobile terminal 20 to acquire the authentication key from the center server 30 (hereinafter, simply referred to as "link information") to an email address or an account of an SNS of the user of the other mobile terminal 20 via the communication processing unit 2302. In this case, the key sharing request unit 2309 transmits a temporary key sharing request for designating the acquired authentication key to the center server 30 via the communication processing unit 2302 according to a predetermined manipulation by the owner user, and acquires the link information replied from the center server 30 according to the temporary key sharing request. Accordingly, the key sharing request unit 2309 can cause the authentication key to be distributed from the center server 30 to the other mobile terminal 20.

The temporary key sharing may be executed from the mobile terminal 20Ab of the sub-user to which the authentication key has already been distributed. That is, a function regarding the temporary key sharing in the key sharing request unit 2309 may be included in a function of the key application that is installed in the processing device 23 of the mobile terminal 20Ab of the sub-user. Accordingly, it is not needed to lend and borrow the mobile terminal 20Ab of the sub-user who has acquired the authentication key even when a plurality of persons including no owner user gets on the vehicle 10A together, and convenience for the sub-user of the vehicle 10A can be further improved. Hereinafter, description will be given on the premise that the temporary key sharing can be performed from the mobile terminal 20Ab of the sub-user.

The processing device 32 of the center server 30 includes the communication processing unit 3201, the condition determination unit 3202, the authentication key issuance unit 3203, and the storage unit 3200, as described above. The processing device 32 of the center server 30 includes, for example, a position information management unit 3204, a schedule management unit 3205, a registration management unit 3206, and a key sharing management unit 3207 as functional units realized by executing one or more programs stored in an auxiliary storage device or the like of a server computer on a CPU.

When the authentication key acquisition request has been received from the mobile terminals 20Aa, 20Ab by the communication processing unit 3201, the condition determination unit 3202 performs authentication based on the regular user ID and the password included in the authentication key acquisition request. For example, the condition determination unit 3202 collates the regular user ID and password registered in the storage unit 3200 with the regular user ID and password included in the authentication key acquisition request, and determines that the authentication is successful, that is, the authentication key acquisition request is a regular authentication key acquisition request when both match.

The condition determination unit 3202 determines whether or not the authentication key arrangement request sent from the key sharing management unit 3207 to be described below is a regular authentication key arrangement request. For example, when the authentication is successful based on authentication information (for example, the ID and the password) included in the authentication key arrangement request from the key sharing management unit 3207, the condition determination unit 3202 may determine that the authentication key arrangement request is a regular authentication key arrangement request.

When the condition determination unit 3202 determines that the authentication key acquisition request or the authentication key arrangement request is a regular authentication key acquisition request or a regular authentication key arrangement request, the authentication key issuance unit 3203 issues the authentication key and distributes the authentication key to the mobile terminal 20 via the communication processing unit 3201.

The position information management unit 3204 manages the position information of the vehicles 10 (10A, 10B). Specifically, the position information management unit 3204 transmits a position information request to the vehicle 10 via the communication processing unit 3201. In response to the position information request, the DCM 14 of the vehicle 10 replies the center server 30 with the position information of the vehicle 10 input from the GPS module 13, and the position information management unit 3204 can acquire the position information of the vehicle 10.

The position information management unit 3204 acquires the position information from the vehicle 10A via the communication processing unit 3201 and monitors the position information of the vehicle 10A in real time to grasp a movement situation of the vehicle 10A. Accordingly, for example, the position information management unit 3204 can notify the owner user of the position information of the vehicle 10A lent to the sub-user via the communication processing unit 3201. For example, the position information management unit 3204 can notify the mobile terminal 20Ab of the sub-user of information such as whether or not the vehicle 10A scheduled to be lent to the sub-user is directed to a designated position (for example, the home) or a reference for returning, via the communication processing unit 3201.

The schedule management unit 3205 manages the use situation of the vehicle 10A regarding various services. For example, the schedule management unit 3205 periodically acquires a use schedule of the vehicle 10 by the key sharing service and, specifically, information on a date and time on which the authentication key distributed by the key sharing service is available, from the key sharing management unit 3207. The schedule management unit 3205 acquires the use schedule of the vehicle 10A by each of the vehicle cabin delivery service and the C2C car sharing service from the delivery management server 50 and the C2C car sharing management server 70 via the communication processing unit 3201. The schedule management unit 3205 generates information on the use schedule of the vehicle 10A (vehicle use schedule information) over a plurality of services based on the acquired use schedule of the vehicle 10A regarding the various services, and updates the vehicle use schedule information stored in the storage unit 3200.

The registration management unit 3206 performs registration of the regular user (the sub-user) who uses various services according to the user registration request received from the mobile terminal 20Aa of the owner user by the communication processing unit 3201. For example, the registration management unit 3206 collates the owner user ID and password included in the user registration request from the mobile terminal 20Aa with the owner user ID and password stored in the storage unit 3200, and determines that the user registration request is a regular user registration request when both match. That is, the registration management unit 3206 determines that the authentication is successful. The registration management unit 3206 registers the sub-user ID included in the regular user registration request in a user service registration information database (DB) in the storage unit 3200 as the regular user who can use various services.

The registration management unit 3206 performs registration of use of various services by the regular user of the vehicle 10A according to the service use registration request received from the mobile terminal 20Aa of the owner user by the communication processing unit 3201. That is, according to the service use registration request, the registration management unit 3206 performs registration of an authentication key arrangement authority of the key sharing management unit 3207 or the service management server 40 corresponding to various services to allow the user of the vehicle 10A to use various services. For example, the registration management unit 3206 performs the same authentication processing as described above based on the owner user ID and the password included in the service use registration request from the mobile terminal 20Aa to determine whether the service use registration request is a regular service use registration request. When the service use registration request is a regular service use registration request, the registration management unit 3206 determines whether or not the regular user ID included in the service use registration request has already been registered in the user service registration information DB. When the regular user ID included in the service use registration request has already been registered in the user service registration information DB, the registration management unit 3206 registers the service of a target specified by the service use registration request in the user service registration information database (DB) in the storage unit 3200 as a service available to the regular user corresponding to the regular user ID.

Specifically, the registration management unit 3206 constructs a user service registration information DB in an aspect in which service-specific information for specifying a target service, vehicle-specific information for specifying the vehicle 10A, a regular user ID for specifying a regular user who uses the service, and service link information in which the vehicle-specific information corresponding to the vehicle 10A and the regular user ID are associated with the target service is linked to the owner user ID.

The service-specific information is, for example, a service ID that is defined for each service. Specifically, for example, when there is a plurality of companies providing the C2C car sharing service, a unique service ID is defined for each of the companies. For example, when the same company provides a plurality of C2C car sharing services, a unique ID is defined for each of the services provided by the same company. When a vehicle cabin delivery service is provided by a combination of a plurality of delivery companies and a plurality of EC companies, a unique service ID may be defined for each combination of the delivery company and the EC company, and the target service may be specified by a combination of the unique service ID defined for each of the delivery companies and a unique service ID defined for each of the EC companies.

The vehicle-specific information may be any information as long as the information is able to specify the vehicle 10A that is a target of locking, unlocking, or activation using the authentication key. For example, the vehicle-specific information may be identification information such as a vehicle ID or a vehicle identification number (VIN), which is defined for each vehicle 10A. For example, the vehicle-specific information may be identification information such as a key unit ID, which is defined for each in-vehicle device related to locking, unlocking, or activation of the doors based on the authentication key mounted on the vehicle 10A such as the key unit 12. Hereinafter, description will be given on the premise that the vehicle-specific information is the key unit ID.

The service link information is information needed for the key sharing management unit 3207, the delivery management server 50, the EC server 60, and the C2C car sharing management server 70 managing various services to transmit the authentication key arrangement request to thereby cause the authentication key issuance unit 3203 to issue the authentication key of the vehicle 10A that is a target and distribute the authentication key to the mobile terminal 20 that is a target. That is, the authentication key issuance unit 3203 can specify the vehicle 10A that is a target of locking, unlocking, or activation using the authentication key and issue an appropriate authentication key by receiving the authentication key arrangement request including the service link information from the key sharing management unit 3207, the delivery management server 50, the EC server 60, and the C2C car sharing management server 70.

The service link information may be any information as long as the target service is associated with the vehicle 10A and the user who uses the service in the center server 30. For example, the service link information may be a login ID of the regular user at a website for users of various services corresponding to the key sharing management unit 3207, the delivery management server 50, the EC server 60, and the C2C car sharing management server 70 (hereinafter referred to as a "service login ID" for convenience). In this case, the service use registration request unit 2307 of the mobile terminal 20Aa transmits the service use registration request including the service login ID of the regular user that is a registration target corresponding to the various services to the center server 30 via the communication processing unit 2302. When the regular user that is a registration target corresponding to various services does not acquire the service login ID, the processing device 23 of the mobile terminal 20Aa may activate a predetermined browser and acquire the service login ID of a website of various services. Accordingly, when the user (the regular user of the vehicle 10A) logs in to the website at the time of requesting a service that is a target, the delivery management server 50 or the C2C car sharing management server 70 can grasp the service login ID corresponding to the service link information and easily arrange the authentication key regarding the service provision. Hereinafter, description will be given on the premise that the service link information on the vehicle cabin delivery service and the C2C car sharing service is the service login ID.

In the case of regular users who regularly use a plurality of vehicles 10A, the center server 30 can specify the regular user solely by using the service login ID, but cannot specify the vehicle 10A. Therefore, information for indirectly specifying the vehicle 10A (for example, information obtained by encrypting the vehicle-specific information using a predetermined scheme) in addition to the service login ID may be included in the service link information.

When the registration of use of various services has been completed, registration management unit 3206 notifies the mobile terminals 20Aa, 20Ab corresponding to the regular users that are registration targets that the registration of use of various services has been completed, via the communication processing unit 3201. When the registration of use of various services has been completed, the registration management unit 3206 transmits a service use registration completion notification including the service link information to the key sharing management unit 3207 or the service management server 40 that performs an operation and management of a service that is a registration target, via the communication processing unit 3201.

A notification that the registration of use of various services for the mobile terminals 20Aa, 20Ab has been completed may be transmitted from the service management server 40 that has received the service use registration completion notification.

When the service use situation request has been received from the mobile terminal 20Aa by the communication processing unit 3201, the registration management unit 3206 generates the service use situation information based on, for example, the vehicle use schedule information managed by the user service registration information DB of the storage unit 3200 or the schedule management unit 3205, and distributes the service use situation information to the mobile terminal 20Aa via the communication processing unit 3201.

The key sharing management unit 3207 performs an operation and management of the key sharing service.

For example, according to the key sharing request received from the mobile terminal 20Aa of the owner user by the communication processing unit 3201, the key sharing management unit 3207 performs the arrangement of the authentication key to the mobile terminals 20Aa, 20Ab corresponding to the regular user ID designated by the key sharing request. Specifically, the key sharing management unit 3207 collates the owner user ID and the password included in the key sharing request with the owner user ID and the password stored in the storage unit 3200, and determines that the key sharing request is a regular key sharing request when both match. The key sharing management unit 3207 inquires of the schedule management unit 3205 and determines whether or not there is mismatch, that is, overlapping of the use date and time regarding the use of the services and the vehicle 10A of the regular users between the use period information included in the key sharing request and the latest vehicle use schedule information. When there is no overlapping of the use time, the key sharing management unit 3207 sends, to the authentication key issuance unit 3203, the authentication key arrangement request including information on the regular users corresponding to the mobile terminals 20Aa, 20Ab that are distribution targets of the authentication key specified by the information included in the key sharing request, and the vehicle 10A that is a target of locking, unlocking, or activation using the authentication key, and authority information such as a period of time in which the authentication key is available to the respective mobile terminals 20Aa, 20Ab, the number of times the authentication key is available to the respective mobile terminals 20Aa, 20Ab, unlockable doors, and whether or not the vehicle can be activated. Accordingly, the authentication key issuance unit 3203 can specify the regular user IDs corresponding to the mobile terminals 20Aa, 20Ab that are distribution targets of the authentication key, and the vehicle 10A that is a target of locking, unlocking, or activation using the authentication key, and issue an appropriate authentication key.

For example, the key sharing management unit 3207 confirms, for example, attribute information (for example, an age or presence or absence of a driving license) of the users of the mobile terminals 20Aa, 20Ab that are distribution targets of the authentication key that is designated by the key sharing request, which is stored in the storage unit 3200. When the users of the mobile terminal 20Aa, 20Ab (regular users of the vehicle 10A) that are distribution targets of the authentication key are users determined to be unable to drive the vehicle 10A, the key sharing management unit 3207 allows an authentication key to which an authority to be unable to activate the vehicle 10A has been imparted to be issued to the mobile terminal 20 of the user. The user who cannot drive the vehicle 10A is, for example, a user who has not reached an age at which the user can acquire a driver's license or a user who does not acquire the driver's license. Specifically, the key sharing management unit 3207 sends an authentication key arrangement request in which an indication that the activation of the vehicle 10A is prohibited is included in authority information corresponding to the mobile terminals 20Aa, 20Ab corresponding to the users determined to be unable to drive the vehicle 10A, to the authentication key issuance unit 3203. Accordingly, since the authentication key issuance unit 3203 can distribute the authentication key to which the authority to prohibit the activation of the vehicle 10A has been imparted, to the mobile terminals 20Aa, 20Ab of the users who are unable to drive the vehicle 10A, it is possible to improve safety of the vehicle 10A in the key sharing service.

For example, the key sharing management unit 3207 distributes the authentication key of the vehicle 10A to the other mobile terminal 20 designated by the temporary key sharing request received from the mobile terminal 20Aa of the owner user by the communication processing unit 3201 based on the temporary key sharing request. Specifically, the key sharing management unit 3207 specifies the ID of the installing user corresponding to the other mobile terminal 20 that is a distribution target (hereinafter referred to as an "installing user ID") based on the installing user information DB of the key application stored in the storage unit 3200. The key sharing management unit 3207 sends an authentication key arrangement request including the specified installing user ID and information (for example, an issued ID of the authentication key included in the temporary key sharing request) corresponding to the authentication key designated by the temporary key sharing request to the authentication key issuance unit 3203. Accordingly, the authentication key issuance unit 3203 can specify another mobile terminal 20 that is a distribution target based on the installing user ID, the issued ID of the authentication key, and the like, and distribute the authentication key to the other mobile terminal 20 via the communication processing unit 3201.

A function of the key sharing management unit 3207 may be transferred to a server (a key sharing management server) outside the center server 30, which may be included in the service management server 40, similar to other services for using the vehicle 10A.

The mobile terminal 20Ab carried by the sub-user includes the communication processing unit 2301, the communication processing unit 2302, the authentication key acquisition unit 2303, the authentication request unit 2304, the locking and unlocking request unit 2305, and the storage unit 2300, as described above.

In the embodiment, description will be given on the premise that the function of the authentication key acquisition unit 2303 of the mobile terminal 20Ab is available to the sub-user by the key application being activated and the user authentication based on bidirectional communication with the center server 30 being successful. Description will be given on the premise that the user authentication is performed by the center server 30 based on the sub-user ID and the password. Description will be given on the premise that functions of the authentication request unit 2304 and the locking and unlocking request unit 2305 of the mobile terminal 20Ab are available to the sub-user by the key application being activated.

The authentication key acquisition unit 2303 acquires the authentication key distributed from the center server 30 according to the key sharing request transmitted from the mobile terminal 20Aa to the center server 30 via the communication processing unit 2302, as described above. Accordingly, the mobile terminal 20Ab can lock and unlock the doors of the vehicle 10A or activate the vehicle 10A based on the functions of the communication processing unit 2301, the authentication request unit 2304, and the locking and unlocking request unit 2305. That is, the sub-user carrying the mobile terminal 20Ab can directly use the vehicle 10A through the key sharing service. For example, the sub-user can lock and unlock the vehicle 10A using the mobile terminal 20Ab without performing key exchange with the owner user and drive the vehicle 10A. Similarly, the owner user can lend the vehicle 10A to the sub-user without exchanging the key with the sub-user. Accordingly, it is possible to improve convenience in lending and borrowing of the vehicle 10A between the owner user of the vehicle 10A and the sub-user through the key sharing service in the authentication key management system 1.

The authentication key acquisition unit 2303 acquires the authentication key that is distributed from the center server 30 according to the temporary key sharing request transmitted from the mobile terminal 20Aa to the center server 30 via the communication processing unit 2302, as described above. The same applies to a case where the authentication key is distributed to another mobile terminal 20 other than the mobile terminal 20Ab of the sub-user according to the temporary key sharing request. Accordingly, the other mobile terminal 20 including the mobile terminal 20Ab can lock and unlock the doors of the vehicle 10A or activate the vehicle 10A based on the functions of the communication processing unit 2301, the authentication request unit 2304, and the locking and unlocking request unit 2305. That is, for example, when a plurality of persons including other regular users gets on the vehicle 10A together and goes out and even when the sub-user carrying the mobile terminal 20Ab does not acquire the authentication key in advance, the sub-user does not have to borrow the mobile terminals 20Aa, 20Ab to which the authentication key has already been distributed, and can directly use the vehicle 10A using the mobile terminal 20Ab, such as locking and unlocking the vehicle 10A or driving the vehicle 10A. Similarly, even when the owner user has not caused the mobile terminal 20Ab of the sub-user to acquire the authentication key, it is not needed for the owner user to lend the mobile terminal 20Aa of the owner user to the sub-user. Accordingly, it is possible to improve the user's convenience when a plurality of persons including the regular user of the vehicle 10A gets on the vehicle 10A together and uses the vehicle 10A through the temporary key sharing in the authentication key management system 1.

Details of Configuration Regarding Vehicle Cabin Delivery Service

A configuration regarding the vehicle cabin delivery service in the authentication key management system 1 will be described with reference to FIG. 4.

Figure 4:
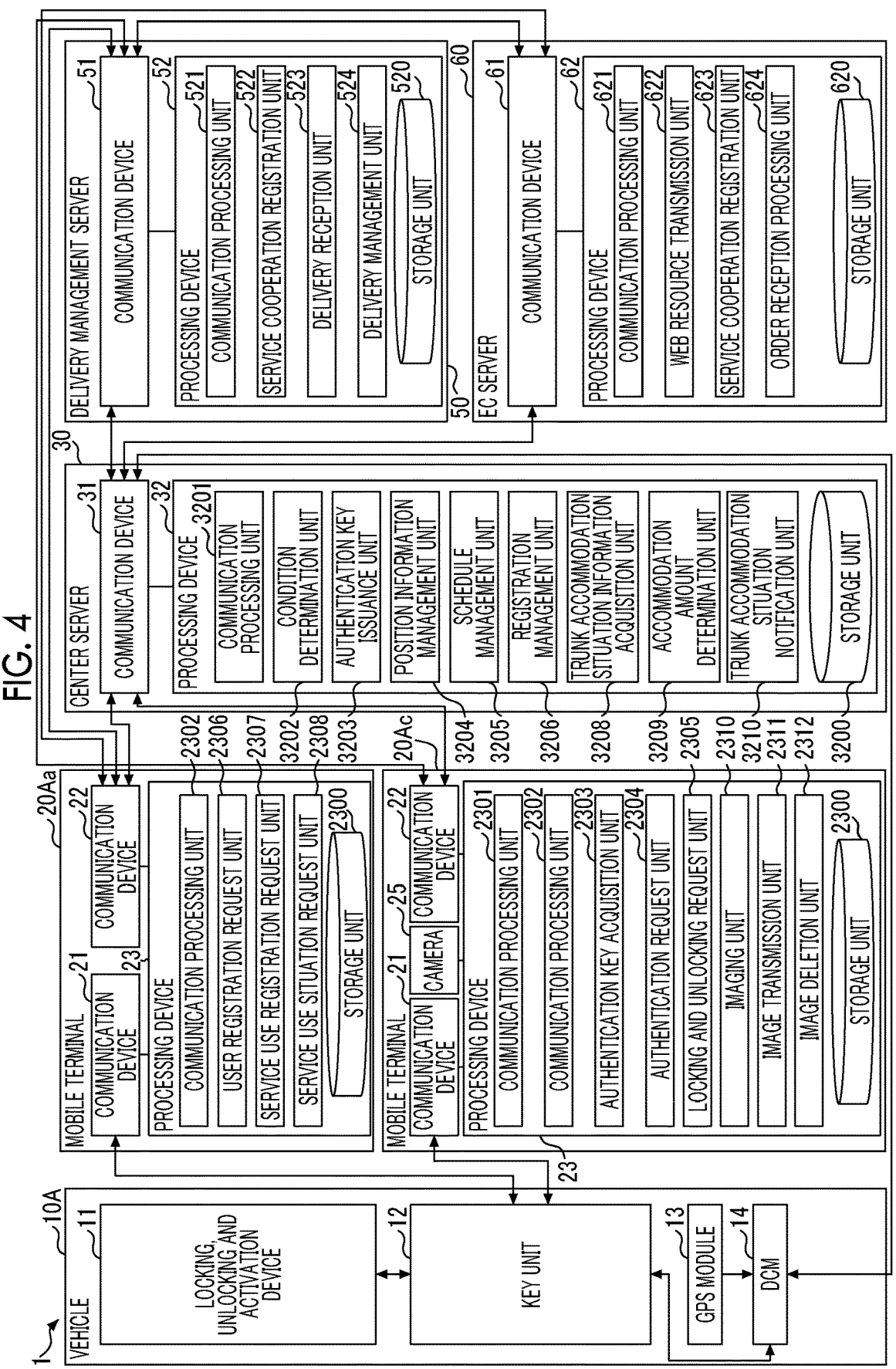
FIG. 4 is a diagram mainly illustrating an example of a configuration regarding a vehicle cabin delivery service in the authentication key management system.

FIG. 4 is a diagram mainly illustrating an example of a configuration regarding a vehicle cabin delivery service in the authentication key management system 1. Hereinafter, the configuration regarding the vehicle cabin delivery service in the authentication key management system 1 will be mainly described with reference to FIG. 4, and duplicate description on the configuration overlapping the above described configuration regarding the key sharing service will be omitted as much as possible.

The processing device 23 of the mobile terminal 20Aa carried by the owner user of the vehicle 10A includes the communication processing unit 2302, the user registration request unit 2306, the service use registration request unit 2307, the service use situation request unit 2308, and the storage unit 2300, as described above.

The user registration request unit 2306 requests the center server 30 to register the regular user (a sub-user) of the vehicle 10A who uses various services including the vehicle cabin delivery service according to a predetermined manipulation by the owner user, as described above.

The service use registration request unit 2307 requests the center server 30 to perform the registration of use of various services including the vehicle cabin delivery service for each registered regular user (the owner user or the sub-user) according to a predetermined manipulation by the owner user, as described above.

For example, the service use registration request unit 2307 transmits, as the service link information, a service use registration request for using the vehicle cabin delivery service including a service login ID of a website for a user who uses the service of the delivery management server 50 (hereinafter referred to as a "delivery site") and a service login ID of the EC site, which corresponds to the regular user of the vehicle 10A that is a registration target, to the center server 30.

The service use situation request unit 2308 requests the center server 30 to provide information on a use situation of various services (service use situation information) including the vehicle cabin delivery service of the regular user of the vehicle 10A for which the use registration has been performed, in a form corresponding to the owner user ID according to a predetermined manipulation by the owner user, as described above.

The delivery management server 50 that performs an operation of the vehicle cabin delivery service includes a communication device 51 and a processing device 52.

The communication device 51 is any device that performs bidirectional communication with each of the mobile terminal 20, the center server 30, and the EC server 60 over a predetermined communication network.

The processing device 52 includes, for example, a communication processing unit 521, a service cooperation registration unit 522, a delivery reception unit 523, and a delivery management unit 524 as functional units that are realized by executing one or more programs stored in the ROM or the auxiliary storage device on the CPU. The processing device 52 includes a storage unit 520 that is realized as a storage area of an auxiliary storage device or the like of the server computer.

The communication processing unit 521 controls the communication device 51 to perform transmission and reception of various signals such as control signals or information signals to and from each of the mobile terminal 20, the center server 30, and the EC server 60.

The service cooperation registration unit 522 performs information registration for cooperation between the center server 30 regarding the use of the vehicle cabin delivery service of the regular user of the vehicle 10A and the delivery management server 50 according to the service use registration completion notification received from the center server 30 by the communication processing unit 521.

For example, the service cooperation registration unit 522 adds a flag indicating a use target of the vehicle cabin delivery service to the service login ID (a part of service link information) included in the service use registration completion notification in the user management DB that manages the user of the delivery site constructed in the storage unit 520. In addition, the service cooperation registration unit 522 performs registration in an aspect in which information for specifying the vehicle 10A included in the service link information and a service login ID of a website (that is, the EC site) corresponding to the EC server 60 included in the service use registration completion notification is linked to the service login ID included in the service use registration completion notification in the user management DB of the storage unit 520. Accordingly, when the user corresponding to the service login ID regularly uses the vehicles 10A, the delivery management server 50 transmits an authentication key arrangement request to the center server 30 for the vehicle 10A designated by the user. When an order reception including a service login ID is received from the EC server 60 by the communication processing unit 521, the delivery management server 50 can specify the corresponding service login ID of the delivery site. The delivery management server 50 transmits the authentication key arrangement request including service link information such as the specified service login ID or information for specifying the vehicle 10A corresponding to the vehicle 10A designated by the user to the center server 30 such that it is possible to cause the authentication key to be distributed from the center server 30 to the mobile terminal 20Ac of the deliverer, as described below.

The delivery reception unit 523 receives information (delivery request information) on the package delivery request including the service login ID of the EC site corresponding to an orderer of the product at the EC site from the EC server 60 via the communication processing unit 521. The delivery request information received from the EC server 60 includes information on a designated delivery destination (delivery destination information), information on a designated delivery date and time (delivery date and time information), and the like in addition to basic information such as a name, an address, and a telephone number of the orderer that is a delivery destination.

The delivery management unit 524 performs an operation and management of each processing from reception to delivery regarding the delivery request received by the delivery reception unit 523.

For example, when the delivery management unit 524 receives a notification that package has reached a business office that has jurisdiction over a parking position of the vehicle 10A designated by the delivery destination information of the delivery request from business office via the communication processing unit 521, the delivery management unit 524 decides a date and time of departure for delivery of the package, a deliverer in charge, and the like according to a designated delivery date and time (a delivery date and time slot).

Subsequently, when the preparation of departure is started for the delivery of the package of which the deliverer is in charge and which includes a package that is a target (for example, 30 minutes to one hour before departure for the delivery of the package that is a target), the delivery management unit 524 transmits a preparation start notification to the center server 30 via the communication processing unit 521. In this case, the preparation start notification may include the information for specifying the package that is a target, and when the package having the delivery destination set to each trunk of the vehicles of which the deliverer is in charge is included, the information that specifies the package corresponding to each delivery destination may be included.

Subsequently, the delivery management unit 524 inquires of the center server 30 about the position information of the vehicle 10A via the communication processing unit 521 before departure for the delivery of the package that is a target (for example, 10 minutes before the departure). The delivery management unit 524 acquires current position information of the vehicle 10A from the center server 30 via the communication processing unit 521 and determines whether or not the delivery is available from whether or not the current position matches the designated parking position of the vehicle 10A, a relationship between the current position and a jurisdiction area, or the like.

The determination as to whether or not the delivery is available may be made by the center server 30.

Subsequently, when the delivery management unit 524 determines that the delivery can be performed with respect to the package that is a target, the delivery management unit 524 transmits a notification that the package can be delivered to the trunk of the vehicle 10A (delivery available notification) to the mobile terminal 20Ac of the deliverer via the communication processing unit 521.

Subsequently, when an authentication key acquisition request is received from the mobile terminal 20Ac that has received the delivery available notification by the communication processing unit 521, the delivery management unit 524 determines whether or not the authentication key acquisition request is a regular authentication key acquisition request. Specifically, the delivery management unit 524 may perform the determination by collating information on package that is a delivery target (hereinafter referred to as "delivery package information" for convenience) such as a deliverer, a destination (for example, a name of a recipient or a corporate name), a type of package, a delivery time slot, and a delivery destination that can be included in the authentication key acquisition request, with various types of information on the package registered in the storage unit 520. When the delivery management unit 524 determines that the authentication key acquisition request is a regular authentication key acquisition request, the delivery management unit 524 transmits an authentication key arrangement request to the center server 30 via the communication processing unit 521. When the delivery management unit 524 transmits the authentication key arrangement request to the center server 30, information for specifying the mobile terminal 20Ac of the deliverer may be included in the authentication key arrangement request. The information for specifying the deliverer may be, for example, an authentication ID for obtaining user authentication at the center server 30 in order for the deliverer to use the function of the key application corresponding to the authentication key acquisition unit 2303 of the mobile terminal 20Ac or the like (hereinafter referred to as a "deliverer ID" for convenience). Accordingly, the mobile terminal 20Ac of the deliverer can acquire the authentication key from the center server 30. Further, the information for specifying the package that is a target is included in the authentication key arrangement request.

Subsequently, the delivery management unit 524 receives an inquiry about the current position of the vehicle 10A from the mobile terminal 20Ac of the deliverer who has left for the delivery from the business office via the communication processing unit 521, the delivery management unit 524 inquires of the center server 30 about the current position information of the vehicle 10A. The delivery management unit 524 acquires the current position information of the vehicle 10A from the center server 30 via the communication processing unit 521 and transmits (transfers) the current position information of the vehicle 10A to the mobile terminal 20Ac of the deliverer. Accordingly, the deliverer who has gone out can compare the current position information of the vehicle 10A with the information on the parking position of the vehicle 10A designated by the delivery destination information and determine whether to deliver the package or return to the business office.

Finally, when the delivery management unit 524 receives a delivery completion notification received from the mobile terminal 20Ac of the deliverer who has completed the delivery of the package via the communication processing unit 521, the delivery management unit 524 transmits the delivery completion notification to the center server 30 via the communication processing unit 521 and basically ends an operation and management regarding the vehicle cabin delivery service regarding the package. When the operation and management regarding the vehicle cabin delivery service regarding the package basically ends, the delivery management unit 524 may notify the regular user of the vehicle 10A that is a requester (a purchaser of a product at the EC site) through an electronic mail or a predetermined application cooperating with the delivery site installed in the mobile terminals 20Aa, 20Ab that the delivery has been completed.

Instead of the center server 30, the delivery management unit 524 may directly acquire (receive) the delivery completion notification or the information corresponding to the delivery completion notification (for example, the capture image inside the trunk of the vehicle 10A at the time of the delivery captured by the mobile terminal 20Ac of the deliverer at the time of the delivery described later) from the mobile terminal 20Ac of the deliverer. Further, according to the unlocking request and the locking request from the mobile terminal 20Ac of the deliverer, the DCM 14 of the vehicle 10A may determine the delivery completion by the deliverer when the door (the trunk lid or the like) that allows the access to the trunk of the vehicle 10A is locked after the door is unlocked, and notify the center server 30 of the delivery completion by the deliverer, as described above. Accordingly, the center server 30 can transmit the delivery completion notification to the delivery management server 50 when the notification is received. That is, the center server 30 may transmit the delivery completion notification to the delivery management server 50 according to the notification which is received from the vehicle 10A and indicates that the delivery by the deliverer has been completed.

The EC server 60 includes a communication device 61 and a processing device 62.

The communication device 61 is any device that performs bidirectional communication with each of the mobile terminal 20, the center server 30, and the delivery management server 50 over a predetermined communication network.

The processing device 62 includes, for example, a communication processing unit 621, a web resource transmission unit 622, a service cooperation registration unit 623, and an order reception processing unit 624 as functional units that are realized by executing one or more programs stored in the ROM or the auxiliary storage device on the CPU. The processing device 62 includes a storage unit 620 that is realized as a storage area of an auxiliary storage device or the like of the server computer.

The communication processing unit 621 controls the communication device 61 to perform transmission and reception of various signals such as control signals or information signals to and from each of the mobile terminal 20, the center server 30, and the delivery management server 50.

The web resource transmission unit 622 transmits resources corresponding to the webpage to be displayed on a browser of any terminal of the user browsing the EC site including the mobile terminals 20Aa, 20Ab based on various types of information as resources of the EC site stored in the storage unit 620 to the browser of the terminal using a predetermined scheme. A top page displayed in the EC site, a webpage corresponding to an individual product handled at the EC site, an order input page for the user to input various types of information at the time of ordering an individual product, and the like are included in the webpage on the EC site. For example, the web resource transmission unit 622 transmits a Hyper Text Markup Language (HTML) document corresponding to a webpage, and information under the HTML document such as an image and a moving image displayed on webpages in parallel.

The service cooperation registration unit 623 performs information registration for cooperation between the center server 30 regarding the use of the vehicle cabin delivery service of the regular user of the vehicle 10A and the EC server 60 according to the service use registration completion notification received from the center server 30 by the communication processing unit 621. For example, the service cooperation registration unit 623 adds a flag indicating a use target of the vehicle cabin delivery service to the service login ID included in the service use registration completion notification in the user management DB that manages the user of the EC site constructed in the storage unit 620. In addition, the service cooperation registration unit 623 performs registration in an aspect in which a service login ID of a website (that is, the delivery site) corresponding to the delivery management server 50 included in the service use registration completion notification is linked to the service login ID included in the service use registration completion notification in the user management DB. Accordingly, for example, when an inquiry about an ordered product including the service login ID of the delivery site is received from the delivery management server 50 by the communication processing unit 621, the EC server 60 can specify the service login ID of the corresponding EC site.

The order reception processing unit 624 receives an order of products from the user based on various manipulation inputs corresponding to the order of the product of the user at the EC site. When the order reception processing unit 624 receives an order and the trunk of the vehicle 10A is selected as a delivery destination on an order input page of the EC site, the order reception processing unit 624 inquires the center server 30 about the vehicle use schedule information via the communication processing unit 621. Accordingly, the order reception processing unit 624 can acquire the latest vehicle use schedule information via the communication processing unit 621. Therefore, for example, when a designated date and time of delivery has already overlapped another schedule, the order reception processing unit 624 can take countermeasures such as requesting to change a delivery date and time.

As described above, the vehicle cabin delivery service in which package other than an ordered product at the EC site is a target can also be assumed. In this case, the delivery management server 50 may similarly acquire the latest vehicle use schedule information from the center server 30. Accordingly, the delivery management server 50 can take countermeasures such as requesting to change a delivery date and time when a date and time of delivery of the package to the trunk of the vehicle 10A designated by the regular user of the vehicle 10A has already overlapped another schedule.

The processing device 32 of the center server 30 that support of an operation of the vehicle cabin delivery service includes the communication processing unit 3201, the condition determination unit 3202, the authentication key issuance unit 3203, the position information management unit 3204, the schedule management unit 3205, the registration management unit 3206, and the storage unit 3200, as described above. The processing device 32 of the center server 30 (an example of the information processing device) includes a trunk accommodation situation information acquisition unit 3208, an accommodation amount determination unit 3209, and a trunk accommodation situation notification unit 3210 as functional units realized by executing one or more programs stored in the ROM of the server computer or the auxiliary storage device on the CPU.

When the condition determination unit 3202 receives the authentication key arrangement request from the delivery management server 50 via the communication processing unit 3201, the condition determination unit 3202 determines whether or not the authentication key arrangement request is a regular authentication key arrangement request. For example, the condition determination unit 3202 determines whether or not the authentication key arrangement request is the regular authentication key arrangement request based on service login information (the service login ID of the delivery site or the like) included in the authentication key arrangement request or predetermined authentication information (for example, the ID and the password) corresponding to the delivery management server 50.

When the condition determination unit 3202 determines whether or not the authentication key arrangement request is a regular authentication key arrangement request, the authentication key issuance unit 3203 issues the authentication key corresponding to the authentication key arrangement request and distributes the authentication key to the mobile terminal 20Ac of the deliverer.

In detail, the authentication key issuance unit 3203 specifies the vehicle 10A corresponding to the authentication key arrangement request based on the user service registration information DB of the storage unit 3200. The authentication key issuance unit 3203 issues the authentication key in which a time is limited (for example, the vehicle is available solely in units of several minutes to tens of minutes from the distribution), the number of times of use is limited (for example, the number of times of use is solely one), and an authority is limited so that solely locking and unlocking of the trunk lid can be allowed. Accordingly, it is possible to suppress unauthorized use of the vehicle 10A by the deliverer and to improve security. The authentication key issuance unit 3203 distributes the authentication key to the mobile terminal 20Ac of the deliverer specified by the authentication key arrangement request via the communication processing unit 3201.

For example, any method such as a known mathematical method or a method based on bidirectional communication between the center server 30 and the vehicle 10 may be adopted as a method of limiting a period of time in which the authentication key is available or the number of times the authentication key is used.

In response to the inquiry about the current position of the vehicle 10A from the delivery management server 50 received by the communication processing unit 3201, the position information management unit 3204, for example, acquires the position information from the vehicle 10A via the communication processing unit 3201 and provides (transmits) the position information of the vehicle 10A to the delivery management server 50 via the communication processing unit 3201.

The schedule management unit 3205 replies the EC server 60 with the latest vehicle use schedule information stored in the storage unit 3200 via the communication processing unit 3201 according to the inquiry from the EC server 60 received by the communication processing unit 3201.

The registration management unit 3206 performs registration of the regular user (the sub-user) who uses various services including the vehicle cabin delivery service according to the user registration request received from the mobile terminal 20Aa of the owner user by the communication processing unit 3201, as described above. The registration management unit 3206 performs registration of use of the vehicle cabin delivery service by the regular user of the vehicle 10A according to the service use registration request received from the mobile terminal 20Aa of the owner user by the communication processing unit 3201, as described above. When the registration of use of various services including the vehicle cabin delivery service has been completed, the registration management unit 3206 notifies the mobile terminals 20Aa, 20Ab corresponding to the regular users that are registration targets that the registration of use of various services including the vehicle cabin delivery service has been completed via the communication processing unit 3201, as described above. When the registration of use of the vehicle cabin delivery service has been completed, the registration management unit 3206 transmits the service use registration completion notification including the service link information to the delivery management server 50 and the EC server 60 that perform an operation and management of a service that is a registration target via the communication processing unit 3201.

The trunk accommodation situation information acquisition unit 3208 (an example of the information acquisition unit) acquires information related to the accommodation situation of the object accommodated in the trunk of the vehicle 10A which is the delivery destination of the package that is a target (hereinafter referred to as a "trunk accommodation situation information").

For example, as will be described below, the trunk accommodation situation information acquisition unit 3208 acquires the capture image of the trunk which is captured by the camera 25 of the mobile terminal 20Ac of the deliverer at the time of the delivery of the latest package to the trunk of the vehicle 10A and is uploaded to the center server 30 (hereinafter referred to as a "trunk image at the time of the delivery") from the storage unit 3200.

Further, for example, the trunk accommodation situation information acquisition unit 3208 acquires detection information which is output from a predetermined sensor equipped in the trunk of the vehicle 10A, and is related to the accommodation situation of the object accommodated in the trunk (hereinafter referred to as a "sensor detection information on the inside of the trunk") from the vehicle 10A via the communication processing unit 3201. In this case, the sensor may include various types of sensors capable of detecting the object inside the trunk such as the camera (an image sensor) and an ultrasonic sensor.

Further, for example, the trunk accommodation situation information acquisition unit 3208 acquires information on a request history of the package having the trunk of the vehicle 10A as the delivery destination (hereinafter, referred to as a "request history information") from the delivery management server 50 via the communication processing unit 3201. The accommodation situation of the object currently accommodated in the trunk of the vehicle 10A can be estimated from a request frequency in the latest predetermined period or the like based on the request history of the package. Further, for example, the trunk accommodation situation information acquisition unit 3208 may acquire information on an opening history of the door that allows the access to the trunk of the vehicle 10A that is a target by the user of the vehicle cabin delivery service (hereinafter, referred to as a "door opening history information") from the storage unit 3200. The current accommodation situation of the trunk can be estimated, by grasping of the number of the delivered package or the like after a user's final opening of the door that allows the access to the trunk of the vehicle 10A based on the request history of the package in the latest predetermined period, and the user's unlocking history. In this case, when the vehicle 10A is unlocked by the unlocking requests or the like transmitted from the mobile terminals 20Aa, 20Ab of the regular users and the door that allows the access to the trunk is opened, the DCM 14 of the vehicle 10A transmits, to the center server 30, a notification which includes the information for specifying the regular user that is a target and indicates that the door allowing the access to the trunk is opened (hereinafter, referred to as a "trunk door opening notification"). Further, the DCM 14 of the vehicle 10A may transmit the trunk door opening notification to the center server 30, solely when the vehicle 10A is within a predetermined range in a vicinity of the home (for example, within a 100 meter range) registered in advance by the regular user. Accordingly, the center server 30 can store the opening history of the trunk by the regular users of the vehicle 10A in the storage unit 3200.

Based on the trunk accommodation situation information acquired by the trunk accommodation situation information acquisition unit 3208, the accommodation amount determination unit 3209 determines whether accommodation amount of the object accommodated in the trunk of the vehicle 10A exceeds a predetermined criterion such that the delivery (accommodation) of an additional package is determined not to be possible (that is, trunk is full). The accommodation amount may be an amount corresponding to volumes of the objects accommodated inside the trunk of the vehicle 10A, for example. The accommodation amount may be an amount corresponding to the number of the objects accommodated inside the trunk of the vehicle 10A, for example, and in this case, for an object of which a size (a length, the volume, or the like) exceeds the predetermined criterion, a mode in which a conversion into a plurality of objects is applied may be used. Further, the predetermined criterion may vary in consideration of the trunk capacity of the vehicle 10A that is a target, or a type of the vehicle or the like.

Based on the trunk accommodation situation information acquired by the trunk accommodation situation information acquisition unit 3208, the trunk accommodation situation notification unit 3210 (an example of the accommodation situation notification unit) notifies the user of the vehicle cabin delivery service (the regular user of the vehicle 10A) of the accommodation situation of the object accommodated in the trunk.

Details of the operation of the trunk accommodation situation information acquisition unit 3208, the accommodation amount determination unit 3209, and the trunk accommodation situation notification unit 3210 will be described below (see FIGS. 9 to 11).

Some or all of various functions of the center server 30 regarding the vehicle cabin delivery service, that is, functions of the condition determination unit 3202, the authentication key issuance unit 3203, the position information management unit 3204, the schedule management unit 3205, the registration management unit 3206, the trunk accommodation situation information acquisition unit 3208, the accommodation amount determination unit 3209, and the trunk accommodation situation notification unit 3210 may be transferred to the delivery management server 50 (an example of the information processing device). For example, the center server 30 may perform solely the distribution of the authentication key to the mobile terminal 20Ac, the management of the position information of the vehicle 10A, the management of the use schedule of the vehicle 10A, the use registration of the vehicle cabin delivery service, the acquisition of the trunk accommodation situation information, or the like, and at least one function of the accommodation amount determination unit 3209 and the trunk accommodation situation notification unit 3210 may be transferred to the delivery management server 50. Further, for example, the center server 30 may perform solely the distribution of the authentication key to the mobile terminal 20Ac, the management of the position information of the vehicle 10A, the management of the use schedule of the vehicle 10A, the use registration of the vehicle cabin delivery service, or the like and the function of the trunk accommodation situation information acquisition unit 3208 may be further transferred to the delivery management server 50. Further, for example, the center server 30 may perform solely the distribution of the authentication key to the mobile terminal 20Ac of the deliverer, or the like, and the functions regarding the vehicle cabin delivery service of the position information management unit 3204, the schedule management unit 3205 and the registration management unit 3206 may be further transferred to the delivery management server 50. Further, for example, all of the respective functions of the center server 30 regarding the vehicle cabin delivery service may be transferred to the delivery management server 50. That is, the delivery management server 50 may be configured to perform the distribution of the authentication key to the mobile terminal 20Ac of the deliverer (that is, the functions of the condition determination unit 3202 and the authentication key issuance unit 3203), the management of the position information of the vehicle 10A (that is, the function of the position information management unit 3204), the management of the use schedule of the vehicle 10A in the vehicle cabin delivery service (that is, the function of the schedule management unit 3205), the registration of use of the vehicle cabin delivery service (that is, the function of the registration management unit 3206), the acquisition of the trunk accommodation situation information (that is, the function of the trunk accommodation situation information acquisition unit 3208), the determination on the accommodation amount of the object accommodated in the trunk of the vehicle 10A (that is, the function of the accommodation amount determination unit 3209), the accommodation situation notification of the object accommodated in the trunk to the user (that is, the function of the trunk accommodation situation notification unit 3210), or the like.

The processing device 23 of the mobile terminal 20Ac of the deliverer includes the communication processing unit 2301, the communication processing unit 2302, the authentication key acquisition unit 2303, the authentication request unit 2304, the locking and unlocking request unit 2305, and the storage unit 2300, as described above. Further, the processing device 23 of the mobile terminal 20Ac of the deliverer includes, for example, an imaging unit 2310, an image transmission unit 2311, and an image deletion unit 2312 as functional units that are realized by executing one or more programs stored in the ROM or the auxiliary storage device on the CPU.

In the embodiment, the description will be given on the premise that the functions of the authentication key acquisition unit 2303, the authentication request unit 2304, and the locking, unlocking request unit 2305, the imaging unit 2310, the image transmission unit 2311, and the image deletion unit 2312, of the mobile terminal 20Ac are available to the deliverer by the key application being activated.

The authentication key acquisition unit 2303 transmits the authentication key acquisition request to the delivery management server 50 via the communication processing unit 2302 according to a predetermined manipulation by the deliverer. In this case, the authentication key acquisition request includes the above described delivery package information stored in the storage unit 2300 in advance. Accordingly, the delivery management server 50 transmits an authentication key arrangement request to the center server 30 according to the authentication key acquisition request, the center server 30 distributes the authentication key to the mobile terminal 20Ac according to the authentication key arrangement request, and the mobile terminal 20Ac can acquire the authentication key. Therefore, the mobile terminal 20Ac can lock and unlock the trunk lid of the vehicle 10A based on the functions of the communication processing unit 2301, the authentication request unit 2304, and the locking and unlocking request unit 2305 such that the deliverer can deliver the requested package to the trunk of the vehicle 10A, lock the trunk of the vehicle 10A, and leave.

The imaging unit 2310 causes the trunk of the vehicle 10A at the time of the delivery completion of the package to be imaged by the deliverer using the camera 25. For example, when the unlock completion notification of the door that allows the access to the trunk is received from the vehicle 10A (the key unit 12) (that is, when the door that allows the access to the trunk of the vehicle 10A is unlocked), the imaging unit 2310 cause an imaging instruction screen that provides an instruction to image the state of the trunk of the vehicle 10A to be displayed via the communication processing unit 2301. The imaging unit 2310 images the trunk of the vehicle 10A according to the predetermined manipulation of the deliverer on the imaging instruction screen using the camera 25. The trunk image at the time of the delivery captured by the imaging unit 2310 is stored in the storage unit 2300.

The camera 25 of the mobile terminal 20Ac of the deliverer may be set unusable as long as there is no imaging instruction by the imaging unit 2310. Accordingly, for example, it is possible to reduce a situation in which an image regarding the vehicle 10A but not about the trunk is captured and to take account of the user's privacy.

When the trunk image at the time of the delivery is captured by the imaging unit 2310, the image transmission unit 2311 transmits the captured trunk image at the time of the delivery to the center server 30 via the communication processing unit 2302. Accordingly, the center server 30 can acquire the trunk image at the time of the delivery.

The image deletion unit 2312 deletes the trunk image at the time of the delivery stored in the storage unit 2300 according to the predetermined condition.

Details of the operation of the imaging unit 2310, image transmission unit 2311, and the image deletion unit 2312 will be described below (see FIGS. 7 and 8).

Details of Configuration Regarding C2C Car Sharing Service

A configuration regarding a C2C car sharing service in the authentication key management system 1 will be described with reference to FIG. 5.

Figure 5:
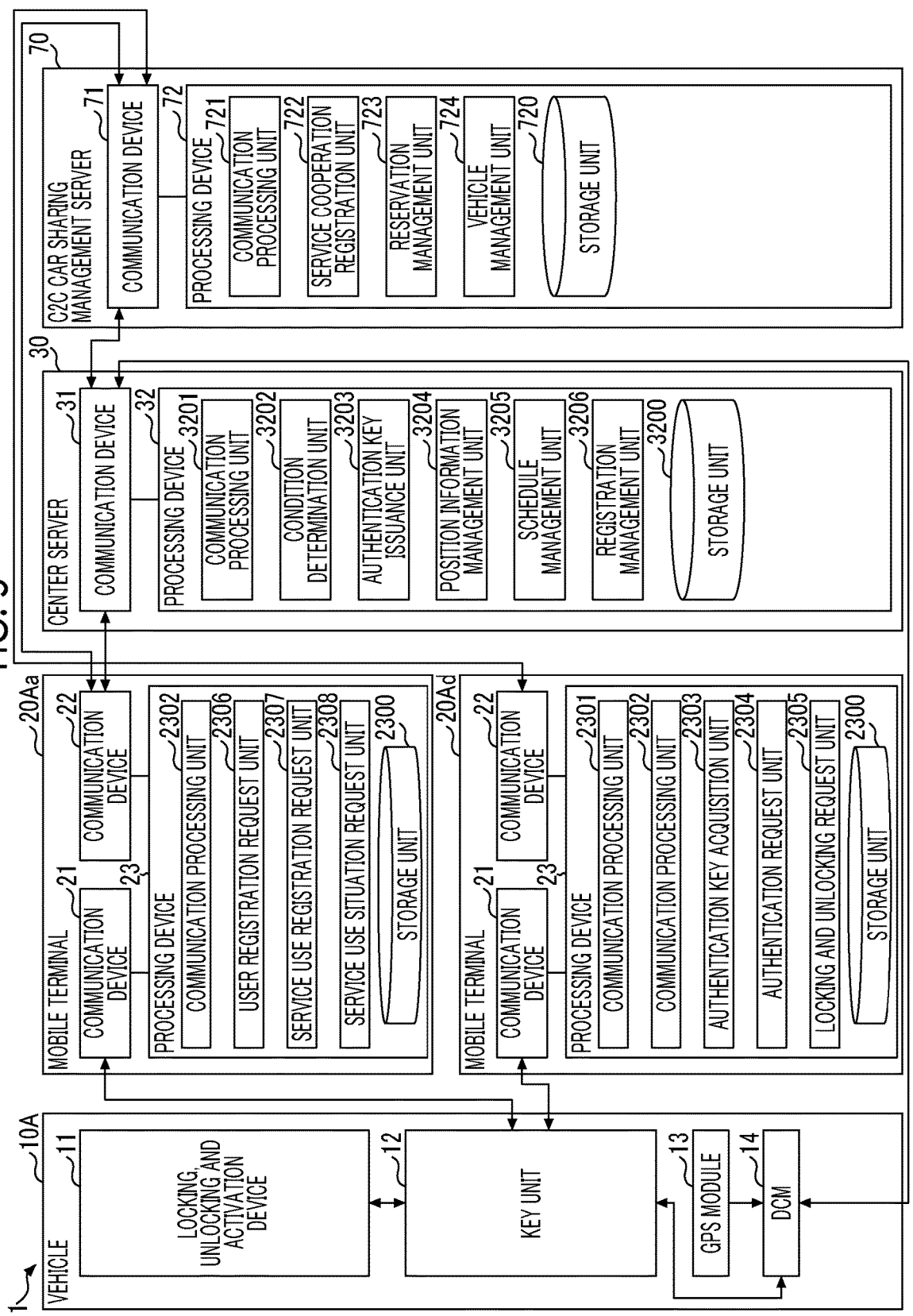
FIG. 5 is a diagram mainly illustrating an example of a configuration regarding a consumer to consumer (C2C) car sharing service in the authentication key management system.

FIG. 5 is a diagram mainly illustrating an example of the configuration regarding the C2C car sharing service in the authentication key management system 1. Hereinafter, the configuration regarding the C2C car sharing service in the authentication key management system 1 will be mainly described with respect to FIG. 5, and duplicate description on the configuration overlapping the above described configuration regarding the key sharing service or the like will be omitted as much as possible.

The processing device 23 of the mobile terminal 20Aa carried by the owner user of the vehicle 10A includes the communication processing unit 2302, the user registration request unit 2306, the service use registration request unit 2307, and the service use situation request unit 2308, as described above.

The user registration request unit 2306 requests the center server 30 to register the regular user (a sub-user) of the vehicle 10A who uses various services including the C2C car sharing service according to a predetermined manipulation by the owner user, as described above.

The service use registration request unit 2307 requests the center server 30 to perform the registration of use of various services including the C2C car sharing service for each registered regular user (the owner user or the sub-user) according to a predetermined manipulation by the owner user, as described above.

For example, the service use registration request unit 2307 transmits, as the service link information, a service use registration request for using the C2C car sharing service including a service login ID of a website for a user who uses the C2C car sharing service corresponding to the C2C car sharing management server 70 (hereinafter referred to as a "C2C car sharing site"), which corresponds to the regular user of the vehicle 10A that is a registration target, to the center server 30.

The service use situation request unit 2308 requests the center server 30 to provide information on a use situation of various services (service use situation information) including the C2C car sharing service of the regular user of the vehicle 10A for which the use registration has been performed, in a form corresponding to the owner user ID according to a predetermined manipulation by the owner user, as described above.

The C2C car sharing management server 70 includes a communication device 71 and a processing device 72.

The communication device 71 is any device that performs bidirectional communication with each of the mobile terminal 20 and the center server 30 over a predetermined communication network.

The processing device 72 includes, for example, a communication processing unit 721, a service cooperation registration unit 722, a reservation management unit 723, and a vehicle management unit 724 as functional units that are realized by executing one or more programs stored in the ROM or the auxiliary storage device on the CPU. The processing device 72 includes a storage unit 720 that is realized as a storage area of an auxiliary storage device or the like of the server computer.

Description will be given on the premise that the information for specifying the vehicle 10A that is a lending target has already been registered (stored) in the storage unit 720 in an aspect in which the information is linked to the service login ID via the C2C car sharing site by the regular user (the owner user) of the vehicle 10A.

The communication processing unit 721 controls the communication device 71 to perform transmission and reception of various signals such as control signals or information signals to and from each of the mobile terminal 20 and the center server 30.

The service cooperation registration unit 722 performs information registration for cooperation between the center server 30 regarding the use of the C2C car sharing service of the regular user of the vehicle 10A and the C2C car sharing management server 70 according to the service use registration completion notification received from the center server 30 by the communication processing unit 721.

For example, the service cooperation registration unit 722 adds a flag indicating a lender of the vehicle 10A the C2C car sharing service to the service login ID included in the service use registration completion notification in the user management DB that manages the user of the C2C car sharing site constructed in the storage unit 720. The C2C car sharing management server 70 transmits the authentication key arrangement request including the service login ID corresponding to the regular user of the vehicle 10A, which is the lender, to the center server 30 such that it is possible to cause the authentication key to be distributed from the center server 30 to the mobile terminal 20Ad of the borrower, as described below.

The reservation management unit 723 manages reservation of use of the vehicle 10A that is performed through the C2C car sharing site or the like.

For example, the reservation management unit 723 receives registration of a date and time on which the vehicle 10A is rentable from the regular user of the vehicle 10A through the C2C car sharing site and registers (stores) the received date and time on which the vehicle 10A is rentable in the storage unit 720. When the date and time on which the vehicle 10A is rentable is stored (registered) in the storage unit 720, the reservation management unit 723 inquires of the center server 30 about the vehicle use schedule information via the communication processing unit 721. Accordingly, the reservation management unit 723 can acquire the latest vehicle use schedule information via the communication processing unit 721. Therefore, the C2C car sharing management server 70, for example, can take countermeasures such as requesting to change the date and time on which the vehicle 10A is rentable, which is received from the regular user of the vehicle 10A, or registering a portion excluding an overlapping portion from the date and time on which the vehicle 10A is rentable as the date and time on which the vehicle 10A is rentable when the received date and time on which the vehicle 10A is rentable already overlaps another schedule or registering.

For example, the reservation management unit 723 receives the reservation of use of the vehicle 10A within a range of the date and time on which the vehicle 10A is rentable, which is stored in the storage unit 720. When the reservation management unit 723 receives the reservation of use of the vehicle 10A from a user who is a borrower through the C2C car sharing site, the reservation management unit 723 updates information on a lending schedule of the vehicle 10A (lending schedule information) stored in the storage unit 720.

For example, when the authentication key acquisition request is received from the mobile terminal 20Ad of the borrower of the vehicle 10A by the communication processing unit 721, the reservation management unit 723 determines whether or not the authentication key acquisition request is a regular authentication key acquisition request. Specifically, the reservation management unit 723 may perform the determination based on the service login ID and the password of the C2C car sharing site included in the authentication key acquisition request, or a relationship regarding the date and time of reservation of use (for example, within a range of the date and time of reservation of use or less than a predetermined time until a date and time of use start). When the authentication key acquisition request is a regular authentication key acquisition request, the reservation management unit 723 transmits an authentication key arrangement request to the center server 30 via the communication processing unit 721. When the authentication key arrangement request is transmitted to the center server 30, information for specifying the mobile terminal 20Ad of the borrower of the vehicle 10A is included in the authentication key arrangement request. The information for specifying the borrower of the vehicle 10A may be, for example, an authentication ID (hereinafter referred to as a "borrower ID" for convenience) for obtaining user authentication in the center server 30 in order for the borrower of the vehicle 10A to use a function of the authentication key acquisition unit 2303 of the mobile terminal 20Ad. Accordingly, the mobile terminal 20Ad of the borrower of the vehicle 10A can acquire the authentication key from the center server 30.

The vehicle management unit 724 manages the vehicle 10A that is a lending target.

For example, the vehicle management unit 724 inquires of the center server 30 about a current position information of the vehicle 10A via the communication processing unit 721 before the date and time of reservation of use of the vehicle 10A (for example, a period from tens of minutes ago to immediately before). The vehicle management unit 724 acquires the current position information of the vehicle 10A replied from the center server 30 according to the inquiry via the communication processing unit 721. Accordingly, a determination can be made as to whether or not the vehicle 10A returns to a designated place before a date and time of lending (a date and time of reservation of use) of the vehicle 10A. Accordingly, when the vehicle 10A does not return to the designated place, the C2C car sharing management server 70 can take countermeasures such as warning the regular user who is a lender of the vehicle 10A so that the vehicle 10A returns to the designated place through an email or a predetermined application cooperating with the C2C car sharing site, which is installed in the mobile terminals 20Aa, 20Ab.

The processing device 32 of the center server 30 includes the communication processing unit 3201, the condition determination unit 3202, the authentication key issuance unit 3203, the position information management unit 3204, the schedule management unit 3205, the registration management unit 3206, and the storage unit 3200, as described above.

When the authentication key arrangement request is received from the C2C car sharing management server 70 by the communication processing unit 3201, the condition determination unit 3202 determines whether or not the authentication key arrangement request is a regular authentication key arrangement request. For example, the condition determination unit 3202 determines whether or not the authentication key arrangement request is the regular authentication key arrangement request based on the service link information included in the authentication key arrangement request (for example, the service login ID of the C2C car sharing site) or predetermined authentication information (for example, the ID and the password) corresponding to the C2C car sharing management server 70.

When the condition determination unit 3202 determines whether or not the authentication key arrangement request is a regular authentication key arrangement request, the authentication key issuance unit 3203 specifies the vehicle 10A corresponding to the authentication key arrangement request based on the user service registration information DB of the storage unit 3200. The authentication key issuance unit 3203 issues the authentication key in which a time is limited (for example, the vehicle is available solely at the date and time of reservation of use of the vehicle 10A included in the authentication key arrangement request and in a buffering period before and after the date and time of reservation of use of the vehicle 10A). The authentication key issuance unit 3203 distributes the authentication key to the mobile terminal 20Ad of the borrower of the vehicle 10A specified by the authentication key arrangement request via the communication processing unit 3201.

The C2C car sharing service may include, for example, a service (hereinafter referred to as a "vehicle trunk lending service" for convenience) in an aspect in which solely a trunk of the vehicle 10A is lent. In the case of a vehicle trunk lending service, the authentication key issuance unit 3203 may issue an authentication key with an authority limited so that locking and unlocking of the trunk lid are allowed. Accordingly, it is possible to limit a lending target of C2C car sharing to solely the trunk. By limiting the lending target of the C2C car sharing to solely the trunk, for example, a vehicle cabin delivery service in an aspect in which the trunk of the vehicle 10A to be lent at a travel destination is borrowed and a purchased product for use at a travel destination is delivered to the borrowed trunk can be realized.

The position information management unit 3204 transmits a position information request to the vehicle 10A via the communication processing unit 3201 according to the inquiry about the current position of the vehicle 10A received from the C2C car sharing management server 70 by the communication processing unit 3201. Accordingly, the position information management unit 3204 can acquire the current position information from the vehicle 10A via the communication processing unit 3201. The position information management unit 3204 replies the C2C car sharing management server 70 with the current position information acquired from the vehicle 10A via the communication processing unit 3201.

The schedule management unit 3205 transmits the latest vehicle use schedule information to the vehicle 10A via the communication processing unit 3201 according to the inquiry about the current position of the vehicle 10A received from the C2C car sharing management server 70 by the communication processing unit 3201.

The registration management unit 3206 performs registration of the regular user (the sub-user) who uses various services including the C2C car sharing service according to the user registration request received from the mobile terminal 20Aa of the owner user by the communication processing unit 3201, as described above. The registration management unit 3206 performs registration of use of the C2C car sharing service by the regular user of the vehicle 10A according to the service use registration request received from the mobile terminal 20Aa of the owner user by the communication processing unit 3201, as described above. When the registration of use of various services including the C2C car sharing service has been completed, the registration management unit 3206 notifies the mobile terminals 20Aa, 20Ab corresponding to the regular users that are registration targets that the registration of use of various services including the C2C car sharing service has been completed via the communication processing unit 3201, as described above. When the registration of use of the C2C car sharing service has been completed, the registration management unit 3206 transmits a service use registration completion notification including the service link information to the C2C car sharing management server 70 that performs an operation and management of a service that is a registration target via the communication processing unit 3201.

The processing device 23 of the mobile terminal 20Ad of the borrower of the vehicle 10A includes the communication processing unit 2301, the communication processing unit 2302, the authentication key acquisition unit 2303, the authentication request unit 2304, the locking and unlocking request unit 2305, and the storage unit 2300, as described above.

The authentication key acquisition unit 2303 transmits an authentication key acquisition request to the C2C car sharing management server 70 via the communication processing unit 2302 according to a predetermined manipulation by the borrower of the vehicle 10A. When the authentication key acquisition request is transmitted, the service login ID of the C2C car sharing site corresponding to the borrower of the vehicle 10A is included in the authentication key acquisition request. Accordingly, the C2C car sharing management server 70 can transmit an authentication key arrangement request to the center server 30 according to the authentication key acquisition request, the center server 30 can distribute the authentication key to the mobile terminal 20Ad according to the authentication key arrangement request, and the mobile terminal 20Ad can acquire the authentication key. Therefore, the mobile terminal 20Ad can lock and unlock the door of the vehicle 10A based on the functions of the communication processing unit 2301, the authentication request unit 2304, and the locking and unlocking request unit 2305. That is, the borrower of the vehicle 10A carrying the mobile terminal 20Ad can directly use the vehicle 10A, such as locking and unlocking the vehicle 10A and driving the vehicle 10A using the mobile terminal 20Ad without performing exchange of a key with the regular user of the vehicle 10A through the C2C car sharing service. Similarly, the regular user of the vehicle 10A can lend the vehicle 10A to another person other than the regular user without exchanging the key. Therefore, it is possible to improve convenience in lending and borrowing of the vehicle 10A between the regular user of the vehicle 10A and another person other than the regular user through the C2C car sharing service in the authentication key management system 1.

Details of Configuration Regarding B2C Car Sharing Service

A B2C car sharing service in the authentication key management system 1 will be described with reference to FIG. 6.

Figure 6:
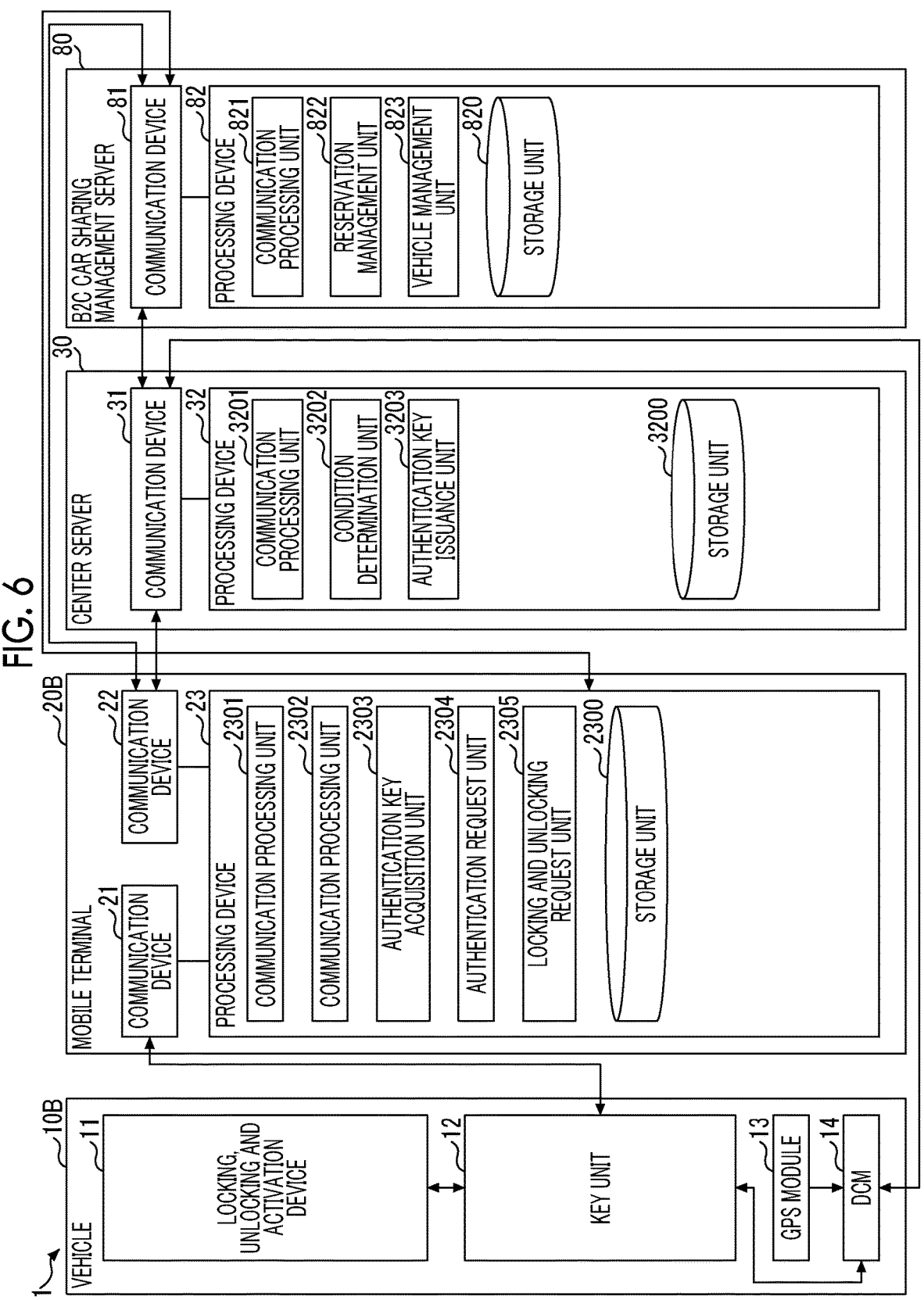
FIG. 6 is a diagram mainly illustrating an example of a configuration regarding a business to consumer (B2C) car sharing service in the authentication key management system.

FIG. 6 is a diagram mainly illustrating an example of the configuration regarding the B2C car sharing service in the authentication key management system 1. Hereinafter, the configuration regarding the B2C car sharing service in the authentication key management system 1 will be mainly described with respect to FIG. 6, and duplicate description on the configuration overlapping the above described configuration regarding the key sharing service or the like will be omitted as much as possible.

The B2C car sharing management server 80 includes a communication device 81 and a processing device 82.

The communication device 81 is any device that performs bidirectional communication with each of the mobile terminal 20B and the center server 30 over a predetermined communication network.

The processing device 82 includes, for example, a communication processing unit 821, a reservation management unit 822, and a vehicle management unit 823 as functional units that are realized by executing one or more programs stored in the ROM or the auxiliary storage device on the CPU. The processing device 82 includes a storage unit 820 that is realized as a storage area of an auxiliary storage device or the like of the server computer.

The communication processing unit 821 controls the communication device 81 to perform transmission and reception of various signals such as control signals or information signals to and from each of the mobile terminal 20B and the center server 30.

The reservation management unit 822 manages the reservation of use of the vehicle 10B that is performed through the B2C car sharing site or the like.

For example, the reservation management unit 822 receives reservation of use of the vehicle 10B from a user (hereinafter referred to as a "borrower user") who wants to borrow the vehicle 10B through a website that is operated by a company of the B2C car sharing management server 80 or the like (hereinafter referred to as a "B2C car sharing site" for convenience). The reservation management unit 822 stores information on the received reservation of use of the vehicle 10B (use reservation information) in the storage unit 820. When the information on use reservation (use reservation information) is stored in the storage unit 820, for example, information for specifying the vehicle 10A that is a target, information on a date and time of reservation of use (a start date and time of use and an end date and time of use), and a service login ID of the borrower user in the B2C car sharing site may be included in the use reservation information.

For example, the reservation management unit 822 updates the information on the use schedule of the vehicle 10B (the vehicle use schedule information) stored in the storage unit 820 each time the reservation management unit 822 receives the reservation of use of the vehicle 10B. Accordingly, the B2C car sharing management server 80 can display the use schedule of the vehicle 10B on the B2C car sharing site to present a date and time when the reservation of use can be made, to the borrower user.

For example, when the authentication key request is received from the mobile terminal 20B by the communication processing unit 821, the reservation management unit 822 determines whether or not the authentication key request is a regular authentication key request. Specifically, the reservation management unit 822 may perform the determination based on the service login ID and the password of the B2C car sharing site corresponding to the borrower user included in the authentication key request, or a relationship regarding the date and time of reservation of use (for example, within a range of the date and time of reservation of use or less than a predetermined time until a date and time of use start). When the authentication key request is a regular authentication key acquisition request, the reservation management unit 822 transmits an authentication key arrangement request to the center server 30 via the communication processing unit 821. When the authentication key arrangement request is transmitted to the center server 30, information for specifying the mobile terminal 20B of the borrower user borrowing the vehicle 10B is included in the authentication key arrangement request. The information for specifying the borrower user borrowing the vehicle 10B may be, for example, an authentication ID (hereinafter referred to as a "borrower user ID" for convenience) for obtaining user authentication in the center server 30 in order for the borrower user borrowing the vehicle 10B to use a function of a key application corresponding to the authentication key acquisition unit 2303 of the mobile terminal 20B or the like. Accordingly, the mobile terminal 20B of the borrower user borrowing the vehicle 10B can acquire the authentication key from the center server 30.

The vehicle management unit 823 manages the vehicle 10B that is a lending target.

For example, the vehicle management unit 823 inquires of the center server 30 about the vehicle 10B parked in the vicinity (for example, within hundreds of meters) of a place designated in the reservation of use via the communication processing unit 821 before the date and time of reservation of use of the vehicle 10B of a borrower user (for example, before tens of minutes). The vehicle management unit 823 acquires the position information of the vehicle 10B parked in the vicinity of the designated place replied from the center server 30 according to the inquiry via the communication processing unit 821. Accordingly, the vehicle management unit 823 can specify one or a plurality of vehicles 10B parked around the designated place and determine, for example, the vehicle 10B to be lent before the start date and time of use of the vehicle 10B of the borrower.

For example, the vehicle management unit 823 inquires of the center server 30 about the position information of the vehicle 10B in the designated area via the communication processing unit 821 according to a search request of the vehicle 10B in a designated area by the borrower user at the B2C car sharing site. The vehicle management unit 823 acquires the position information of the vehicle 10B in the designated area replied from the center server 30 according to the inquiry via the communication processing unit 821. Accordingly, the vehicle management unit 823, for example, can present the position information of the vehicle 10B that is a target to the borrower user who wants to borrow the vehicle 10B in the designated area immediately at the B2C car sharing site.

The processing device 32 of the center server 30 includes the communication processing unit 3201, the condition determination unit 3202, the authentication key issuance unit 3203, and the storage unit 3200, as described above.

When the authentication key arrangement request received from the B2C car sharing management server 80 is received by the communication processing unit 3201, the condition determination unit 3202 determines whether or not the authentication key arrangement request is a regular authentication key arrangement request. For example, the condition determination unit 3202 determines whether or not the authentication key arrangement request is the regular authentication key arrangement request based on whether or not the borrower user ID included in the authentication key arrangement request is the authentication ID already registered in the storage unit 3200, or on predetermined authentication information (for example, an ID and password) corresponding to the B2C car sharing management server 80.

When the condition determination unit 3202 determines whether or not the authentication key arrangement request is the regular authentication key arrangement request, the authentication key issuance unit 3203 issues the authentication key in which a time is limited (for example, the vehicle is available solely at the date and time of reservation of use of the vehicle 10B included in the authentication key arrangement request and in a buffering period before and after the date and time of reservation of use of the vehicle 10B). The authentication key issuance unit 3203 distributes the authentication key to the mobile terminal 20B of the borrower user borrowing the vehicle 10B specified by the authentication key arrangement request via the communication processing unit 3201.

The processing device 23 of the mobile terminal 20B of the borrower user borrowing the vehicle 10B includes the communication processing unit 2301, the communication processing unit 2302, the authentication key acquisition unit 2303, the authentication request unit 2304, the locking and unlocking request unit 2305, and the storage unit 2300, as described above.

The authentication key acquisition unit 2303 transmits an authentication key acquisition request to the B2C car sharing management server 80 via the communication processing unit 2302 according to a predetermined manipulation by the borrower user of the vehicle 10B. When the authentication key acquisition request is transmitted, the service login ID of the B2C car sharing site corresponding to the borrower user borrowing the vehicle 10B is included in the authentication key acquisition request. Accordingly, the B2C car sharing management server 80 can transmit an authentication key arrangement request to the center server 30 according to the authentication key acquisition request, the center server 30 can distribute the authentication key to the mobile terminal 20B according to the authentication key arrangement request, and the mobile terminal 20B can acquire the authentication key. Therefore, the mobile terminal 20B can lock and unlock the door of the vehicle 10B based on the functions of the communication processing unit 2301, the authentication request unit 2304, and the locking and unlocking request unit 2305. That is, the borrower user borrowing the vehicle 10B carrying the mobile terminal 20B can directly use the vehicle 10B, such as locking and unlocking the vehicle 10B and driving the vehicle 10B using the mobile terminal 20B without performing exchange of a key with the company of the vehicle 10B through the B2C car sharing service. Therefore, it is possible to improve convenience for the borrower user borrowing the vehicle 10B through the B2C car sharing service in the authentication key management system 1.

Characteristic Operation of Mobile Terminal of Deliverer

Figure 7:
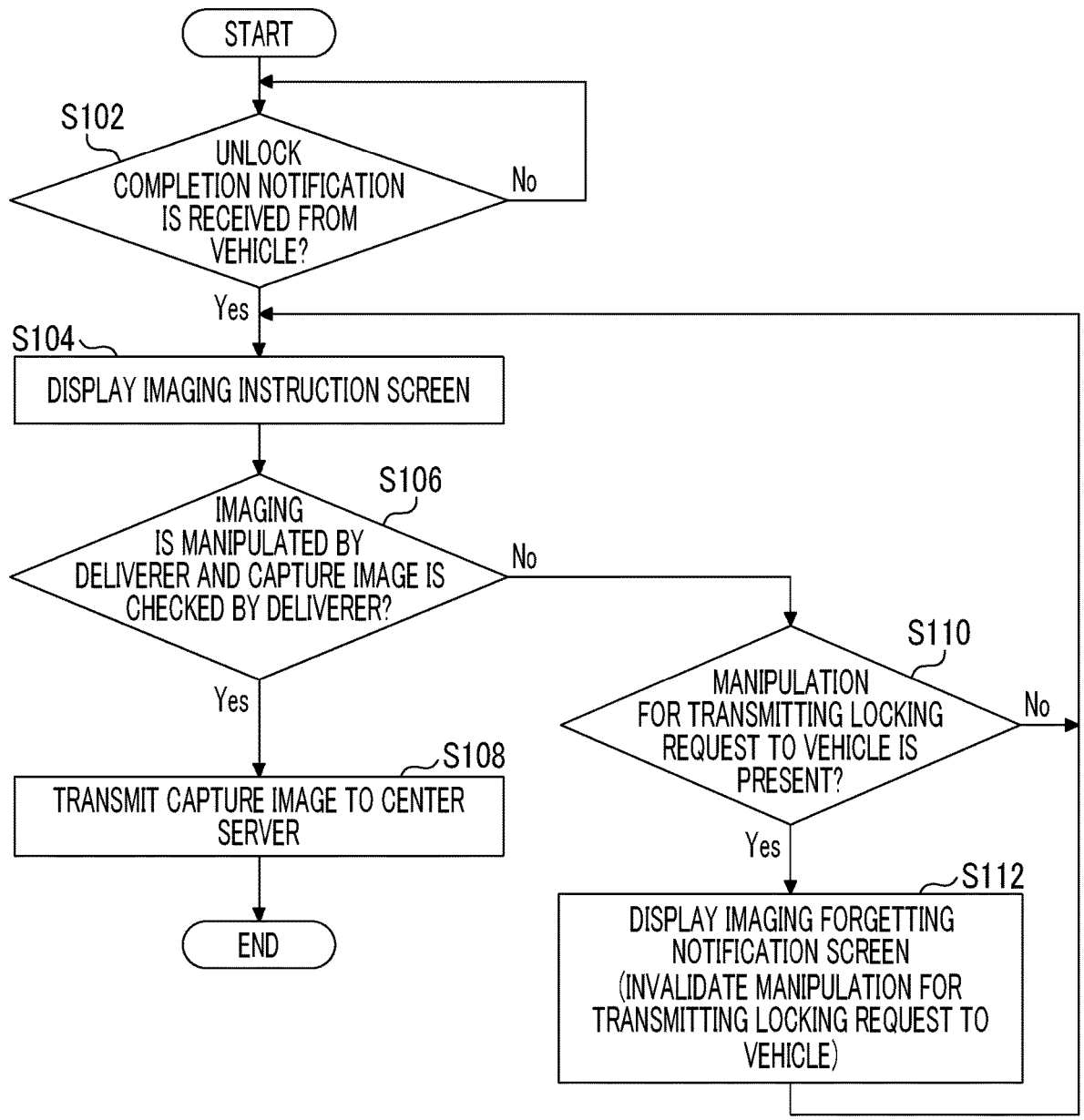
FIG. 7 is a flowchart schematically illustrating a first example of trunk image acquisition processing by a mobile terminal carried by a deliverer.
Figure 8:
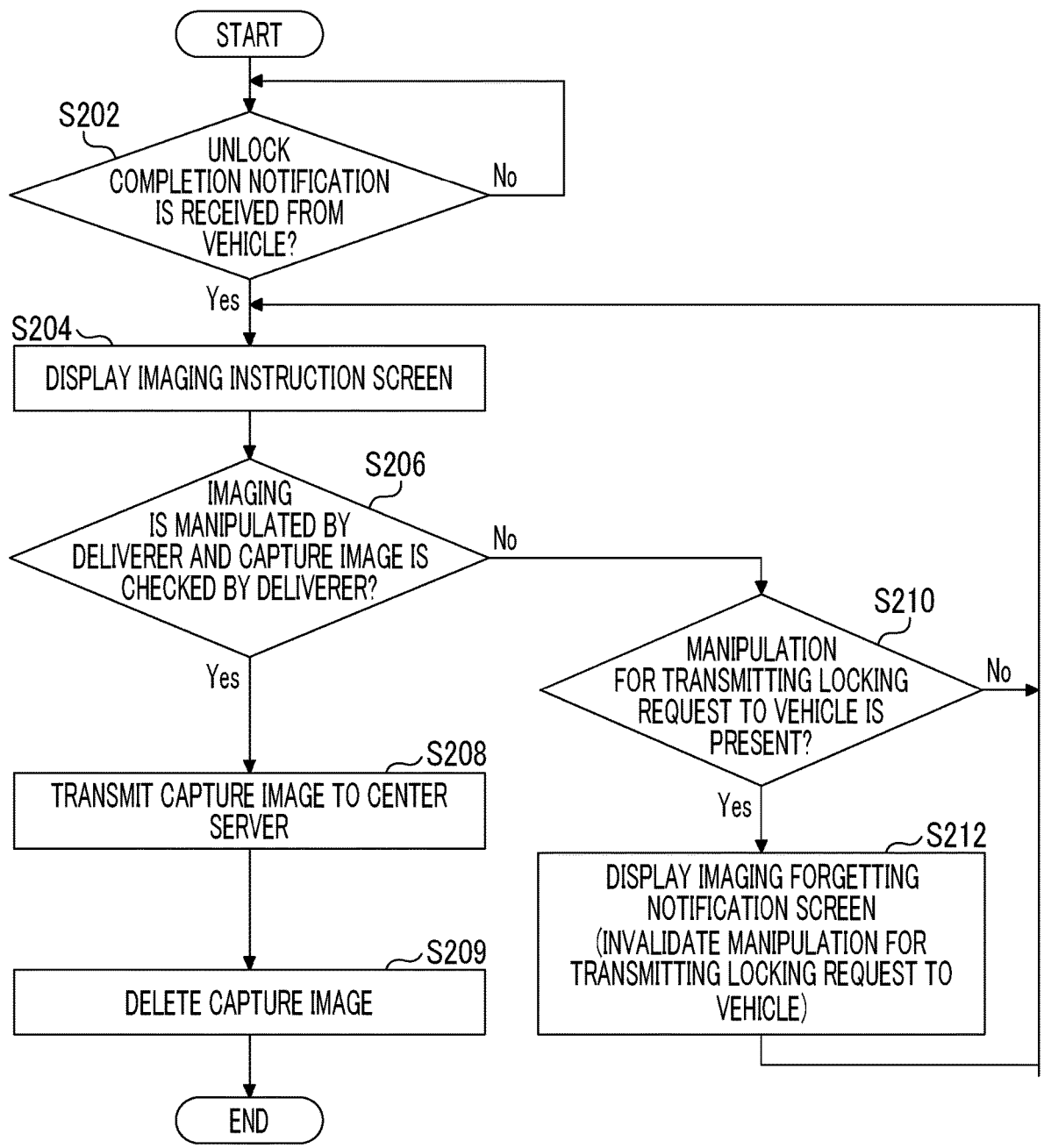
FIG. 8 is a flowchart schematically illustrating a second example of the trunk image acquisition processing by the mobile terminal carried by the deliverer.

With reference to FIGS. 7 and 8, flow of processing of the characteristic operation by the mobile terminal 20Ac of the deliverer, that is, the processing of acquiring the image of the trunk of the vehicle 10A as the delivery destination at the time of the delivery of the package (trunk image acquisition processing) will be described.

FIG. 7 is a flowchart schematically illustrating a first example of the trunk image acquisition processing by the mobile terminal 20Ac of the deliverer. The processing according to the flowchart is executed when the unlocking request is transmitted from the mobile terminal 20Ac of the deliverer to the vehicle 10A. Hereinafter, the same applies to the processing according to a flowchart of FIG. 8.

In step S102, the imaging unit 2310 determines whether or not the unlock completion notification has been received from the vehicle 10A (the key unit 12) via the communication processing unit 2301. When the unlock completion notification is received from the vehicle 10A, the imaging unit 2310 determines that the vehicle 10A is unlocked and proceeds to step S104 and, otherwise, repeats the processing until the unlock completion notification is received.

For some reason such as a communication failure, the unlock completion notification may not be received from the vehicle 10A even after some time has elapsed. In such a case, the imaging unit 2310 may cause the display 24 to manually display a screen for transfer to the imaging instruction screen in step S104. For example, the imaging unit 2310 causes a screen for the deliverer to check whether or not unlocking of the vehicle 10A is completed to be displayed, and when a manipulation corresponding to an answer that unlocking has been completed is performed, the processing may proceed to step S104.

In step S104, the imaging unit 2310 causes the display 24 to display the imaging instruction screen.

In step S106, the imaging unit 2310 determines whether or not the predetermined imaging manipulation has been performed by the deliverer on the imaging instruction screen and the capture image is checked by the deliverer. For example, the imaging unit 2310 causes the display 24 to display a check screen for checking whether or not there is a problem with the current capture image after the imaging manipulation by the deliverer, and determines whether the predetermined manipulation of the deliverer for checking whether there is no problem has been performed on the check screen. The imaging unit 2310 proceeds to step S108 when the predetermined imaging manipulation has been performed by the deliverer on the imaging instruction screen and the capture image is checked by the deliverer, otherwise proceeds to step S110.

The imaging unit 2310 determines whether or not the current capture image is an appropriate image indicating the situation in the trunk, and the fact that the current capture image is the appropriate image may be added to the determination condition in step S106 as "AND condition". For example, the imaging unit 2310 may apply a known image recognition technique to determine whether or not the current capture image is the appropriate image indicating the situation in the trunk depending on whether the current capture image corresponds to the trunk, satisfies a condition needed to check the accommodation situation of the trunk (for example, whether there is no camera shake or the like), or the like. Accordingly, when an image not about the trunk is captured, or an image is captured, by which the accommodation situation in the trunk cannot be checked due to the camera shake or the like, the deliverer can capture the image again.

In step S108, the image transmission unit 2311 transmits the currently captured capture image (that is, the trunk image at the time of the delivery) to the center server 30 via the communication processing unit 2302 to end the current processing. In this case, the image transmission unit 2311 transmits, to the center server 30, the trunk image at the time of the delivery, to which other information such as the information specifying the package that is a target and information specifying the requester of the package is given.

In step S110, the imaging unit 2310 determines whether or not the manipulation for transmitting the locking request to the vehicle 10A has been performed by the deliverer. The imaging unit 2310 proceeds to step S112 when the manipulation for transmitting the locking request to the vehicle 10A has been performed by the deliverer, otherwise returns to step S104.

In step S112, the locking and unlocking request unit 2305 invalidates the manipulation of transmitting the locking request by the deliverer to the vehicle 10A, and the imaging unit 2310 causes the display 24 to display a notification screen (an imaging forgetting notification screen) notifying that the capturing of the image of the trunk at the time of the delivery completion is forgotten, and the processing returns to step S104. Accordingly, even when the deliverer forgets to capture the image of the trunk and is about to lock the vehicle 10A after the package has been accommodated in the trunk of the vehicle 10A, the imaging unit 2310 can make the deliverer recognize that the deliverer has forgotten to image the trunk.

As described above, in the example, at the time of the delivery of the package to the trunk of the vehicle 10A (specifically, when the door that allows the access to the trunk of the vehicle 10A is unlocked), the processing device 23 of the mobile terminal 20Ac of the deliverer can cause the state of the trunk of the vehicle 10A to be imaged by the deliverer using the camera 25. The processing device 23 can transmit (upload) the capture image (that is, the trunk image at the time of the delivery) to the center server 30.

As described above, when the functions of the trunk accommodation situation information acquisition unit 3208 and the trunk accommodation situation notification unit 3210 of the center server 30 are provided in the delivery management server 50, the processing device 23 of the mobile terminal 20Ac of the deliverer transmits the trunk image at the time of the delivery to the delivery management server 50.

Subsequently, FIG. 8 is a flowchart schematically illustrating a second example of the trunk image acquisition processing by the mobile terminal 20Ac of the deliverer.

Since processing of steps S202 to S208 is the same as the processing of steps S102 to S108 of FIG. 7, description thereof will be omitted.

After step S208, in step S209, the image deletion unit 2312 deletes the current capture image stored in the internal memory of the processing device 23 such as the storage unit 2300 or the like, and the current processing ends.

Since processing of steps S210 and S212 is the same as the processing of steps S110 and S112 in FIG. 7, description thereof will be omitted.

As described above, in the example, the processing device 23 of the mobile terminal 20Ac of the deliverer deletes (erases) the current capture image stored in the internal memory or the like when the current capture image (the trunk image at the time of the delivery) is transmitted to the center server 30. The inside of the trunk of the vehicle 10A is a space that can accommodate a private object or the like of the regular users of the vehicle 10A, and it is possible to reduce the situation in which the trunk image at the time of the delivery remains on the mobile terminal 20Ac of the deliverer. That is, the processing device 23 can upload the information indicating the accommodation situation of the object accommodated in the trunk (the trunk image at the time of delivery) to the center server 30 while paying attention to the user's privacy.

Characteristic Operation of Center Server

Next, with reference to FIGS. 9 to 11, the characteristic operation by the center server 30, that is, the processing flow of processing of notifying the user of the vehicle cabin delivery service (the regular user of the vehicle 10A) of the accommodation situation of the object accommodated in the trunk of the vehicle 10A will be described.

FIG. 9 is a flowchart schematically illustrating a first example of the trunk accommodation situation notification processing by the center server 30. The processing according to this flowchart is repeatedly executed at predetermined processing intervals. Hereinafter, the same applies to the processing according to flowcharts of FIGS. 10 and 11.

In step S302, the trunk accommodation situation notification unit 3210 determines whether or not the trunk image captured at the time of the delivery completion of the package (the trunk image at the time of the delivery) has been received from the mobile terminal 20Ac of the deliverer by the communication processing unit 3201. When the trunk image at the time of the delivery is received from the mobile terminal 20 Ac of the deliverer, the trunk accommodation situation notification unit 3210 proceeds to step S304 and, otherwise, the current processing ends.

In step S304, the trunk accommodation situation notification unit 3210 (an example of the delivery completion notification unit) transmits the delivery completion notification, for example, in a mode of a push notification using the key application, to the mobile terminal 20 (the mobile terminal 20Aa or the mobile terminal 20Ab) of the requester of the delivered package (the regular user of the vehicle 10A) which is specified from the other information given to the received trunk image at the time of the delivery. Further, the trunk accommodation situation notification unit 3210 transmits the trunk image at the time of the delivery to the mobile terminal 20 of the requester of the delivered package in the same manner. In this case, the trunk accommodation situation notification unit 3210 may transmit the delivery completion notification and the trunk image at the time of the delivery as one piece of information at one time, or may separately transmit at different timings.

The trunk accommodation situation notification unit 3210 may transmit at least one of the delivery completion notification and the trunk image at the time of the delivery to the email address or the predetermined SNS account of the requester registered in advance in the storage unit 3200 instead of direct transmission to the mobile terminal 20 of the requester. As described above, when the mode is adopted in which the delivery completion notification is transmitted from the delivery company (the delivery management server 50) to the requester, the transmission of the delivery completion notification is omitted.

In step S306, the trunk accommodation situation notification unit 3210 transmits the delivery completion notification of the package that is a target to the delivery management server 50 (that is, the delivery company) via the communication processing unit 3201, and ends the process. Accordingly, the delivery management server 50 can check whether the package has been appropriately delivered even in a mode in which the delivery completion notification is not directly transmitted from the mobile terminal 20Ac of the deliverer to the delivery management server 50.

As described above, in the example, when the trunk image at the time of the delivery is received from the mobile terminal 20Ac of the deliverer, the center server 30 transmits the trunk image at the time of the delivery indicating the latest accommodation situation of the object accommodated in the trunk of the vehicle 10A to the requester of the delivered package. Accordingly, the center server 30 can notify the user of the latest accommodation situation of the object accommodated in the trunk of the vehicle 10A in the mode in which the trunk image at the time of the delivery is provided to the requester (the user of the vehicle cabin delivery service). Therefore, the center server 30 can make the user grasp the accommodation situation of the object accommodated in the trunk of the vehicle 10A which is the delivery destination of the vehicle cabin delivery service.

Further, in the example, when the trunk image at the time of the delivery is received from the mobile terminal 20Ac of the deliverer, the center server 30 determines that the package has been delivered and transmits the delivery completion notification to the requester of the delivered package. Accordingly, the center server 30 does not need to impose the manipulation of notifying the delivery company or the like that the delivery has been completed, for example, other than causing the state of the trunk to be imaged by the deliverer using the camera 25, for example. Therefore, the center server 30 can facilitate a collection of the trunk image at the time of the delivery indicating the accommodation situation of the object accommodated in the trunk at the time of delivery completion while reducing the labor of the deliverer.

FIG. 10 is a flowchart schematically illustrating a second example of the trunk accommodation situation notification processing by the center server 30.

In step S402, the trunk accommodation situation notification unit 3210 determines whether or not the delivery preparation notification has been received from the delivery management server 50 by the communication processing unit 3201. When the delivery preparation notification is received from the delivery management server 50, the trunk accommodation situation notification unit 3210 proceeds to step S404, otherwise the current processing ends.

In step S404, the trunk accommodation situation information acquisition unit 3208 acquires the latest trunk accommodation situation information of the vehicle 10A corresponding to the delivery destination of the package specified by the delivery preparation notification. The acquired trunk accommodation situation information may include the trunk image at the time of the delivery, the sensor detection information on the inside of the trunk, the request history information, the door opening history information, or the like as described above.

In step S406, the accommodation amount determination unit 3209 executes the processing of determining the accommodation amount of the object accommodated in the vehicle 10A based on the acquired trunk accommodation situation information.

In this example, the accommodation amount of the vehicle 10A is determined at the timing at which package delivery preparation is started, but may be determined at any timing.

In step S408, the accommodation amount determination unit 3209 determines whether or not the accommodation amount of the object accommodated in the vehicle 10A exceeds the predetermined criterion by which the additional package delivery to the trunk can be determined to be unavailable. When the accommodation amount of the trunk of the vehicle 10A exceeds the predetermined criterion, the accommodation amount determination unit 3209 proceeds to step S410, and otherwise, the current processing ends.

In step S410, the trunk accommodation situation notification unit 3210 transmits, for example, the notification related to the determination result that the accommodation amount of the trunk of the vehicle 10A exceeds the predetermined criterion and the situation is that the additional package delivery is not possible (an additional delivery unavailability notification) to the mobile terminal 20 (the mobile terminal 20Aa or the mobile terminal 20Ab) of the requester of the delivered package (the regular user of the vehicle 10 A), via the communication processing unit 3201, in the mode of the push notification using the key application. Accordingly, the requester of the package that is the user of the vehicle cabin delivery service can recognize that the accommodation amount of trunk of the vehicle 10A exceeds the criterion such that the additional delivery is not possible.

The trunk accommodation situation notification unit 3210 may transmit the additional delivery unavailability notification to the email address or the predetermined SNS account of the requester registered in advance in the storage unit 3200 instead of direct transmission to the mobile terminal 20 of the requester. The same applies to the additional delivery unavailability notification and the delivery work procedure change request in step S510 in FIG. 11 to be described later.

In step S412, the trunk accommodation situation notification unit 3210 transmits the additional delivery unavailability notification similar to in step S410 to the delivery management server 50 (that is, the delivery company) via the communication processing unit 3201. Accordingly, the delivery company can recognize that a probability is high that the package cannot be delivered to the trunk of the vehicle 10A designated as the delivery destination of the package that is a target. Therefore, the delivery company can postpone (delay) delivery order of the package or temporarily suspend the delivery work, and thus it is possible to change the procedure regarding the package delivery work and to suppress the decrease in the work efficiency of the vehicle cabin delivery service.

As described above, when the accommodation amount of the object accommodated in the trunk of the vehicle 10A designated as the delivery destination of the package exceeds the predetermined criterion, the center server 30 notifies the user of the vehicle cabin delivery service that the accommodation amount of the trunk exceeds the predetermined criterion. Accordingly, the center server 30 can notify the user of the vehicle cabin delivery service of the latest accommodation situation of the object accommodated in the trunk of the vehicle 10A, specifically the situation where the accommodation amount of the trunk exceeds the predetermined criterion. Therefore, the center server 30 can make the user grasp the accommodation situation of the object accommodated in the trunk of the vehicle 10A which is the delivery destination of the vehicle cabin delivery service and, for example, do action such as taking out the delivered package or unnecessary object from the trunk of the vehicle 10A.

FIG. 11 is a flowchart schematically illustrating a third example of the trunk accommodation situation notification processing by the center server 30.

Since processing of steps S502 to S508 is the same as the processing of steps S402 to S408 of FIG. 4, description thereof will be omitted.

In step S508, when the accommodation amount of the trunk of the vehicle 10A exceeds the predetermined criterion, the accommodation amount determination unit 3209 proceeds to step S510.

In step S510, the trunk accommodation situation notification unit 3210 transmits the additional delivery unavailability notification to the mobile terminal 20 of the requester via the communication processing unit 3201, similar to step S410 in FIG. 10. Further, the trunk accommodation situation notification unit 3210 (an example of a delivery work procedure change unit) transmits, to the mobile terminal 20 of the requester in the same manner via the communication processing unit 3201, the notification prompting the request of the procedure change regarding the deliver work of the package for which the trunk of the vehicle 10A is designated as the delivery destination (the delivery work procedure change request) to the delivery company. In this case, the trunk accommodation situation notification unit 3210 may transmit the additional delivery unavailability notification and the delivery work procedure change request as one piece of information at one time, or may separately transmit at different timings. The procedure change regarding the delivery work of the package includes at least one of a suspension of the delivery work of the package, a delivery destination change of the package, and a delivery date and time change (that is, a request for a redelivery after changing the date and time) or the like. Accordingly, in a situation where the probability is high that the package cannot be delivered to the trunk of the vehicle 10A, the center server 30 can prompt the user of the vehicle cabin delivery service to request the procedure change regarding the delivery work of the package such as the temporary suspension of the delivery work of the package that is a target.

The delivery work procedure change request may include information that specifies all packages yet to be delivered for which the trunk of the vehicle 10A is designated as the delivery destination. Accordingly, the center server 30 can make the user grasp all the packages yet to be delivered and the user can perform the procedure change regarding the delivery work of all the packages yet to be delivered without fail.

Further, the delivery work procedure change request may serve as the control signal that directly causes the display 24 of the mobile terminal 20 (mobile terminal 20Aa or mobile terminal 20Ab) of the user of the vehicle cabin delivery service, to display the web site for the procedure change regarding the delivery work of the package (for example, the delivery site) or the window or screen of the predetermined application program (for example, the key application) that links to the website. For example, the delivery work procedure change request may control the key application, and cause a web page that requests the procedure change regarding the delivery work for the delivery site on the browser in the key application (a change request page), or the screen that is provided exclusively as the screen in the key application and links to the change request page (the change request screen), to be displayed. Accordingly, the user does not need to perform the manipulation of causing the display 24 of the mobile terminal 20 to display the delivery site or the like, or to perform manipulation to start the key application or the like that links to the delivery site. Therefore, the center server 30 can improve the user's convenience and as a result, it is possible for the user to prompt the procedure change regarding the delivery work of the package.

The transmission destination of the delivery work procedure change request may be a terminal other than the mobile terminal 20 used by the requester (for example, a computer terminal such as a desktop type or a laptop type). In this case, instead of the change request screen, the window of the predetermined application program (change request window) that links to the change request page may be displayed on the display of the terminal. Further, as described above, the delivery work procedure change request may be transmitted to the email address or the predetermined SNS account of the user of the vehicle cabin delivery service.

Further, in the display device such as the display of the terminal used by the user, the delivery work procedure change request may include the link information by the URL scheme for causing the website for the procedure change regarding the delivery work of the package (for example, the delivery site) or the window or screen of the predetermined application program that links to the website, to be displayed.

Since processing of step S512 is the same as the processing of step S412 in FIG. 10, description thereof will be omitted.

As described above, in the example, when the accommodation amount of the object accommodated in the trunk of the vehicle 10A designated as the delivery destination of the package exceeds the predetermined criterion, the center server 30 notifies the user to request the delivery company to change the procedure regarding the delivery work of the package (for example, redelivery after the change of the delivery date and time). Accordingly, in a situation where the probability is high that the additional package cannot be delivered to the trunk of the vehicle 10A, the center server 30 can make the user request the delivery company to change the procedure regarding the delivery work of the package. Therefore, center server 30 can reduce the inefficient delivery work or the like in which the deliverer heads for the vehicle 10A for the delivery despite the situation where the probability is high that the additional package cannot be delivered to trunk of the vehicle 10A, and to improve the work efficiency in the vehicle cabin delivery service.

Either or both of the processing of FIG. 9 and processing of FIG. 10 or FIG. 11 may be executed.

Operation

In the embodiment, the trunk accommodation situation information acquisition unit 3208 acquires the information on the accommodation situation of the object accommodated in the vehicle cabin (trunk) of the vehicle 10A that can be designated as the delivery destination of the package. Based on the trunk accommodation situation information acquired by the trunk accommodation situation information acquisition unit 3208, the trunk accommodation situation notification unit 3210 notifies the user of the accommodation situation of the object accommodated in the vehicle cabin (trunk) of the vehicle 10A.

Accordingly, based on the information on the accommodation situation of the vehicle cabin in the vehicle 10A which is the delivery destination of the acquired package, the center server 30 or the delivery management server 50 (hereinafter referred to as the "center server 30 or the like", for the convenience) can notify the user of the accommodation situation of the object accommodated in the vehicle cabin in the vehicle 10A. Therefore, the center server 30 can make the user grasp the accommodation situation of the object accommodated on the inside of the vehicle cabin of the vehicle 10A which is the delivery destination of the package.

Further, in the embodiment, the trunk accommodation situation information acquisition unit 3208 acquires the capture image inside the vehicle cabin (trunk) which is captured at the time of the delivery of the package by the mobile terminal 20 which is carried by the deliverer of the package and is equipped with the imaging function. The trunk accommodation situation notification unit 3210 transmits the acquired capture image of the package in the vehicle cabin (trunk) at the time of the delivery to the user's predetermined terminal (for example, the mobile terminal 20Aa, 20Ab), the user's email address or the user's predetermined SNS account via the communication processing unit 3201.

Accordingly, the center server 30 or the like transmits the acquired capture image inside the vehicle cabin captured by the mobile terminal 20Ac of the deliverer at the time of the delivery of the package to the user's terminal or the like, and thus it is possible to make the user specifically grasp the accommodation situation of the object accommodated inside the vehicle cabin of the vehicle 10A. Therefore, the center server 30 or the like can make the user grasp whether the package scheduled to be delivered is in a deliverable situation, the package is actually delivered, or the like, by the capture image at the time of the delivery, for example.

Further, in the embodiment, when the capture image has been acquired from the mobile terminal 20Ac of the deliverer, the trunk accommodation situation notification unit 3210 transmits the package delivery completion notification to the user's predetermined terminal, the user's email address or the user's predetermined SNS account via the communication processing unit 3201.

Accordingly, the center server 30 or the like can recognize the delivery completion of the package by acquiring the capture image captured by the mobile terminal 20 of the deliverer at the time of the delivery. Therefore, for example, the deliverer does not need to perform additional work of providing the notification of merely the delivery completion from the mobile terminal 20Ac to the center server 30 or the like, on top of the work of capturing the image inside the vehicle cabin at the time of the delivery completion. Therefore, the center server 30 or the like can notify the user of the delivery completion while reducing work burden on the deliverer at the time of the delivery.

Further, in the embodiment, based on the information acquired by the trunk accommodation situation information acquisition unit 3208, the accommodation amount determination unit 3209 determines whether accommodation amount of the object accommodated in the vehicle cabin of the vehicle 10A exceeds the predetermined the criterion. When the accommodation amount determination unit 3209 determines that the accommodation amount exceeds the predetermined criterion, the trunk accommodation situation notification unit 3210 provides the notification of the determination result to the user's predetermined terminal, the user's email address or the user's predetermined SNS account.

Accordingly, when the accommodation amount of the object accommodated on the inside of the vehicle cabin of the vehicle 10A as the delivery destination of the package exceeds the predetermined criterion such that the accommodation of an additional package is difficult, for example, the center server 30 or the like can notify the user of the determination result. Therefore, the center server 30 or the like can make the user grasp whether the package scheduled to be delivered is in the deliverable situation or the like, depending on a presence or absence of the notification, for example.

Further, in the embodiment, when the accommodation amount determination unit 3209 determines that the accommodation amount exceeds the predetermined criterion, via the communication processing unit 3201, trunk accommodation situation notification unit 3210 provides the notification to the user's predetermined terminal, the user's email address or the user's predetermined SNS account such that at least a procedure change regarding the delivery work of the package is requested to the delivery company, the change including the temporary suspension of the delivery work of the package yet to be delivered, the redelivery of the package yet to be delivered at the date and time different from the date and time currently set, and the change of the delivery destination of the package yet to be delivered.

Accordingly, when the accommodation amount of the object accommodated on the inside of the vehicle cabin of the vehicle 10A as the delivery destination of the package exceeds the predetermined criterion such that the accommodation of the additional package is difficult, for example, the center server 30 or the like can make the user request the procedure change regarding the delivery work of the package such as the temporary suspension of the delivery work of the package or the like to the delivery company. Therefore, the center server 30 or the like makes it less likely for the deliverer to head for the vehicle 10A or the like, in a situation where the package cannot be accommodated inside the vehicle cabin of the vehicle 10A. Therefore, even in the situation where the additional package cannot be delivered to the inside of the vehicle cabin of the vehicle 10A designated as the delivery destination of the package, the center server 30 or the like can improve an efficiency of the delivery work.

Further, in the embodiment, the trunk accommodation situation notification unit 3210 transmits the notification to the user's predetermined terminal (for example, the mobile terminal 20Aa, 20Ab) to cause the display device (the display 24) of the terminal to display the website for the procedure change regarding the package delivery work or the window of the application program that links to the website and is installed in the terminal which is used by the user (including the screen exclusively displayed on the display of the smartphone or the like).

Accordingly, the center server 30 or the like can cause the user's terminal (for example, the smartphone) to display the website for the procedure change regarding the delivery work of the package such as the temporary suspension of the delivery work of the package on the predetermined browser. Further, the center server 30 or the like can activate the application capable of change manipulation of the procedure and cause the window for the specific change manipulation to be displayed. Therefore, the center server 30 or the like can make the user specifically request the procedure change regarding the delivery work of the package to the delivery company.

Further, in the embodiment, the trunk accommodation situation notification unit 3210 provides, to the user's email address or the user's predetermined SNS account via the communication processing unit 3201, the notification including the link information for causing the display device of a terminal in use which is used by the user to display the website for the procedure change regarding the package delivery work or the window of the application program that links to the website and is installed in the terminal in use.

The center server 30 or the like can cause the user's terminal in use (for example, a computer terminal such as a tablet terminal type or a laptop type) to display the web site for the procedure change regarding the delivery work of the package such as the temporary suspension of the delivery work of the package on the predetermined browser. Further, the center server 30 or the like can activate the application capable of changing the procedure and cause the window for the specific change manipulation to be displayed. Therefore, the center server 30 or the like can make the user specifically request the procedure change regarding the delivery work of the package to the delivery company.

Further, in the embodiment, trunk accommodation situation notification unit 3210 transmits the notification including the information for specifying all the packages yet to be delivered in which the vehicle cabin (trunk) of the vehicle 10A is designated as the delivery destination to the user's predetermined terminal, the user's email address or the user's predetermined SNS account.

The center server 30 or the like can make the user request the procedure change regarding the delivery work of the package to the delivery company with respect to all the packages scheduled to be delivered, for which the inside of the vehicle cabin of the vehicle 10A is designated as the delivery destination, without being limited to a specified package.

Further, in the embodiment, the trunk accommodation situation information acquisition unit 3208 acquires the capture image inside the vehicle cabin (trunk) which is captured at the time of the delivery of the package by the mobile terminal 20Ac which is carried by the deliverer of the package and is equipped with the imaging function (camera 25). Further, the trunk accommodation situation information acquisition unit 3208 acquires detection information which is output from the sensor equipped in the vehicle cabin (trunk), and is related to the accommodation situation of the object accommodated in the vehicle cabin (trunk).

Accordingly, the center server 30 or the like can specifically grasp the accommodation amount of the object accommodated inside the vehicle cabin of the vehicle 10A or the like from the capture image of the vehicle cabin captured by the mobile terminal 20 of the deliverer at the time of the delivery of the package, or the detection information output from the sensor provided inside the vehicle cabin of the vehicle 10A (for example, the camera).

Further, in the embodiment, the trunk accommodation situation information acquisition unit 3208 acquires the information on the request history of the package requested with the inside of the vehicle cabin of the vehicle 10A as the delivery destination.

Accordingly, the center server 30 or the like can estimate the accommodation amount of the object currently accommodated inside the vehicle cabin of the vehicle 10A, from the request frequency in the latest predetermined period, for example. Therefore, the center server 30 or the like specifically grasp the accommodation amount of the object accommodated inside the vehicle cabin of the vehicle 10A or the like, based on the request history of the package requested with the inside of the vehicle cabin of the vehicle 10A as the delivery destination.

Further, in the embodiment, the trunk accommodation situation information acquisition unit 3208 acquires the information on the user's opening history of the door that allows the access to the vehicle cabin of the vehicle 10A.

Accordingly, the center server 30 or the like can estimate the accommodation amount of the object currently accommodated inside the vehicle cabin of the vehicle 10A, by grasping of the number of the delivered package or the like after a user's final opening of the door that allows the access to the inside of the vehicle cabin based on the request history of the package in the latest predetermined period, and the user's opening history of the door that allows the access to the inside of the vehicle cabin, for example. Further, the center server 30 or the like can take the account of a package which is assumed to have been taken out from the inside of the vehicle cabin. Accordingly, the center server 30 or the like can grasp the accommodation amount of the object accommodated inside the vehicle cabin of the vehicle 10A in the specific and more precise manner, based on the user's unlocking history of the door that allows the access to the inside of the vehicle cabin of the vehicle 10A in addition to the request history of the package requested with the inside of the vehicle cabin of the vehicle 10A as the delivery destination.

Further, in the embodiment, the processing device 23 of the mobile terminal 20Ac that is carried by the deliverer of the delivery company which operates the delivery service in which the inside of the vehicle cabin of the vehicle 10A (trunk) used by the user can be designated as the delivery destination of the package and that is equipped with the imaging function (the camera 25) executes a predetermined method of acquiring the image inside the vehicle cabin of the vehicle 10A (hereinafter referred to as an "acquisition method of an image inside a vehicle cabin"). Specifically, the acquisition method of an image inside a vehicle cabin includes an imaging step of imaging the inside of the vehicle cabin (the trunk) by the deliverer using the imaging function (the camera 25) at the time of the delivery of the package, which is caused by the imaging unit 2310, and a transmitting step of transmitting, to the predetermined external device (the center server 30, the delivery management server 50, or the like), the captured capture image inside the vehicle cabin (the trunk).

Accordingly, the acquisition method of an image inside a vehicle cabin can cause the mobile terminal 20Ac of the deliverer to capture the image inside the vehicle cabin of the vehicle 10A and, for example, to transmit the image to the server of the delivery company (the delivery management server 50) or the server of a support company (the center server 30) that supports the operation of the vehicle cabin delivery service such as distributing the key information for unlocking the vehicle 10A. Therefore, the delivery company, the support company, or the like can provide the user with the image inside the vehicle cabin of the vehicle 10A at the time of the delivery. Therefore, the acquisition method of an image inside a vehicle cabin can make the user grasp the accommodation situation of the object accommodated on the inside of the vehicle cabin of the vehicle 10A which is the delivery destination of the package, via the server or the like of the delivery company.

Further, in the embodiment, in the acquisition method of an image inside a vehicle cabin, an image transmission unit 3211 transmits the capture image inside the vehicle cabin of the vehicle 10A at the time of the delivery to the external device that manages the information on the vehicle 10A (that is, the center server 30) in the transmitting step.

Accordingly, the acquisition method of an image inside a vehicle cabin can cause the mobile terminal 20Ac of the deliverer, for example, to transmit the capture image inside the vehicle cabin of the vehicle 10A to the external device that manages the information on the vehicle 10A (the center server 30) such as the key information for the delivery company to unlock the vehicle 10A at the time of the delivery or the position information of the vehicle 10A, that is, the external device operated by the support company. Therefore, the acquisition method of an image inside a vehicle cabin can avoid a situation where the image of the inside of the vehicle cabin of the vehicle 10A which is a user's private space is provided to the delivery company. Therefore, the acquisition method of an image inside a vehicle cabin can make the user grasp the accommodation situation of the object accommodated on the inside of the vehicle cabin of the vehicle 10A which is the delivery destination of the package while paying attention to the user's privacy.

Further, in the embodiment, in the acquisition method of an image inside a vehicle cabin includes a deleting step of deleting the capture image in the mobile terminal 20Ac of the deliverer when the capture image has been transmitted to the external device in the transmitting step, which is caused by an image deletion unit 3212.

Accordingly, the acquisition method of an image inside a vehicle cabin can cause the mobile terminal 20 to delete the capture image inside the vehicle cabin of the vehicle 10A transmitted to the predetermined external device (the center server 30 or the delivery management server 50 or the like). Therefore, the acquisition method of an image inside a vehicle cabin can avoid the situation where the image of the inside of the vehicle cabin of the vehicle 10A which is the user's private space remains in the mobile terminal 20 of the deliverer. Therefore, the acquisition method of an image inside a vehicle cabin can make the user grasp the accommodation situation of the object accommodated on the inside of the vehicle cabin of the vehicle 10A which is the delivery destination of the package while paying attention to the user's privacy.

The embodiments for carrying out the disclosure have been described in detail above, but the disclosure is not limited to the specific embodiments as described above, and various modifications and changes can be performed without departing from the gist of the disclosure described in the claims.

For example, in the embodiment described above, the mobile terminal 20 transmits the authentication request including the authentication key to the key unit 12, and the key unit 12 performs exchange of signals with the locking, unlocking and activation device 11 according to an authentication result based on the authentication key. Therefore, the locking and unlocking of the doors of the vehicle 10A by the locking, unlocking and activation device 11 and the activation of the vehicle 10A are realized, but the disclosure is not limited to the above aspect.

Specifically, a configuration in which the function of the key unit 12 is transferred to the mobile terminal 20, and the mobile terminal 20 performs exchange of signals based on the above described key information (the internal key information) with the vehicle 10 (the locking, unlocking and activation device 11) using the LF radio waves and the RF radio waves such that the locking and unlocking of the doors of the vehicle 10A and the activation of the vehicle 10A by the locking, unlocking and activation device 11 are realized may be adopted. In this case, the "authentication key" of the embodiment described above may be read as the "key information". In other words, the center server 30 may issue the key information instead of the authentication key and distribute the key information to the mobile terminal 20 in the same method as in the authentication key in the above described embodiment. Accordingly, the same operation and effects as those of the above described embodiment can be obtained.

The functions of the key unit 12 may be integrated with the locking, unlocking and activation device 11, and a configuration regarding communication between the locking, unlocking and activation device 11 and the key unit 12 and authentication related to the communication (the LF radio wave transmitter 111, the RF radio wave receiver 112, the collating ECU 113, the LF radio wave receiver 121, and the RF radio wave transmitter 122) may be omitted. In this case, when the authentication of the mobile terminal 20 based on the authentication key has been successful, the key ECU 124 may directly output an unlocking command or a locking command and an activation command to each of the body ECU 114 and the engine ECU 116 instead of the collating ECU 113, and perform locking and unlocking the doors of the vehicle 10 and activation of the vehicle 10.

Accordingly, the same operation and effects as those of the above described embodiment can be obtained.

Further, in the above described embodiment and modification example, the target of the locking and unlocking by the transmission signal (the authentication request or the like) transmitted from the mobile terminal is the vehicle (the door), but the disclosure is not limited to the above embodiment. The vehicle (the door) in the above described embodiment and modification example may be replaced with a building or a facility (a door thereof) used by a user such as the home, the second home, a conference room, or the like.

Specifically, the vehicle cabin delivery service, the vehicle cabin pick-up service, or the vehicle cabin recovery service may be substituted by the delivery service, pick-up service, or the recovery service in which the inside of the building (for example, the home or the privately owned second home) or the facility (for example, the rental second home, the conference room, or the like) used by user can be designated as the delivery destination, the pick-up point, or the recovery point of the package or the article. In this case, the term "inside of the facility" means a place where an entrance from an outside is prevented by the locking of the above facility, and may include not only the inside of the building in the facility but also a place of an inside of a relatively high outer wall which borders the facility, the inside being provided with no roof.

More specifically, even when the inside of the building or the facility used by the user is designated as the delivery destination, the mobile terminal of the deliverer may perform the same processing as in FIGS. 7 and 8. Further, the server that operates delivery services or the server that supports the delivery service by the distribution of the authentication key for the locking and unlocking of the predetermined door of the building or the facility or the like may perform the same processing as in FIGS. 9 to 11. Accordingly, it is possible for the user to grasp the accommodation situation of the object accommodated in building and the facility, and is possible to obtain the same operation and effect as in the above described embodiment and modification example, for example.

Further, the B2C car sharing service may be substituted by a B2C sharing service that rents out the facility which is owned by a company or an organization and is available for a plurality of users in different time slots (for example, the rental second home, the conference room, gymnasium or the like). Accordingly, the facility which is owned by the company or the organization and is available for the users in the different time slots can be shared among the ordinary consumers.

Further, the C2C car sharing service may be substituted by a C2C sharing service that supports the rental of a part as a room or all of the home or the second home which is privately owned between individuals. Accordingly, a part or all of the home or the second home which is privately owned can be shared between individuals.

What is claimed is:

1. An information processing device configured to perform an operation of a delivery service in which an inside of a vehicle used by a user is designated as a delivery destination of a package, or perform a support of the operation, the information processing device comprising:
a server including a plurality of functional units realized by executing one or more programs stored in memory of the server, the plurality of functional units including an information acquisition unit, and an accommodation situation notification unit, wherein:
the information acquisition unit is configured to acquire information on an accommodation situation of a package accommodated inside the vehicle;
the information acquisition unit is configured to acquire information on a request history of the package requested with the inside of the vehicle as the delivery destination;
the server is configured to estimate the accommodation situation of the package accommodated with the inside of the vehicle based on the request history;
the accommodation situation notification unit is configured to notify the user of the accommodation situation of the package based on the information acquired by the information acquisition unit before the package is delivered to the inside of the vehicle;
when a mobile terminal that is carried by a deliverer of the package receives an unlock completion notification, the mobile terminal is configured to display an imaging instruction screen that instructs the deliverer of the package to take a capture image of the inside of the vehicle, wherein when unlocking the inside of the vehicle, the mobile terminal of the deliverer is caused to transmit to a key electronic control unit (ECU) of the vehicle an unlock request including an authentication key and information designating only unlocking the inside of the vehicle, the mobile terminal of the deliverer is authenticated by the key ECU based on the authentication key delivered with the unlock request, the key ECU is caused to transmit to a body ECU of the vehicle an unlock signal, the body ECU is caused to output a control command to cause a door lock motor of the vehicle to only unlock the inside of the vehicle;
the information acquisition unit is configured to acquire the capture image of the inside of the vehicle captured at a time of delivery of the package from the mobile terminal that is carried by the deliverer of the package and is equipped with an imaging function; and
the accommodation situation notification unit is configured to provide a notification of the capture image to a user's predetermined terminal, a user's email address, or a user's predetermined social networking service account,
the server further comprising an accommodation amount determination unit configured to determine whether or not an accommodation amount of the package accommodated inside exceeds a predetermined criterion based on the information acquired by the information acquisition unit,
wherein the accommodation situation notification unit is configured to provide a notification of a determination result to the user's predetermined terminal, the user's email address, or the user's predetermined social networking service account, when the accommodation amount determination unit determines that the accommodation amount exceeds the predetermined criterion,
the server further comprising a delivery work procedure change unit configured to provide a notification, when the accommodation amount determination unit determines that the accommodation amount exceeds the predetermined criterion, to the user's predetermined terminal, the user's email address, or the user's predetermined social networking service account such that at least a procedure change regarding a delivery work of the package is requested to a delivery service company, the change including a temporary suspension of the delivery work of the package yet to be delivered, a redelivery of the package yet to be delivered at a date and time different from a date and time currently set, and a change of the delivery destination of the package yet to be delivered, and wherein the delivery work procedure change unit is configured to provide, to the predetermined terminal, the email address, or the user's predetermined social networking service account, a notification including information specifying all packages yet to be delivered, for which the inside of the vehicle is designated as the delivery destination.

2. The information processing device according to claim 1, the server further comprising a delivery completion notification unit configured to provide a notification of a delivery completion of the package to the predetermined terminal, the email address, or the user's predetermined social networking service account, when the capture image is acquired.

3. The information processing device according to claim 1, wherein the delivery work procedure change unit is configured to cause a display device of the predetermined terminal to display a website for the procedure change or a window of an application program which links to the website and is installed in the predetermined terminal, by the notification to the predetermined terminal.

4. The information processing device according to claim 1, wherein the delivery work procedure change unit is configured to provide, to the email address or the user's predetermined social networking service account, a notification including link information for causing a display device of a terminal in use which is used by the user to display a website for the procedure change or a window of an application program which links to the website and is installed in the terminal in use.

5. The information processing device according to claim 1, wherein the information acquisition unit is configured to acquire, from a mobile terminal that is carried by a deliverer of the package and is equipped with an imaging function, the capture image of the inside of the vehicle captured at a time of delivery of the package, or detection information on the accommodation amount output from a sensor provided inside the vehicle.

6. The information processing device according to claim 1, wherein the information acquisition unit is configured to acquire information on a user's opening history of a door that allows access to the inside of the vehicle.

7. An information processing method executed by an information processing device configured to perform an operation of a delivery service in which an inside of a vehicle used by a user is designated as a delivery destination of a package, or perform a support of the operation, the information processing method comprising:

a server including a plurality of functional units realized by executing one or more programs stored in memory of the server, the plurality of functional units including an information acquisition unit, and an accommodation situation notification unit, wherein:

acquiring information on an accommodation situation of a package accommodated with the inside of the vehicle;

acquiring information on a request history of the package requested with the inside of the vehicle as the delivery destination, with the server;

estimating the accommodation situation of the package accommodated with the inside of the vehicle based on the request history, with the server;

notifying the user of the accommodation situation of the package based on the information acquired by the acquiring information before the package is delivered to the inside of the vehicle, with the server;

when a mobile terminal that is carried by a deliverer of the package receives an unlock completion notification, displaying on the mobile terminal an imaging instruction screen that instructs the deliverer of the package to take a capture image of the inside of the vehicle, with the server, wherein when unlocking the inside of the vehicle, the mobile terminal of the deliverer is caused to transmit to a key electronic control unit (ECU) of the vehicle an unlock request including an authentication key and information designating only unlocking the inside of the vehicle, the mobile terminal of the deliverer is authenticated by the key ECU based on the authentication key delivered with the unlock request, the key ECU is caused to transmit to a body ECU of the vehicle an unlock signal, the body ECU is caused to output a control command to cause a door lock motor of the vehicle to only unlock the inside of the vehicle;

acquiring the capture image of the inside of the vehicle captured at a time of delivery of the package from the mobile terminal that is carried by the deliverer of the package and is equipped with an imaging function, with the server;

providing a notification of the capture image to a user's predetermined terminal, a user's email address, or a user's predetermined social networking service account, with the server;

determining whether or not an accommodation amount of the package accommodated inside exceeds a predetermined criterion based on the information acquired by the information acquisition unit;

provide a notification of a determination result to the user's predetermined terminal, the user's email address, or the user's predetermined social networking service account, when an accommodation amount determination unit determines that the accommodation amount exceeds the predetermined criterion;

provide a notification, when the accommodation amount determination unit determines that the accommodation amount exceeds the predetermined criterion, to the user's predetermined terminal, the user's email address, or the user's predetermined social networking service account such that at least a procedure change regarding a delivery work of the package is requested to a delivery service company, the change including a temporary suspension of the delivery work of the package yet to be delivered, a redelivery of the package yet to be delivered at a date and time different from a date and time currently set, and a change of the delivery destination of the package yet to be delivered; and provide, to the predetermined terminal, the email address, or the user's predetermined social networking service account, a notification including information specifying all packages yet to be delivered, for which the inside of the vehicle is designated as the delivery destination.

8. A non-transitory computer-readable storage medium storing an information processing program causing an information processing device to execute a process, the information processing device being configured to perform an operation of a delivery service in which an inside of a vehicle used by a user is designated as a delivery destination of a package, or perform a support of the operation, the process comprising:

a server including a plurality of functional units realized by executing one or more programs stored in memory of the server, the plurality of functional units including an information acquisition unit, and an accommodation situation notification unit, wherein:

acquiring information on an accommodation situation of a package accommodated with the inside of the vehicle;

acquiring information on a request history of the package requested with the inside of the vehicle as the delivery destination, with the server;

estimating the accommodation situation of the package accommodated with the inside of the vehicle based on the request history, with the server;

notifying the user of the accommodation situation of the package based on the information acquired by the acquiring information before the package is delivered to the inside of the vehicle, with the server;

when a mobile terminal that is carried by a deliverer of the package receives an unlock completion notification, displaying on the mobile terminal an imaging instruction screen that instructs the deliverer of the package to take a capture image of the inside of the vehicle, with the server, wherein when unlocking the inside of the vehicle, the mobile terminal of the deliverer is caused to transmit to a key electronic control unit (ECU) of the vehicle an unlock request including an authentication key and information designating only unlocking the inside of the vehicle, the mobile terminal of the deliverer is authenticated by the key ECU based on the authentication key delivered with the unlock request, the key ECU is caused to transmit to a body ECU of the vehicle an unlock signal, the body ECU is caused to output a control command to cause a door lock motor of the vehicle to only unlock the inside of the vehicle;

acquiring the capture image of the inside of the vehicle captured at a time of delivery of the package from the mobile terminal that is carried by the deliverer of the package and is equipped with an imaging function, with the server;

providing a notification of the capture image to a user's predetermined terminal, a user's email address, or a user's predetermined social networking service account, with the server;

determining whether or not an accommodation amount of the package accommodated inside exceeds a predetermined criterion based on the information acquired by the information acquisition unit;

provide a notification of a determination result to the user's predetermined terminal, the user's email address, or the user's predetermined social networking service account, when an accommodation amount determination unit determines that the accommodation amount exceeds the predetermined criterion;

provide a notification, when the accommodation amount determination unit determines that the accommodation amount exceeds the predetermined criterion, to the user's predetermined terminal, the user's email address, or the user's predetermined social networking service account such that at least a procedure change regarding a delivery work of the package is requested to a delivery service company, the change including a temporary suspension of the delivery work of the package yet to be delivered, a redelivery of the package yet to be delivered at a date and time different from a date and time currently set, and a change of the delivery destination of the package yet to be delivered; and provide, to the predetermined terminal, the email address, or the user's predetermined social networking service account, a notification including information specifying all packages yet to be delivered, for which the inside of the vehicle is designated as the delivery destination.

9. An image acquisition method executed by a mobile terminal that is equipped with an imaging function and is carried by a deliverer of a company that operates a delivery service in which an inside of a vehicle used by a user is designated as a delivery destination of a package, the image acquisition method comprising:

a server including a plurality of functional units realized by executing one or more programs stored in memory of the server, the plurality of functional units including an information acquisition unit, and an accommodation situation notification unit, wherein:

the information acquisition unit is configured to acquire information on an accommodation situation of a package accommodated inside the vehicle;

the information acquisition unit is configured to acquire information on a request history of the package requested with the inside of the vehicle as the delivery destination;

the server is configured to estimate the accommodation situation of the package accommodated with the inside of the vehicle based on the request history;

the accommodation situation notification unit is configured to notify the user of the accommodation situation of the package based on the information acquired by the information acquisition unit before the package is delivered to the inside of the vehicle;

when the mobile terminal that is carried by the deliverer of the package receives an unlock completion notification, displaying on the mobile terminal an imaging instruction screen that instructs the deliverer of the package to take a capture image of the inside of the vehicle, with the server, wherein when unlocking the inside of the vehicle, the mobile terminal of the deliverer is caused to transmit to a key electronic control unit (ECU) of the vehicle an unlock request including an authentication key and information designating only unlocking the inside of the vehicle, the mobile terminal of the deliverer is authenticated by the key ECU based on the authentication key delivered with the unlock request, the key ECU is caused to transmit to a body ECU of the vehicle an unlock signal, the body ECU is caused to output a control command to cause a door lock motor of the vehicle to only unlock the inside of the vehicle;

the information acquisition unit is configured to acquire the capture image of the inside of the vehicle captured at a time of delivery of the package from the mobile terminal that is carried by the deliverer of the package and is equipped with an imaging function; and the accommodation situation notification unit is configured to provide a notification of the capture image to a user's predetermined terminal, a user's email address, or a user's predetermined social networking service account, determining whether or not an accommodation amount of the package accommodated inside exceeds a predetermined criterion based on the information acquired by the information acquisition unit;

providing a notification of a determination result to the user's predetermined terminal, the user's email address, or the user's predetermined social networking service account, when an accommodation amount determination unit determines that the accommodation amount exceeds the predetermined criterion;

providing a notification, when the accommodation amount determination unit determines that the accommodation amount exceeds the predetermined criterion, to the user's predetermined terminal, the user's email address, or the user's predetermined social networking service account such that at least a procedure change regarding a delivery work of the package is requested to a delivery service company, the change including a temporary suspension of the delivery work of the package yet to be delivered, a redelivery of the package yet to be delivered at a date and time different from a date and time currently set, and a change of the delivery destination of the package yet to be delivered; and providing, to the predetermined terminal, the email address, or the user's predetermined social networking service account, a notification including information specifying all packages yet to be delivered, for which the inside of the vehicle is designated as the delivery destination.

10. The image acquisition method according to claim 9, wherein the capture image is transmitted to an external device that manages information on the vehicle by the transmitting.

11. The image acquisition method according to claim 9, further comprising deleting the capture image in the mobile terminal, when the capture image has been transmitted to an external device by the transmitting.

12. A non-transitory computer-readable storage medium storing an image acquisition program causing a mobile terminal to execute a process, the mobile terminal being equipped with an imaging function and being carried by a deliverer of a company that operates a delivery service in which an inside of a vehicle used by a user is designated as a delivery destination of a package, the process comprising:

a server including a plurality of functional units realized by executing one or more programs stored in memory of the server, the plurality of functional units including an information acquisition unit, and an accommodation situation notification unit, wherein:

acquiring information on an accommodation situation of a package accommodated with the inside of the vehicle;

acquiring information on a request history of the package requested with the inside of the vehicle as the delivery destination, with the server;

estimating the accommodation situation of the package accommodated with the inside of the vehicle based on the request history, with the server;

notifying the user of the accommodation situation of the package estimated before the package is delivered to the inside of the vehicle;

when the mobile terminal that is carried by the deliverer of the package receives an unlock completion notification, displaying on the mobile terminal an imaging instruction screen that instructs the deliverer of the package to take a capture image of the inside of the vehicle, with the server, wherein when unlocking the inside of the vehicle, the mobile terminal of the deliverer is caused to transmit to a key electronic control unit (ECU) of the vehicle an unlock request including an authentication key and information designating only unlocking the inside of the vehicle, the mobile terminal of the deliverer is authenticated by the key ECU based on the authentication key delivered with the unlock request, the key ECU is caused to transmit to a body ECU of the vehicle an unlock signal, the body ECU is caused to output a control command to cause a door lock motor of the vehicle to only unlock the inside of the vehicle;

acquiring the capture image of the inside of the vehicle captured at a time of delivery of the package from the mobile terminal that is carried by the deliverer of the package and is equipped with an imaging function, with the server;

transmitting, to a predetermined external device, the capture image of the inside of the vehicle captured by the imaging, with the server;

providing a notification of the capture image to a user's predetermined terminal, a user's email address, or a user's predetermined social networking service account, with the server;

determining whether or not an accommodation amount of the package accommodated inside exceeds a predetermined criterion based on the information acquired by the information acquisition unit;

provide a notification of a determination result to the user's predetermined terminal, the user's email address, or the user's predetermined social networking service account, when an accommodation amount determination unit determines that the accommodation amount exceeds the predetermined criterion;

provide a notification, when the accommodation amount determination unit determines that the accommodation amount exceeds the predetermined criterion, to the user's predetermined terminal, the user's email address, or the user's predetermined social networking service account such that at least a procedure change regarding a delivery work of the package is requested to a delivery service company, the change including a temporary suspension of the delivery work of the package yet to be delivered, a redelivery of the package yet to be delivered at a date and time different from a date and time currently set, and a change of the delivery destination of the package yet to be delivered; and provide, to the predetermined terminal, the email address, or the user's predetermined social networking service account, a notification including information specifying all packages yet to be delivered, for which the inside of the vehicle is designated as the delivery destination.

* * * * *